US008137544B1

(12) United States Patent
Graves

(10) Patent No.: US 8,137,544 B1
(45) Date of Patent: Mar. 20, 2012

(54) WASTE WATER TREATMENT SYSTEM

(76) Inventor: Gregory D. Graves, Milan, OH (US)

( * ) Notice: Subject to any disclaimer, the term of this patent is extended or adjusted under 35 U.S.C. 154(b) by 0 days.

(21) Appl. No.: 13/086,668

(22) Filed: Apr. 14, 2011

(51) Int. Cl.
*C02F 3/00* (2006.01)

(52) U.S. Cl. .............. 210/150; 210/170.06; 210/170.08; 210/220; 210/532.2

(58) Field of Classification Search .................. 210/150, 210/170.06, 170.08, 220, 532.2
See application file for complete search history.

(56) References Cited

U.S. PATENT DOCUMENTS

| | | | | |
|---|---|---|---|---|
| 3,741,393 | A * | 6/1973 | Estes et al. | 210/195.4 |
| 6,180,004 | B1 * | 1/2001 | Drewery | 210/221.2 |
| 2002/0011489 | A1 * | 1/2002 | Csiszar | 220/4.03 |
| 2007/0031190 | A1 * | 2/2007 | Meyers | 404/26 |

* cited by examiner

*Primary Examiner* — Chester Barry
(74) *Attorney, Agent, or Firm* — Miles & Stockbridge P.C.; David R. Schaffer, Esq.

(57) ABSTRACT

A molded modular wastewater treatment system including a tank with molded double thick baffle walls made of UV stabilized ⅜" thick polyethylene. The system is designed with three separately molded and interconnected chambers, a pretreatment chamber connected to a first side of an aeration chamber and a second side of the aeration chamber connected to a clarification chamber. The pretreatment chamber initially receives the wastewater and uses anaerobic bacterial action and gravity to precondition the wastewater and then passes the preconditioned water to an aeration chamber. The aeration chamber receives the pretreated wastewater from the pretreatment chamber and uses aerobic bacteria to biologically convert the waste in the wastewater into stable substances and then pass it to the clarification chamber. The clarification chamber receives the flow from the aeration chamber and settles out any biologically active material in the flow and returns it to the aeration chamber for additional processing.

35 Claims, 47 Drawing Sheets

WASTE WATER TREATMENT SYSTEM

FIELD OF THE INVENTION

This invention relates to wastewater treatment systems. More specifically, the invention relates to a modular wastewater treatment plant which includes multiple interconnected chambers and associated aeration and treatment equipment to receive and treat a fluid, such as home wastewater, and ultimately discharge a final clarified liquid.

BACKGROUND

The most widely used on-site wastewater treatment systems for individual households have traditionally been either septic systems or aerobic treatment units. Septic systems generally include a septic tank followed by a leaching tile field or a similar absorption device located downstream, but physically on-site of the individual residence. The septic tank allows for larger/heavier solids in the sewage to settle out within the tank, while anaerobic bacteria partially degrade the organic material in the waste. The discharge from the septic tank is further treated by dispersion into the soil through any number of soil absorption devices, such as a leaching tile field, whereby bacteria in the soil continue the biodegradation process.

The conventional septic system is typically a flow-through system. The septic tank and the tile field are positioned so that sewage is carried out of the residence and through the treatment system by gravity and hydraulic displacement. As a flow-through system, the tank relies on sufficient hydraulic capacity to slow the velocity of the flow and allows settling of the solids to take place. Unfortunately, as the settable solids accumulate in the bottom of the tank, they displace the beneficial tank volume, effectively increasing the velocity of flow through the tank and decreasing the efficiency of solids removal. Also, as a flow-through system, the velocity of the flow through the tank and the related efficiency of solids removal by gravity are dependent upon the volume and frequency of the incoming sewage. A lower volume and rate of incoming sewage flow allows for greater gravity separation and removal efficiency. Higher volumes and rates of flow therefore decrease gravity settling and solids removal efficiency. Over the course of time, an increase in volume of organic material is discharged from the tank (due to decreasing removal efficiency) until the total volume of solids discharged over the life of the system exceeds the capacity of the downstream soil absorption system (leaching tile field) to accomplish further treatment. The soil absorption system will then retain solids and become plugged, thereby causing a back-up of sewage into the home. In this situation, the downstream soil absorption system is considered failed. Rejuvenation of a failed soil absorption system is not technologically feasible. Therefore, the downstream soil absorption system or other downstream device must be replaced or a new downstream device installed. However, even if sufficient land area is available toward the installation of a new downstream device, such can be accomplished only at considerable cost and inconvenience. Typically, heavy construction equipment is required to excavate and install any new replacement leaching tile field (a commonly used soil absorption system), or a similar device. This is much more inconvenient and costly than at the time of installation of the original treatment system. Construction equipment operating around an occupied residence frequently requires considerable destruction of hundreds of square feet of existing sod or lawn, moving fences, trees or recreational equipment, and creating a hazard for individuals, particularly smaller children.

Most aerobic treatment units are also flow through systems. Unlike septic tanks, aerobic treatment units perform primary (anaerobic) treatment and secondary (aerobic) treatment within the confines of the system. This arrangement provides a much higher degree of treatment within a relatively small area. As traditional aerobic treatment units are designed for a much higher removal of solids and organic compounds than anaerobic treatment units, a downstream device is frequently not required or is severely diminished in size compared to one which would be required downstream of a septic tank. In a traditional aerobic treatment unit, the first stage of the process is called pretreatment and provides for anaerobic treatment very much like that provided by a septic tank. A separate, isolated pretreatment chamber contains sufficient hydraulic capacity to slow the velocity of the flow somewhat and allows the settling of some of the solids to take place. Anaerobic bacteria partially degrade the organic material in the waste. As a flow through system, the contents of the pretreatment chamber (partially treated waste) are displaced by incoming sewage, and are transferred to the aeration chamber or biological reactor.

Within the aeration chamber, air is introduced in controlled amounts creating a proper environment for the development of a number of types of aerobic bacteria. The aerobic bacteria maintain a higher metabolic rate than anaerobic bacteria, which causes them to readily consume the organic material contained in the pretreated sewage. Prior to discharge of this flow through system, the aerobic bacteria (commonly called activated sludge) must be separated from the treated liquid. If the activated sludge particles are allowed to exit the system, two problems occur. First, the activated sludge would not be available to treat additional incoming sewage. As the system is operated on a continuing basis, the cultured bacteria need to be retained for future use. Secondly, if the activated sludge is allowed to be discharged from the system, the organic nature of the sludge would be considered a pollutant if returned directly to the environment.

Commonly, the activated sludge is separated from the treated liquid by allowing the solids to settle out in a gravity clarifier. In a flow through system, the contents of the aeration chamber containing the activated sludge are hydraulically displaced to the clarifier by partially treated liquid entering from the pretreatment chamber. Once in the gravity clarifier, quiescent conditions allow the activated sludge to slowly settle to the bottom of the chamber while the treated liquid is discharged from the system near the top of the chamber. The clarifier relies on having sufficient hydraulic capacity to slow the velocity of the flow through the chamber and thereby allows the activated sludge solids to settle to the bottom. The settled sludge at the bottom of the clarifier is returned, by various means, to the aeration chamber. This return prohibits the clarifier from accumulating a large volume of solids and thereby reducing the efficiency of solids separation. However, as a flow through system, the settling efficiency of the clarifier is dependent also on the volume and frequency of the incoming sewage flow.

SUMMARY

The invention describes a new, light-weight, molded-plastic multi-chamber wastewater treatment tank and system. The system is designed with three separately molded chambers, a pretreatment chamber, an aeration chamber and a clarification chamber. The pretreatment chamber initially receives the wastewater and uses anaerobic bacterial action and gravity to precondition the wastewater and then passes the preconditioned water to an aeration chamber. The aeration chamber is connected to and receives the pretreated wastewater from the pretreatment chamber and uses aerobic bacteria to biologically convert the waste in the wastewater into stable substances and then pass it to the clarification chamber. The clarification chamber is connected to and receives the flow from the aeration chamber and settles out any biologically active material in the flow and returns it to the aeration chamber for additional processing. The clarification chamber is also where a patented non-mechanical flow equalization device, a Bio-Kinetic® filtration system, which is described in U.S. Pat. No. 5,413,706 issued on May 9, 1995 and is incorporated herein in its entirety, is located to receive, filter, settle and flow equalize clarified liquids and then discharge the final clarified liquid.

The inventive system can treat up to 1500 gallons per day (GPD) of domestic wastewater. Total holding capacity of the system includes a 48 hour minimum retention of the daily flow. The pretreatment chamber provides at least an 18 hour minimum retention, the extended aeration chamber provides at least a 24 hour retention, and the clarification chamber provides at least a 6 hour retention. The non-mechanical flow equalization device increases each individual chamber and total system retention time in direct proportion to loading. The system includes the compartmented tanks and non-mechanical flow equalization device to ensure successful treatment performance without upset even when the significant runoff period is six hours. Hydraulic design considerations of the system and flow equalization device are such that intermittent peak flow factors as high as four do not upset hydraulic reliability within the system.

BRIEF DESCRIPTION OF THE DRAWINGS

The present invention will be described with reference to the accompanying drawings, in which same numbered elements are identical.

DETAILED DESCRIPTION

The present invention relates to an aerobic wastewater treatment system that includes a watertight tank made of three connected but separate rotationally molded, ribbed chambers, associated integrally molded risers and lids, and treatment components. The rotational molding process is performed in a closed form with locations to define openings in the molded chambers. The material can be, but is not limited to, a heavy duty ultraviolet (UV) protected polyethylene, and the wall thickness can be between about ⅜" and about ½". The unique internal and external ribbed design provides the tank with its strength and eliminates the possibility of tank damage due to over-pumping or hydraulic forces. The combined tank and associated aeration and treatment equipment weighs less than 900 pounds and is designed to be buried below the surface grade. In addition to rotational molding, embodiments of the wastewater treatment system tank also can be manufactured using injection molding, welding, and component assembly, as well as, combinations of some or all of the above-listed materials and methods.

Figure 1:
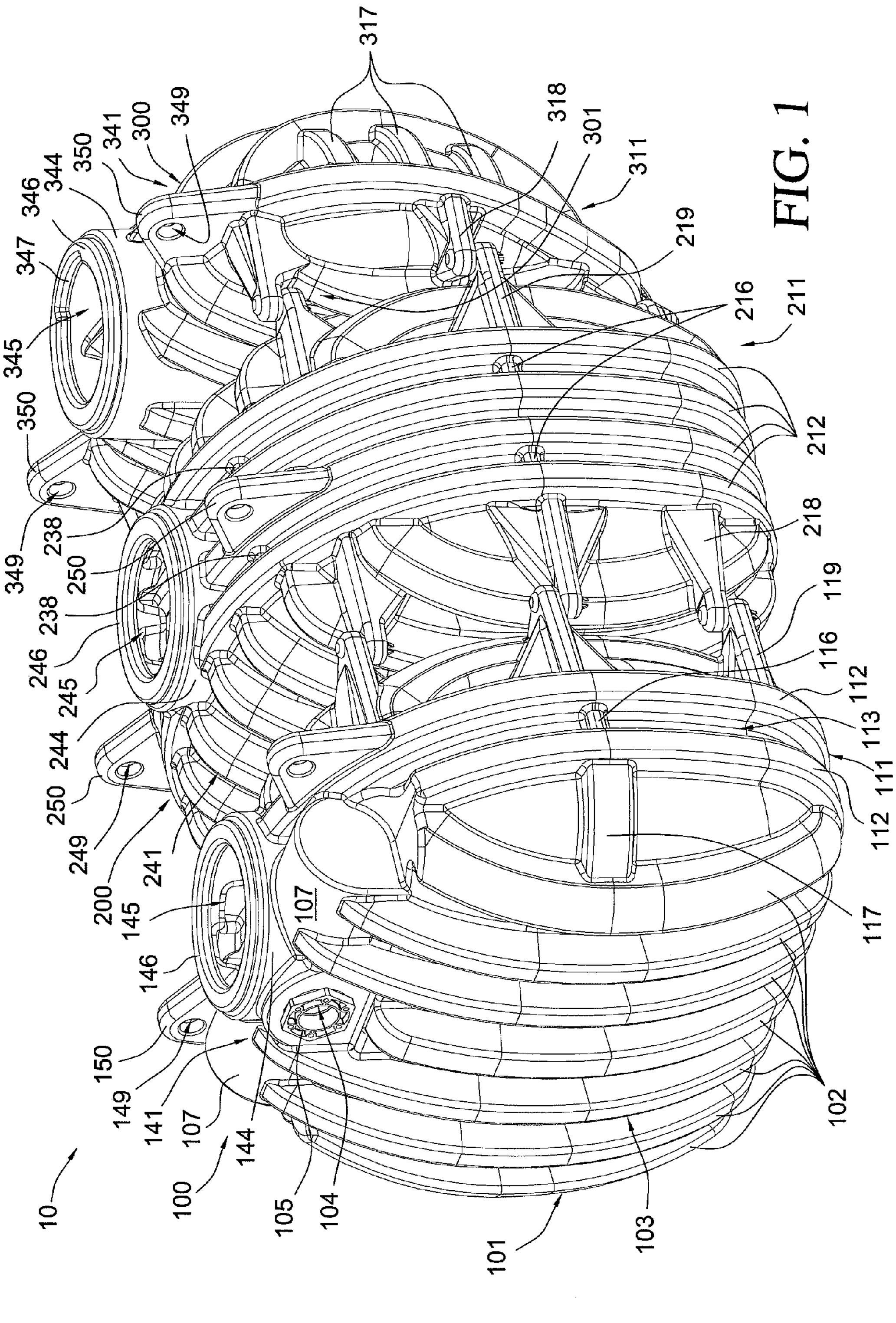
FIG. 1 is a side-perspective view of a wastewater treatment system tank with a pretreatment chamber, an aeration chamber, and a clarification chamber, in accordance with one or more embodiments of the present invention.

FIG. 1 is a side-perspective view of a wastewater treatment system tank 10 including (i.e., comprising) a pretreatment chamber, an aeration chamber, and a clarification chamber, in accordance with one or more embodiments of the present invention. In FIG. 1, a pretreatment chamber 100 is shown including a front wall 101 and a right wall 111 connected to a right side of the pretreatment chamber front wall 101 and a pretreatment chamber back wall (not shown, but seen in FIG. 11 indicated by reference number 131) is connected to a right side of the pretreatment chamber right wall 111. The pretreatment chamber back wall 131 is connected to a front wall 201 of an aeration chamber 200 of which a right wall 211 is connected to a right side of the aeration chamber front wall 201. A back side of the aeration chamber (not shown, but seen in FIG. 11 and indicated by reference number 231) is connected to a front wall 301 of a clarification chamber 300 of which a right wall 311 is connected.

In FIG. 1, although not exactly the same, each of the pretreatment chamber 100, aeration chamber 200 and clarification chamber 300 has a generally oblate spheroid shape with ribbed walls on their front and back sides that extend vertically from the bottom wall to the top wall. In addition, the pretreatment and aeration chambers 100, 200 have at least two ribs that extend down from on or near one side of a top wall, around the bottom wall and back up on or near the other side of the top wall. The clarification chamber 300 has a single substantially vertical rib that extends from near a top wall down each side of the clarification chamber to near a bottom wall 351 of the clarification chamber 300. Gussets (i.e., cross-piece ribs) are also used on the left and right walls of the pretreatment and clarification chambers between the vertical ribs on the left and right walls and the furthest outside rib on either the front or back wall. The curved oblate spheroid shape of each chamber, in combination with the ribbed walls and gussets, if present, provide the necessary support and strength to prevent the chambers from collapsing when the system is installed and buried in the ground.

Figure 3:
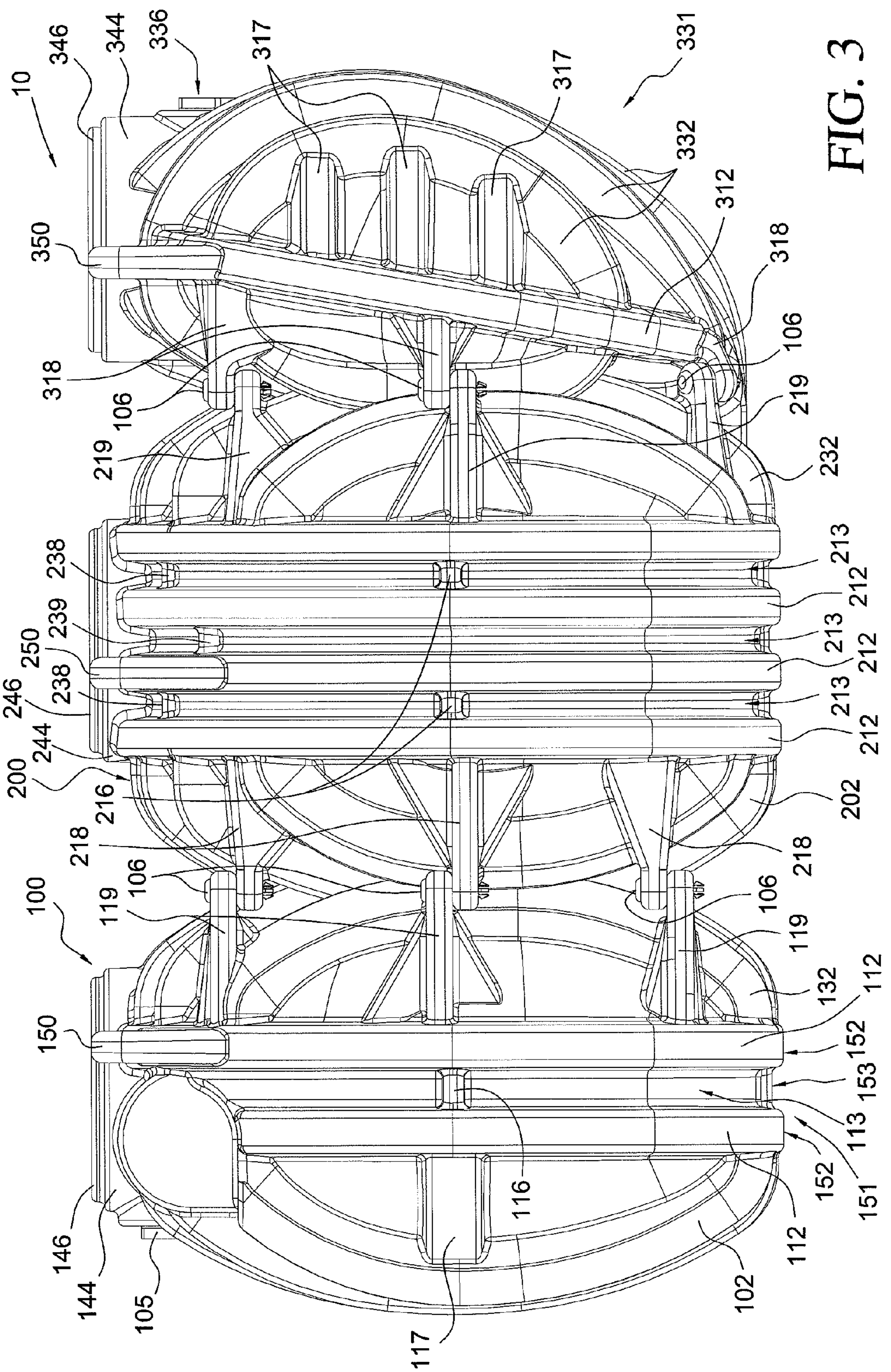
FIG. 3 is a right side view of a wastewater treatment system tank with a pretreatment chamber, an aeration chamber, and a clarification chamber, in accordance with one or more embodiments of the present invention.
Figure 4:
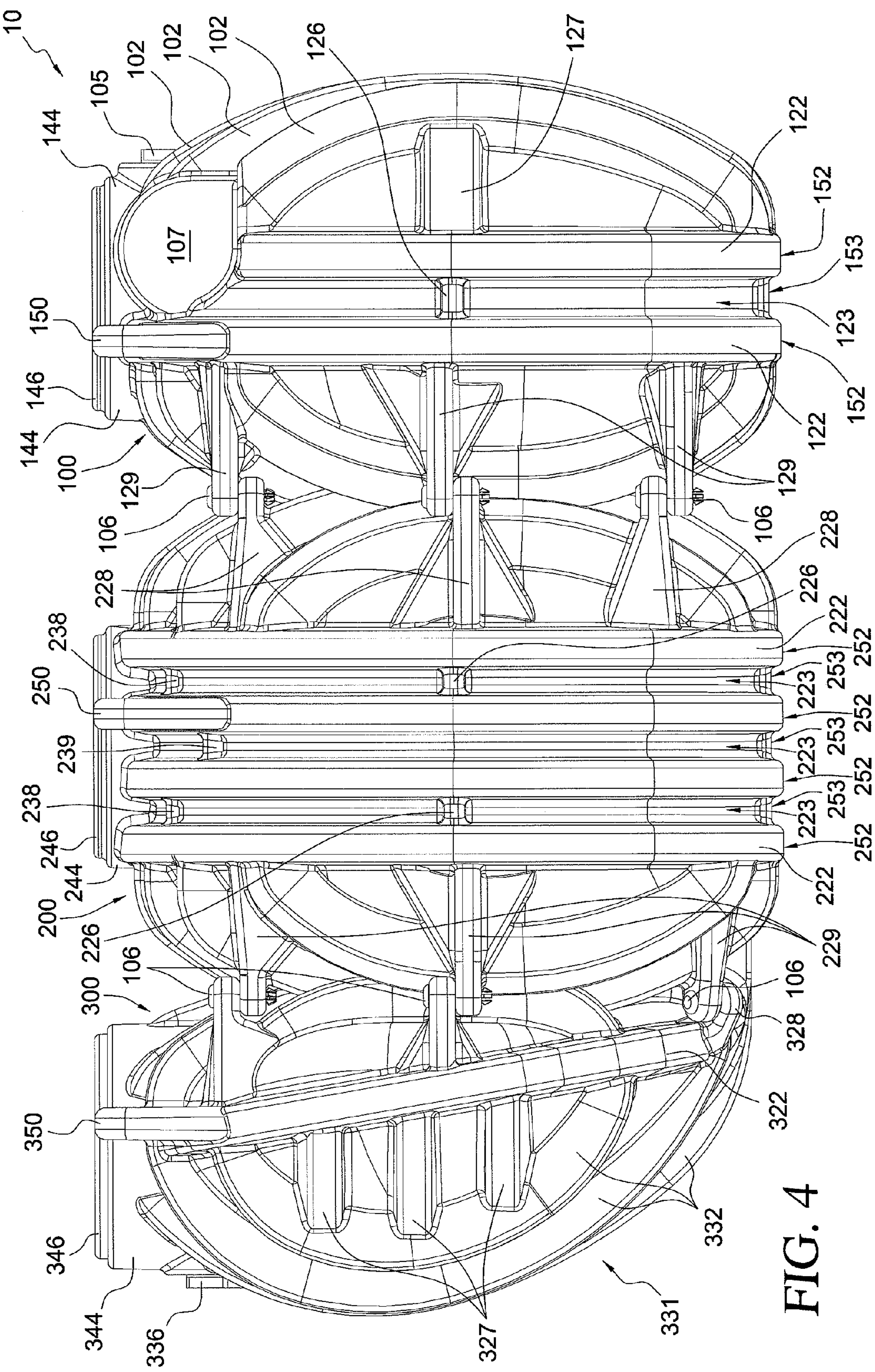
FIG. 4 is a left side view of a wastewater treatment system tank with a pretreatment chamber, an aeration chamber, and a clarification chamber, in accordance with one or more embodiments of the present invention.

In FIG. 1, a top of pretreatment chamber front wall 101 has formed therein an inlet opening 104 through which an inlet access means 105 extends to connect to and receive incoming wastewater from an external supply source, for example, a pipe. An access opening 145 having a substantially cylindrical wall 144, which is formed in and extends upwardly away from top wall 141, and a raised annular lip 146 that is connected to a top of substantially cylindrical wall 144 to permit access for maintenance and repairs and which may be covered by a simple substantially flat cover that mates with and can be sealed to the tank to cover access opening 145. The cover is sealed to the tank using an O-ring and tamper resistant fasteners. Inlet opening 104 also extends through substantially cylindrical wall 144 to empty into pretreatment chamber 100 just below access opening 145. Alternatively, instead of a flat cover, a riser column (not shown, but described below in relation to FIGS. 22 and 31-33), O-ring and tamper resistant fasteners may be mated with and sealed around and to cover access opening 145. In general, riser columns are used to variously house mechanical and electrical components of the overall system and to permit the wastewater treatment system tank 10 to be completely buried so that no part of any of the chambers is near the surface. An arched portion 107 is located along a front half of top wall 141 and extends to and connects to substantially cylindrical wall 144 on either side of access opening 145 and is substantially perpendicular to inlet opening 104. A pair of substantially triangularly-shaped hoist points 150 extend substantially perpendicularly upward and away from top wall 141 and are spaced equidistantly apart on opposite sides of access opening 145. A lift opening 149 is formed in each hoist point to permit easy connection to a hook, a cable, a rope, or the like to permit the wastewater treatment system tank 10 to be lifted, moved and/or placed in the ground during installation. In general, a top of each hoist point 150 does not extend beyond a top of access opening 145. This is best shown in FIGS. 3 and 4.

In FIG. 1, a set of three spaced-apart, back right connector flanges 119 extend from between pretreatment chamber right wall 111 and pretreatment chamber back wall 131 in a substantially horizontal plane toward aeration chamber 200. Although not seen in FIG. 1, another set of three spaced-apart, back left connector flanges 129 extend from between pretreatment chamber left wall (not shown) and pretreatment chamber back wall 131 in a substantially horizontal plane toward aeration chamber 200.

In FIG. 1, aeration chamber front wall 201 has formed therein an inlet opening (not shown) to connect to and receive incoming pretreated wastewater from pretreatment chamber 100. An access opening 245 having a substantially cylindrical wall 244, which is formed in and extends upwardly away from an aeration chamber top wall 241, and a raised annular lip 246 that is connected to a top of substantially cylindrical wall 244 to permit access for maintenance, repairs, installation of the aeration systems equipment (not shown here, but see description below for FIGS. 22 and 23), or which may be covered by a simple substantially flat cover that mates with and can be sealed to raised annular lip 246 and the top of substantially cylindrical wall 244 and for maintenance and repairs. The access opening 245 is generally covered with a riser column (not shown, but described below in relation to FIGS. 22 and 31-33) that may be mated with raised annular lip 246 and the top of substantially cylindrical wall 244 to seal access opening 245. In general, a riser column on aeration chamber 200 is used to house mechanical and electrical components of the overall system and to permit the wastewater treatment system tank 10 to be completely buried so that no part of any of the chambers is near the surface, but access to the chambers can be effected through the risers. A pair of substantially triangularly-shaped hoist points 250 extend substantially perpendicularly upward and away from top wall 241 and are spaced equidistantly apart on opposite sides of access opening 245. A lift opening 249 is formed in each hoist point to permit easy connection to a hook, a cable, a rope, or the like to permit the wastewater treatment system tank 10 to be lifted, moved and/or placed in the ground during installation. In general, a top of each hoist point 250 does not extend beyond a top of access opening 245. This is best shown in FIGS. 3 and 4.

In FIG. 1, a set of three spaced-apart, front right connector flanges 218 extend from between aeration chamber right wall 211 and aeration chamber front wall 201 in a substantially horizontal plane toward pretreatment chamber 100. Although not seen in FIG. 1, another set of three spaced-apart, front left connector flanges 228 extend from between aeration chamber left wall (not shown) and aeration chamber front wall 201 in a substantially horizontal plane toward pretreatment chamber 100. A top and a middle aeration chamber front right connector flanges 218 extend substantially perpendicularly away from the aeration chamber front wall 201 to below a top and middle pretreatment back right connector flanges 119 that, likewise, substantially perpendicularly away from the pretreatment chamber back wall 131 to permit individual fastening means to fixedly connect the top flanges to each other and the middle flanges to each other. A bottom aeration chamber front right connector flange 218 extends above a bottom pretreatment back right connector flange 119 to permit another fastening means to fixedly connect the bottom flanges to each other. Although not shown, the same configurations and connections are made between the left connector flanges on the pretreatment chamber back wall 131 and the left connector flanges on the aeration chamber front wall 201. In addition, a set of three spaced-apart, back right connector flanges 219 extend from between aeration chamber right wall 211 and aeration chamber back wall 231 in a substantially horizontal plane toward clarification chamber 300. As more clearly seen in FIG. 3, unlike the top and middle flanges, a bottom clarification chamber front right connector flange 318 extends to below a bottom aeration back right connector flange 219, and each extends downwardly and away from its respective chamber wall at an approximately 45° angle to be connected to each other with the rivet 106 or a rivet and locking pin combination, as described below in relation to FIGS. 34-38. Although not seen in FIG. 1, another set of three spaced-apart, back left connector flanges 229 extend from between aeration chamber left wall (not shown) and aeration chamber back wall 231 in a substantially horizontal plane toward clarification chamber 300.

In FIG. 1, clarification chamber front wall 301 has formed therein an inlet opening (not shown) to connect to and receive incoming aerobically treated wastewater from aeration chamber 200. An access opening 345 having a substantially cylindrical wall 344, which is formed in and extends upwardly away from a clarification chamber top wall 341, and a raised annular lip 346 that is connected to a top of substantially cylindrical wall 344. A short recessed groove 347 is formed along an inner edge of the raised annular lip 346 on the back wall-side of clarification chamber 300. Raised annular lip 346, short recessed groove 347 and the top of substantially cylindrical wall 344 may mate with and be removably sealed to a riser column (not shown, but described below in relation to FIGS. 22 and 31-33) to permit access to the chamber for maintenance and repairs and to install a non-mechanical flow equalization device, for example, the Bio-Kinetic® filtration system, which is described in U.S. Pat. No. 5,413,706 issued on May 9, 1995. Short recessed groove 347 provides additional clearance in access opening 345 that is needed for the installation of the Bio-Kinetic® filtration system. Access opening 345 may alternatively be covered by a simple substantially flat cover that mates with and can be removably sealed to raised annular lip 346 and the top of substantially cylindrical wall 344 to permit maintenance and repairs. Although not shown in FIG. 1, the non-mechanical flow equalization device may be seen installed in the clarification chamber 300 in FIGS. 22, 24, 26 and 29. Returning to FIG. 1, the clarification chamber 300 receives the flow of liquid from the aeration chamber and the non-mechanical flow equalization device is located in clarification chamber 300 to receive, filter, settle and flow equalize clarified liquid and then discharge the final clarified liquid. The access opening 345 is generally covered with a riser column (not shown, but described below in relation to FIGS. 22 and 31-33) that may be mated with and sealed to access opening 345. In general, a riser column on clarification chamber 300 is used to house mechanical and electrical components of the overall system and to permit the wastewater treatment system tank 10 to be completely buried so that no part of any of the chambers is near the surface. A pair of substantially triangularly-shaped hoist points 350 extend substantially perpendicularly upward and away from top wall 341 and are spaced equidistantly apart on opposite sides of access opening 345. A lift opening 349 is formed in each hoist point to permit easy connection to a hook, a cable, a rope, or the like to permit the wastewater treatment system tank 10 to be lifted, moved and/or placed in the ground during installation. In general, a top of each hoist point 350 does not extend beyond a top of access opening 345. This is best shown in FIGS. 3 and 4.

In FIG. 1, a set of three spaced-apart, front right connector flanges 318 extend from between clarification chamber right wall 311 and clarification chamber front wall 301 in a substantially horizontal plane toward aeration chamber 200. Although not seen in FIG. 1, another set of three spaced-apart, front left connector flanges 328 extend from between clarification chamber left wall (not shown) and clarification chamber front wall 301 in a substantially horizontal plane toward aeration chamber 200. The top and middle clarification chamber front right connector flanges 318 extend above the top and middle aeration chamber back right connector flanges 219 to permit individual fastening means to fixedly connect the top flanges to each other and the middle flanges to each other. A bottom clarification chamber front right connector flange 318 extends below a bottom aeration back right connector flange 219 to permit another fastening means to fixedly connect the bottom flanges to each other. Although not shown, the same configurations and connections are made between the left connector flanges on the aeration chamber back wall 231 and the left connector flanges on the clarification chamber front wall 301.

The wastewater treatment system tank 10 of FIG. 1 was developed to serve homes and small businesses beyond the reach of city sewers and the system employs an extended aeration process. Similar to the treatment method used by most municipal wastewater treatment facilities, this process involves a natural, biological breakdown of the organic matter in wastewater. Wastewater enters the pretreatment chamber 100 where anaerobic bacterial action combines with the effects of gravity to precondition the waste before it flows into the aeration chamber 200. Once in the aeration chamber 200, aerobic bacteria utilize the organic matter in the wastewater to biologically convert the waste into stable substances. Following aeration, the flow is transferred to the clarification chamber 300 where the effects of gravity settle out biologically active material. A sludge return conduit 306 (seen in FIG. 3), located in the clarification chamber, creates hydraulic currents that gently transfer settled particles back to the aeration chamber 200. As clarified liquids pass through the patented Bio-Kinetic® system, they are filtered, settled and flow equalized. As a result, complete pretreatment, aeration, clarification and final filtration are assured.

In accordance with one embodiment, the wastewater treatment system tank 10 of FIG. 1 is constructed of rotationally molded, UV stabilized, high density polyethylene. In this embodiment, the integrally molded treatment chamber walls generally have a thickness of about ½" and in combination with the ribbed tank design ensure durability and maximum strength. Risers and lids are generally injection molded, and can be made of heavy duty, glass-filled polypropylene as well as other equivalent designs. All components within the system that will contact the wastewater are constructed entirely of molded plastic, stainless steel or rubber.

In FIG. 1, the pretreatment chamber 100 is an integral part of the wastewater treatment system. All domestic wastewater is preconditioned and flow equalized while passing through the pretreatment chamber 100 prior to being introduced to the extended aeration chamber 200. The outlet 136 of the pretreatment chamber is equipped with a discharge tee (not shown) that extends vertically into the liquid so that only the preconditioned equalized flow from the center area of the chamber is displaced to the extended aeration chamber 200. The discharge tee and a transfer port (not shown) between pretreatment chamber 100 and aeration chamber 200 are of adequate size to handle a peak flow factor of four without restricting the outlet 136 and disturbing hydraulic displacement to the extended aeration chamber 200. A removable inspection cover is generally incorporated into the top of the pretreatment chamber to allow tank and transfer tee inspection.

In FIG. 1, the aeration chamber 200 provides in excess of 24 hour retention of the equalized daily flow and is of sufficient size to provide a minimum of 80 cubic feet of tank capacity per pound of applied biological oxygen demand (BOD). The aeration chamber 200 is an integral part of the system flow path and configured to ensure effective mixing of microorganisms, wastewater and fresh air. No area of the chamber is isolated from process mixing, thereby eliminating dead or quiescent areas in the treatment chamber that are detrimental to the treatment process. Influent into the aeration chamber 200 is preconditioned, equalized flow from the pretreatment chamber 100 and settled solids via the Bio-Static sludge return conduit 306.

In FIG. 1, the final clarification chamber 300 consists of five (5) functionally independent zones operating together to provide satisfactory settling and clarification of the equalized flow. An inlet zone dissipates transfer turbulence at a flow inlet of the clarification chamber 300. Liquid is hydraulically displaced from an inlet zone to a sludge return zone via the sludge return conduit 306. Hydraulic currents sweep settled sludge from the ribbed walls and return these solids via the inlet zone to the aeration chamber 200. As solids are removed, liquid is displaced to a hopper zone of the clarification chamber 300, which is generally defined as the bottom third (⅓) of the clarification chamber 300. In this zone, settling by gravity takes place. Three of the four sidewalls, specifically, the back wall 331, the right wall 311 and the left wall 321, are slanted to form a hopper which directs all settled material back to the sludge return zone. Clarified liquid from the hopper zone is displaced into a final settling zone in the wastewater management system filter located just before outlet pipe to provide additional clarification of the liquid. The liquid is finally displaced to an outlet zone, which is just before the outlet of the clarification chamber 300 for final filtration and discharge from the system. Non-mechanical equalization of the flow, through all five (5) independent zones, provides optimal settling and clarification.

A benefit of the present invention is that the variety of ribs, grooves, gussets, flanges and other surfaces that comprise the wastewater treatment tank 10 of FIG. 1 act to keep the wastewater treatment tank 10 from shifting and/or rising up due to the freezing and thawing of the earth after it is installed and buried in the ground.

Figure 2:
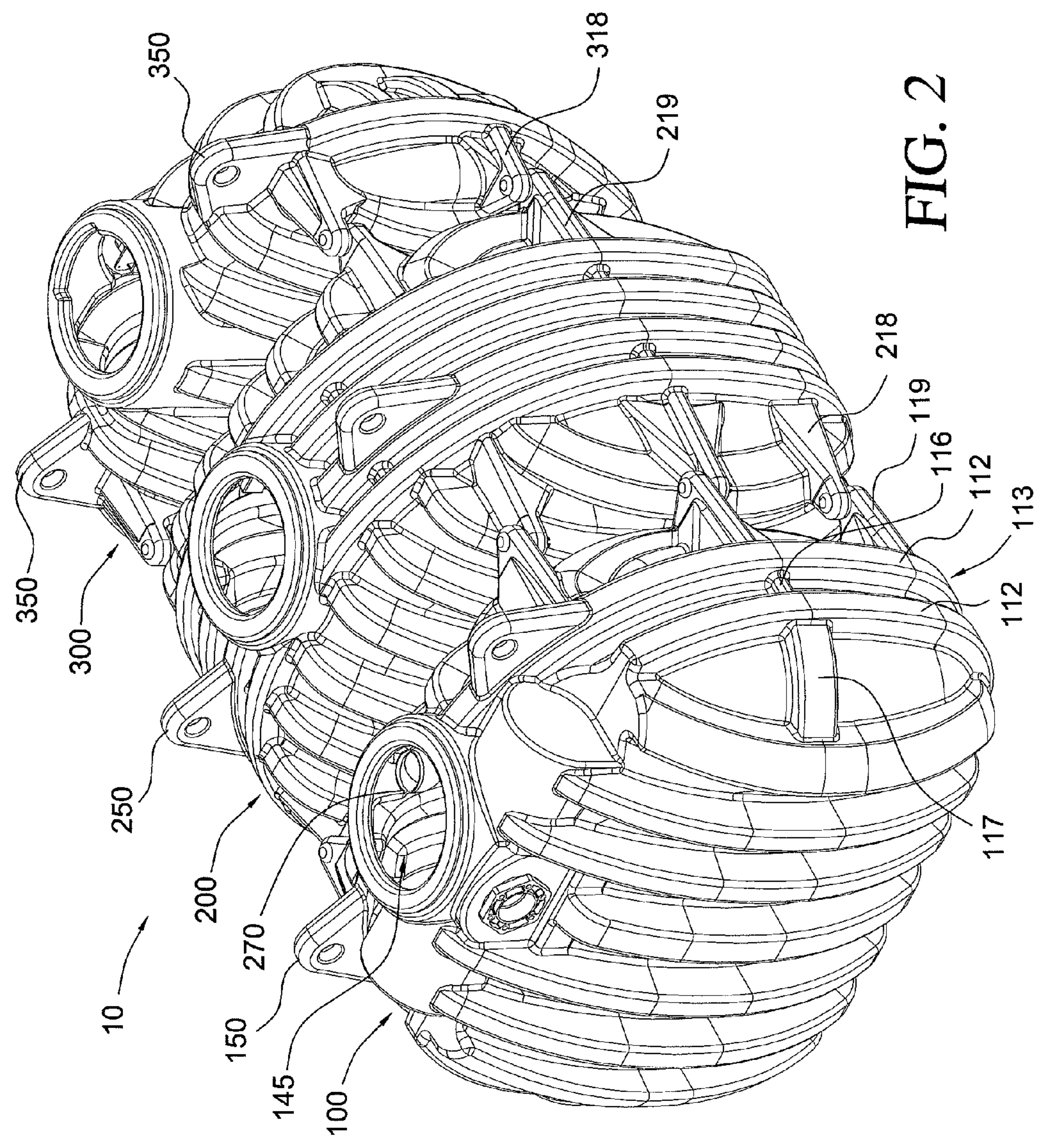
FIG. 2 is a top-perspective view of a wastewater treatment system tank with a pretreatment chamber, an aeration chamber, and a clarification chamber, in accordance with one or more embodiments of the present invention.

FIG. 2 is a top-perspective view of the wastewater treatment system tank of FIG. 1 with pretreatment chamber 100 fixedly connected to and in fluid communication with aeration chamber 200, which is fixedly connected to and in fluid communication with clarification chamber 300, in accordance with one or more embodiments of the present invention. In addition to the structures shown and described above in relation to FIG. 1, a top of a discharge tee 270 is seen through pretreatment access opening 145. Discharge tee 270 extends vertically into the liquid in pretreatment chamber 100 so that only preconditioned equalized flow from the center area of pretreatment chamber 100 is displaced to the extended aeration chamber 200. The discharge tee and transfer port are of adequate size to handle a peak flow factor of four without restricting the outlet 136 and disturbing hydraulic displacement to the extended aeration chamber 200.

FIG. 3 is a right side view of the wastewater treatment system tank of FIG. 1 with pretreatment chamber 100, aeration chamber 200, and clarification chamber 300, in accordance with one or more embodiments of the present invention. In FIG. 3, two pretreatment chamber right wall ribs 112 are separated by a pretreatment chamber right wall groove 113 and extend vertically down pretreatment chamber right wall 111 and curve around and continue across bottom wall 151 as pretreatment chamber bottom wall ribs 152, which are separated by pretreatment chamber bottom wall groove 153. The first right wall rib 112, which is nearest the pretreatment chamber front wall 101, begins at about the top of the pretreatment chamber right wall 111 and a right edge of top wall 141 that is about level with a bottom of arched portion 107. The second right wall rib 112, which is nearest the pretreatment chamber back wall 131, begins on top wall 141 and is connected to cylindrical wall 144 behind arched portion 107. A small gusset 116 is formed between the first and second right wall ribs 112 and horizontally axially aligned with gusset 117 and a bottom of the middle pretreatment chamber right wall flange 119. The gussets add lateral rigidity and strength.

In FIG. 3, four aeration chamber right wall ribs 212 are separated by three aeration chamber right wall grooves 213 and extend vertically down aeration chamber right wall 211 and curve around and continue across bottom wall 251. Each of the aeration chamber right wall ribs 212 begin on aeration chamber top wall 241 and are each connected to cylindrical wall 244. Two small gussets 216 are formed between the ribs 212, a first gusset 216 being between the first and second right wall ribs 212 and the second gusset 216 being between the third and fourth right wall ribs 212. The two small gussets 216, 216 are horizontally axially aligned with each other and a top of the middle aeration chamber right front wall flange 218 and a top of the middle aeration chamber right back wall flange 219. Three additional small gussets are formed between the ribs 212 near a right side of top wall 241, a first gusset 238 is between the first and second right wall ribs 212 and the second gusset 238 is between the third and fourth right wall ribs 212. These two small gussets 238, 238 are horizontally axially aligned with each other and above a third small gusset 239, which is located in middle groove 213 that is between the second and third right side wall ribs 212 and near a top of right side wall 211 and a right side of top wall 241.

Pretreatment chamber right back wall flanges 119 overlap aeration chamber right front wall flanges 218 and are fastened together using rivets 106 with a compressible/expandable end tabs to lock the overlapping flanges together. During installation of the rivet 106 through axially-aligned openings in the overlapping flanges, the compressible/expandable end tab is compressed to pass through the axially-aligned openings. When the compressible/expandable end tab has passed through the axially-aligned openings it expands outwardly and the tabs engage a bottom of the lower flange, thus locking the flanges together. The rivets 106 remain compressible after installation, so it is possible to disconnect chambers by compressing the bottom tabs of each rivet 106 and pushing the rivet up and out of the axially-aligned openings. Additional detail on the design of the rivets 106 is provided below in the description related to FIG. 34. FIGS. 35 to 38 show rivet 106 with locking pin that can be used instead of just rivet 106.

In FIG. 3, a single right wall rib 312 extends at an angle down clarification chamber right wall 311 toward aeration chamber 200 and ends near bottom wall 351. The right wall rib 312 begins on top wall 341 and is connected to cylindrical wall 344. At approximately a top of clarification chamber right wall 311 at a bottom of an outer edge of hoist point 350, right wall rib 312 angles away from a center line of clarification chamber 300 and extends downward and toward a bottom edge of clarification chamber front wall 301. Three gussets 317 are formed between the clarification chamber right wall rib 312 and a first rib 332 on a back wall 331 of clarification chamber 300. Each of the three gussets 317 are substantially perpendicular to and terminate against clarification chamber back wall 331 and are horizontally axially aligned with the middle clarification chamber right wall flange 318.

FIG. 4 is a left side view of a wastewater treatment system tank with pretreatment chamber 100, aeration chamber 200, and clarification chamber 300, in accordance with one or more embodiments of the present invention. Since the chambers are substantially symmetrical, FIG. 4 is essentially a mirror image of FIG. 3. In FIG. 4, two pretreatment chamber left wall ribs 122 are separated by a pretreatment chamber left wall groove 123 and extend vertically down pretreatment chamber left wall 121 and curve around and continue across bottom wall 151. The first left wall rib 122, which is nearest the pretreatment chamber front wall 101, begins at about the top of the pretreatment chamber left wall 121 and a left edge of top wall 141 that is about level with a bottom of arched portion 107. The second left wall rib 122, which is nearest the pretreatment chamber back wall 131, begins on top wall 141 and is connected to cylindrical wall 144 behind arched portion 107. A small gusset 126 is formed between the first and second left wall ribs 122 and horizontally axially aligned with gusset 127 and a bottom of the middle pretreatment chamber left wall flange 129.

In FIG. 4, four aeration chamber left wall ribs 222 are separated by three aeration chamber left wall grooves 223 and extend vertically down aeration chamber left wall 221 and curve around and continue across bottom wall 251. Each of the aeration chamber left wall ribs 222 begin on aeration chamber top wall 241 and are each connected to cylindrical wall 244. Two small gussets 226 are formed between the ribs 222, a first gusset 226 being between the first and second left wall ribs 222 and the second gusset 226 being between the third and fourth left wall ribs 222. The two small gussets 226, 226 are horizontally axially aligned with each other and a top of the middle aeration chamber left front wall flange 228 and a top of the middle aeration chamber left back wall flange 229. Three additional small gussets are formed between the ribs 222 near a left side of top wall 241, a first gusset 238 is between the first and second left wall ribs 222 and the second gusset 238 is between the third and fourth left wall ribs 222. These two small gussets 238, 238 are horizontally axially aligned with each other and above a third small gusset 239, which is located in middle groove 223 that is between the second and third left side wall ribs 222 and near a top of left side wall 221 and a left side of top wall 241.

In FIG. 4, pretreatment chamber left back wall flanges 129 overlap aeration chamber left front wall flanges 228 and are fastened together using rivets 106 with compressible/expandable end tabs either with or without locking pins (see, FIGS. 35 to 38) to lock the overlapping flanges together. During installation of the rivet through axially-aligned openings in the overlapping flanges, the compressible/expandable end tab is compressed to pass through the axially-aligned openings. When the compressible/expandable end tab has passed through the axially-aligned openings it expands outwardly and the tabs engage a bottom of the lower flange, thus locking the flanges together. The rivets 106 remain compressible after installation, so it is possible to disconnect chambers by compressing the bottom tabs of each rivet 106 and pushing the rivet up and out of the axially-aligned openings. Additional detail on the design of the rivets 106 is provided below in the description related to FIG. 34. FIGS. 35 to 38 show rivet 106 with a locking pin that can be used instead of just rivet 106.

In FIG. 4, a single left wall rib 322 extends at an angle down clarification chamber left wall 321 toward aeration chamber 200 and ends near bottom wall 351. The left wall rib 322 begins on top wall 341 and is connected to cylindrical wall 344. At approximately a top of clarification chamber left wall 321 at a bottom of an outer edge of hoist point 350, left wall rib 322 angles away from a center line of clarification chamber 300 and extends downward and toward a bottom edge of clarification chamber front wall 301. Three gussets 327 are formed between the clarification chamber left wall rib 322 and a first rib 332 on a back wall 331 of clarification chamber 300. Each of the three gussets 327 are substantially perpendicular to and terminate against clarification chamber back wall left rib 332 and are horizontally axially aligned with the middle clarification chamber left wall flange 328.

Figure 5:
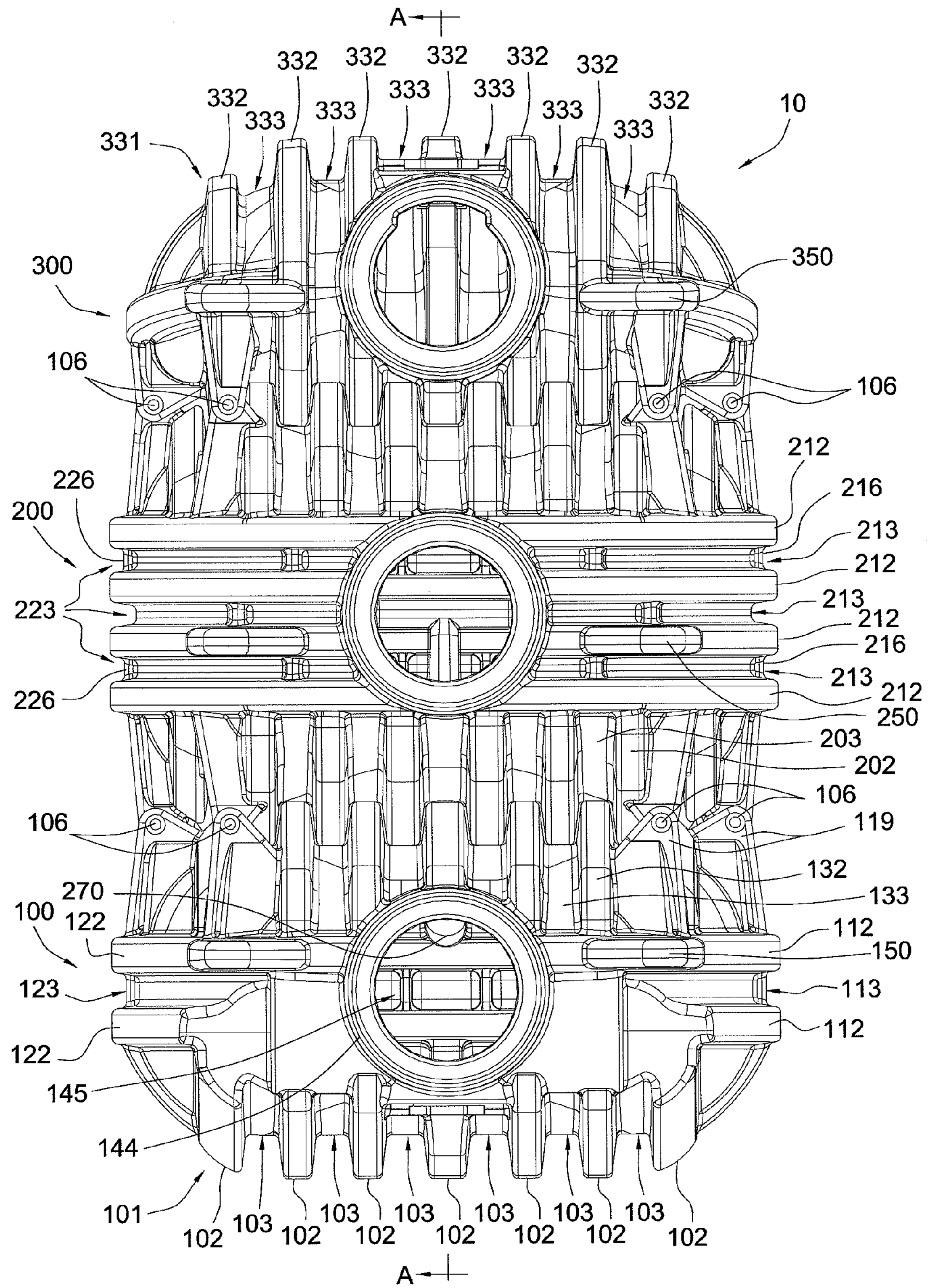
FIG. 5 is a top view of a wastewater treatment system tank with a pretreatment chamber, an aeration chamber, and a clarification chamber, in accordance with one or more embodiments of the present invention.

FIG. 5 is a top view of the wastewater treatment system tank with pretreatment chamber 100, aeration chamber 200, and clarification chamber 300 of FIG. 1, in accordance with one or more embodiments of the present invention. In FIG. 5, the top of the discharge tee 270 is seen through and below a portion of pretreatment chamber access opening 145 nearest the pretreatment chamber back wall 131. Discharge tee 270 is best seen and described below in relation to FIG. 6. As seen in FIG. 5, there are seven pretreatment chamber front wall ribs 102 spaced substantially equidistantly apart from each other and a middle one of the front wall ribs 102 being centered in the front wall 101 along line A-A. The middle pretreatment chamber front wall rib 102 begins below and adjacent to inlet means 104 and extends vertically down pretreatment chamber front wall 101 and terminates against the pretreatment chamber bottom rib 132 nearest pretreatment chamber front wall 101. The first two pretreatment chamber front wall ribs 102 immediately on either side of the middle pretreatment chamber front wall rib 102 are not as wide as the middle pretreatment chamber front wall rib 102 and begin on pretreatment chamber top wall 141 above inlet means 104 on arched portion 107 and near substantially cylindrical wall 144 and extend substantially vertically down pretreatment chamber front wall 101 and also terminate against pretreatment chamber bottom rib 132 nearest pretreatment chamber front wall 101. Two substantially vertical pretreatment chamber front wall grooves 103 are defined between the first two pretreatment chamber front wall ribs 102 and the middle pretreatment chamber front wall rib 102. The next two pretreatment chamber front wall ribs 102 are each spaced apart from one of the first two pretreatment chamber front wall ribs 102 away from the middle pretreatment chamber front wall rib 102 and have the same width as the first two pretreatment chamber front wall ribs 102. However, the next two pretreatment chamber front wall ribs 102 begin on pretreatment chamber top wall 141 a little above a horizontal middle line of inlet means 104 and near an end portion of arched portion 107 and extend substantially vertically down pretreatment chamber front wall 101 and also terminate against the pretreatment chamber bottom rib 132 nearest pretreatment chamber front wall 101. Two additional substantially vertical pretreatment chamber front wall grooves 103 are defined between the next two pretreatment chamber front wall ribs 102 and the first two pretreatment chamber front wall ribs 102. The outside two pretreatment chamber front wall ribs 102 are each spaced apart from one of the next two pretreatment chamber front wall ribs 102 away from the middle pretreatment chamber front wall rib 102 and approximately adjacent to an outside side edge of pretreatment chamber front wall 101. The outside two pretreatment chamber front wall ribs 102 have an asymmetrical shape that is different from and with a greater width than the first two, next and middle pretreatment chamber front wall ribs 102. In general, the outside two pretreatment chamber front wall ribs 102 are about twice as wide as the first two and next pretreatment chamber front wall ribs 102 and about 1½ times as wide as the middle pretreatment chamber front wall rib 102. Two final substantially vertical pretreatment chamber front wall grooves 103 are defined between the outside two pretreatment chamber front wall ribs 102 and the next two pretreatment chamber front wall ribs 102. Similarly, at the opposite end of wastewater treatment system tank 10, multiple substantially vertical clarification chamber back wall ribs 332 are seen spaced apart by multiple substantially vertical clarification chamber back wall grooves 333.

Figure 6:
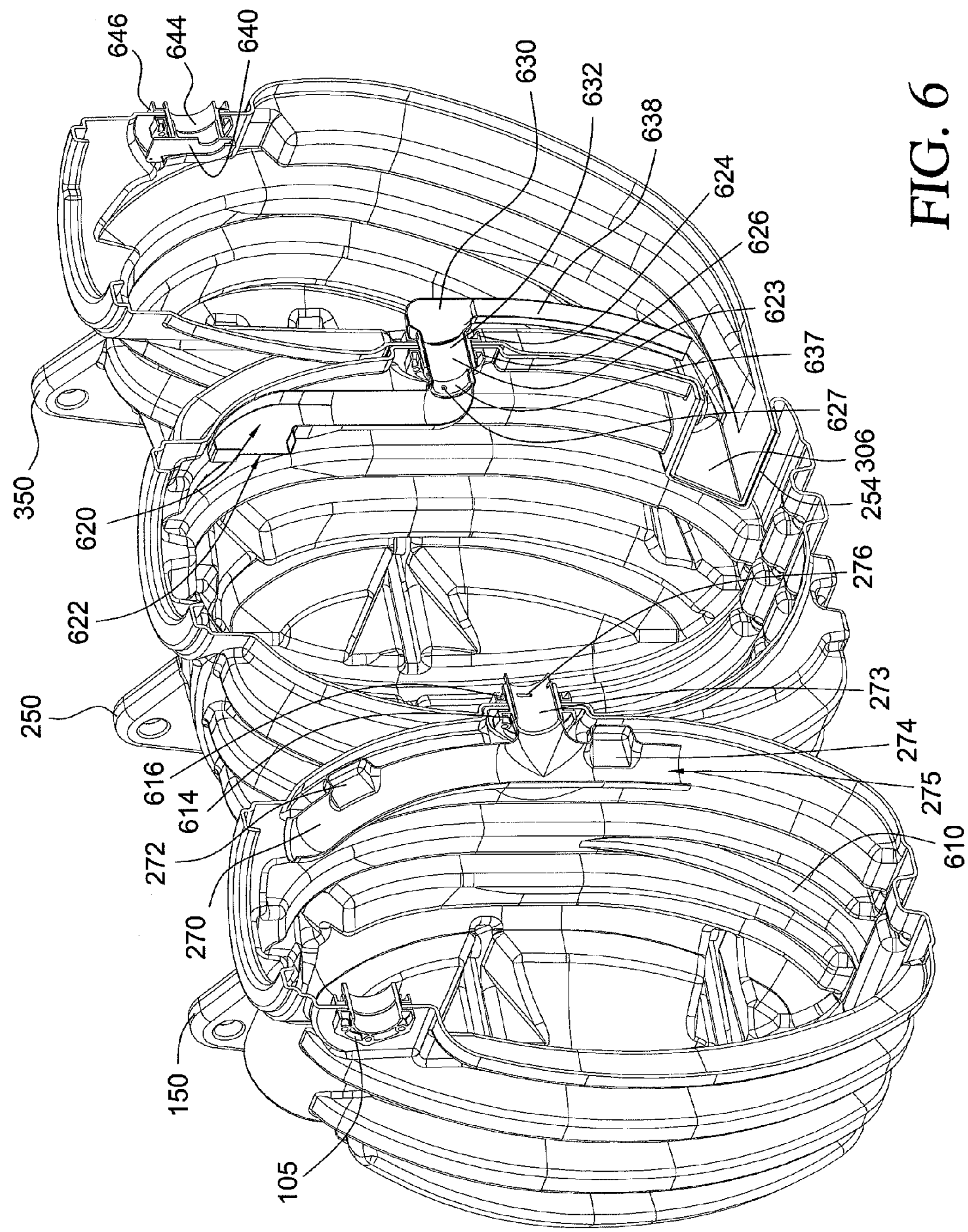
FIG. 6 is a cross-section view of the wastewater treatment system tank of FIG. 5 with a pretreatment chamber, an aeration chamber, and a clarification chamber along line A-A, in accordance with one or more embodiments of the present invention.

FIG. 6 is a cross-section view of the wastewater treatment system tank of FIG. 5 showing pretreatment chamber 100, aeration chamber 200, and clarification chamber 300 along line A-A, in accordance with one or more embodiments of the present invention. As seen in the cross section of pretreatment chamber 100, an inner, middle left reinforcing rib 610 begins in about a middle of and on the inside of a bottom of a second from the middle left side back wall groove 133 and extends down to and terminates against a back side wall of bottom wall groove 153. Although not shown in this cross-section view, inner, center and middle right reinforcing ribs also begin in about a middle of and on the inside of a bottom of a center and a second from the middle right side back wall grooves and extend down to and terminates against a back side wall of bottom wall groove. These inner, center and middle reinforcing ribs 610 provide additional internal strength and rigidity to pretreatment chamber 100. Pretreatment tee 270 is shown installed in place with its top near pretreatment chamber access opening 145, a tee portion 273 inserted into and extending through a cylindrical outlet opening 136 in substantially the center of pretreatment chamber back wall 131. Tee portion 273 is inserted into the inside of a male threaded fitting 614, which in turn is inserted through a rubber gasket on the inside of and then through a pretreatment chamber cylindrical outlet opening 136, then through an aeration chamber front wall inlet recess opening 204, another rubber gasket and finally through a female threaded fitting 616. Tee portion 273 includes a discontinuous ridge 276 circumferentially around and adjacent a distal end of tee portion 273, which engages a continuous circumferential ridge (not shown) around the inside of male threaded fitting 614. Male threaded fitting 614 and female threaded fitting 616 threadingly engage each other to hold pretreatment tee 270 in place between pretreatment chamber 100 and aeration chamber 200. Pretreatment tee 270 also includes two stabilizing supports that fit within the inside of the pretreatment chamber back wall middle rib 132. A top stabilizing support 272 is near the top of pretreatment tee 270 and fits within a top portion of pretreatment chamber back wall middle rib 132, and a bottom stabilizing support 274 that is located below the tee portion but above a bottom inlet 275 of pretreatment tee 270 and fits within a portion of pretreatment chamber back wall middle rib 132 just below pretreatment chamber cylindrical outlet opening 136.

In FIG. 6, a sludge return inlet 620 is seen extending from a top inlet opening 622 that is positioned near the top of aeration chamber 200 and extends downwardly to a perpendicular bottom portion 623 of sludge return inlet 620. Sludge return inlet perpendicular bottom portion 623 is inserted through a female threaded fitting 626 and a rubber gasket on the inside of and then through an aeration chamber cylindrical recess outlet opening 236, a clarification chamber front wall inlet connector recess opening 204, another rubber gasket and then into the inside of a threaded end of a male threaded fitting 624. Both aeration chamber cylindrical recess outlet opening 236 and clarification chamber front wall inlet connector recess opening 304 are located in substantially the middle of either a back wall or a front wall of their respective chambers. A perpendicular connector portion 632 of a sludge return 630 is inserted from clarification chamber 300 inside male threaded fitting 624 from a non-threaded end of male threaded fitting 624 and around the outside of sludge return inlet perpendicular bottom portion 623 until a substantially semicircular detent 627 engages a substantially circular opening 637 defined in sludge return extension perpendicular connector portion 632. Male threaded fitting 624 and female threaded fitting 626 threadingly engage each other to hold sludge return inlet 620 and sludge return 630 in place between aeration chamber 200 and clarification chamber 300. Sludge return 630 includes a downwardly depending extension 638 that extends toward and has an open end that permits sludge to flow into sludge return conduit 306 portion of clarification chamber 300. Sludge return conduit 306 matingly fits with an aeration chamber transfer port 254 formed in a bottom portion of aeration chamber back wall 231 to form a leak proof seal between sludge return conduit 306 and aeration chamber transfer port 254. Sludge return 630 may include a Bio-Static® sludge return 630 manufactured by Norweco, Inc. of Norwalk Ohio that is securely installed in the aeration/clarification chamber to provide return of settled solids. Aeration chamber hydraulic currents enter the sludge return inlet 620 and are directed through the sludge return 630 into the clarification chamber. The hydraulic currents containing re-suspended sludge are directed through the sludge return 630 and downwardly depending extension 638 and back to the aeration chamber through sludge return conduit 306 for additional treatment. The Bio-Static® sludge return 630 accomplishes re-suspension and return of settled solids without disturbing the contents of the clarification chamber. It has no moving parts and does not require service.

In FIG. 6, an outlet coupling 640 is inserted though an inside of a female threaded fitting 646, a first rubber gasket (not shown), an outlet discharge opening 336 defined in a top portion of the clarification chamber back wall, a second rubber gasket (not shown), and into the inside of a male threaded fitting 644. Male threaded fitting 644 and female threaded fitting 646 frictionally and threadingly engage each other to hold outlet coupling 640 in place against clarification chamber 300. Alternatively, the male threaded fitting 644 and female threaded fitting 646 being threadingly engaged, they also can be solvent-welded together to form a permanent connection.

Figure 7:
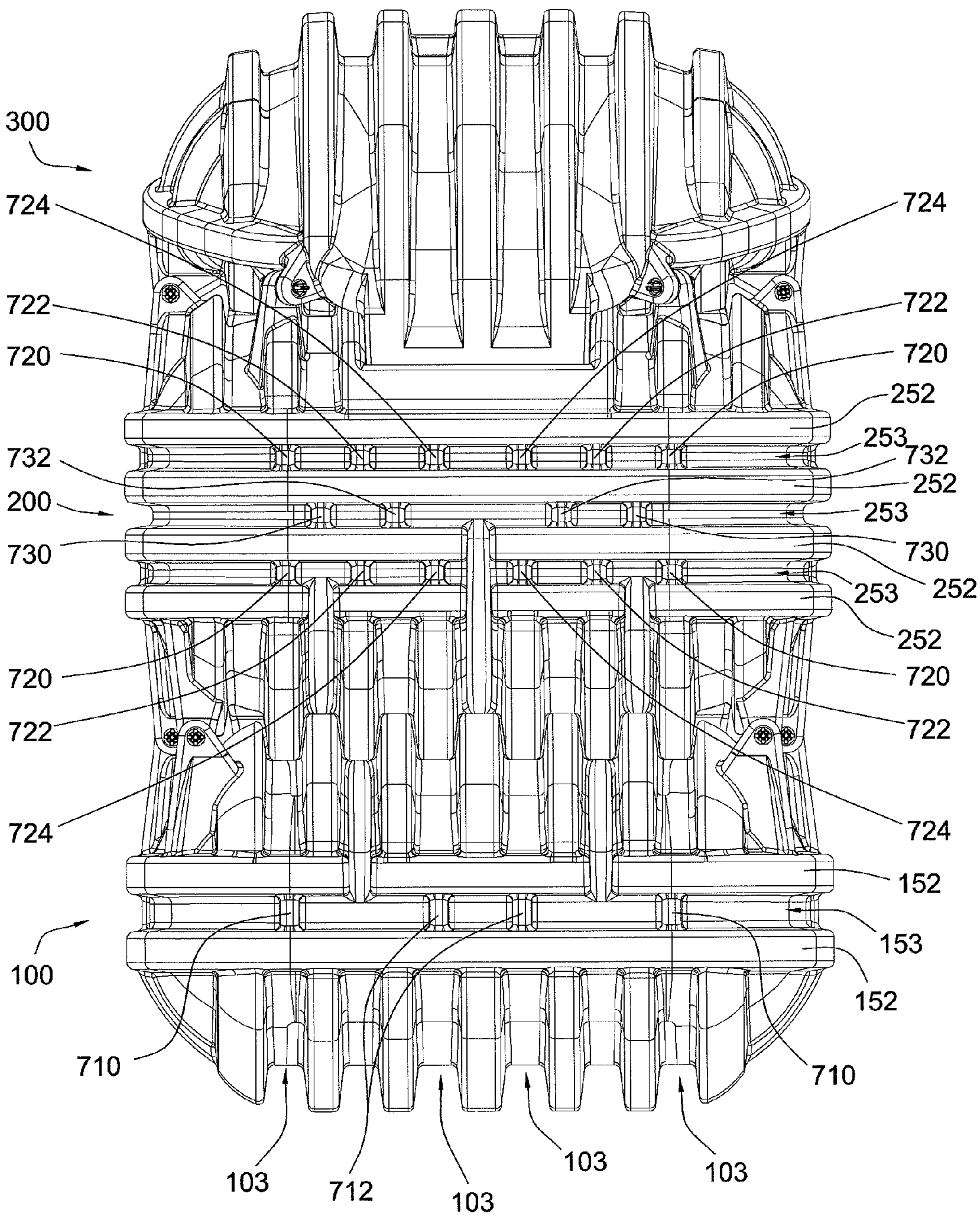
FIG. 7 is a bottom view of a wastewater treatment system tank with a pretreatment chamber, an aeration chamber, and a clarification chamber, in accordance with one or more embodiments of the present invention.

FIG. 7 is a bottom view of a wastewater treatment system tank with pretreatment chamber 100, aeration chamber 200, and clarification chamber 300, in accordance with one or more embodiments of the present invention. In FIG. 7, four small gussets are formed across pretreatment chamber bottom wall groove 153 and between pretreatment chamber bottom wall ribs 152. Two outside small gussets 710 are each formed in pretreatment chamber bottom wall groove 153 to be substantially in line with the outermost pretreatment chamber front wall grooves 103. Two inside small gussets 712 are each formed in pretreatment chamber bottom wall groove 153 to be substantially in line with the innermost pretreatment chamber front wall grooves 103.

Similarly, in FIG. 7, sixteen small gussets are formed across aeration chamber bottom wall grooves 253 and between aeration chamber bottom wall ribs 252. In each of the two outside aeration chamber bottom wall grooves 253, six small gussets are formed and located in a substantially evenly spaced arrangement. Specifically, two outside small gussets 720 are each formed in aeration chamber bottom wall groove 253 that is nearest to the pretreatment chamber 100 and substantially in line with the outermost full-length aeration chamber front wall ribs 202. Two middle small gussets 722 are each formed in the same aeration chamber bottom wall groove 253 that is nearest to the pretreatment chamber 100 as small gussets 720 and substantially in line with the second to outermost full-length aeration chamber front wall ribs 202. Two inside small gussets 724 are each formed in the same aeration chamber bottom wall groove 253 that is nearest to the pretreatment chamber 100 as small gussets 720 and 722 and substantially in line with the innermost full-length aeration chamber front wall ribs 202. Likewise, two outside small gussets 720 are each formed in aeration chamber bottom wall groove 253 that is nearest to the clarification chamber 300 and substantially in line with the outermost full-length aeration chamber back wall ribs 232. Two middle small gussets 722 are each formed in the same aeration chamber bottom wall groove 253 that is nearest to the clarification chamber 300 as small gussets 720 and substantially in line with the second to outermost full-length aeration chamber back wall ribs 232. Two inside small gussets 724 are each formed in the same aeration chamber bottom wall groove 253 that is nearest to the clarification chamber 300 as small gussets 720 and 722 and substantially in line with the innermost full-length aeration chamber back wall ribs 232. Finally, four small gussets are each formed in the middle aeration chamber bottom wall groove 253 and staggered apart from the above described small gussets 720, 722 and 724 so that two outside small gussets 730 and two inside small gussets 732 are substantially in line with the grooves 203 or 233 between ribs 202 or 232, respectively.

Figure 8:
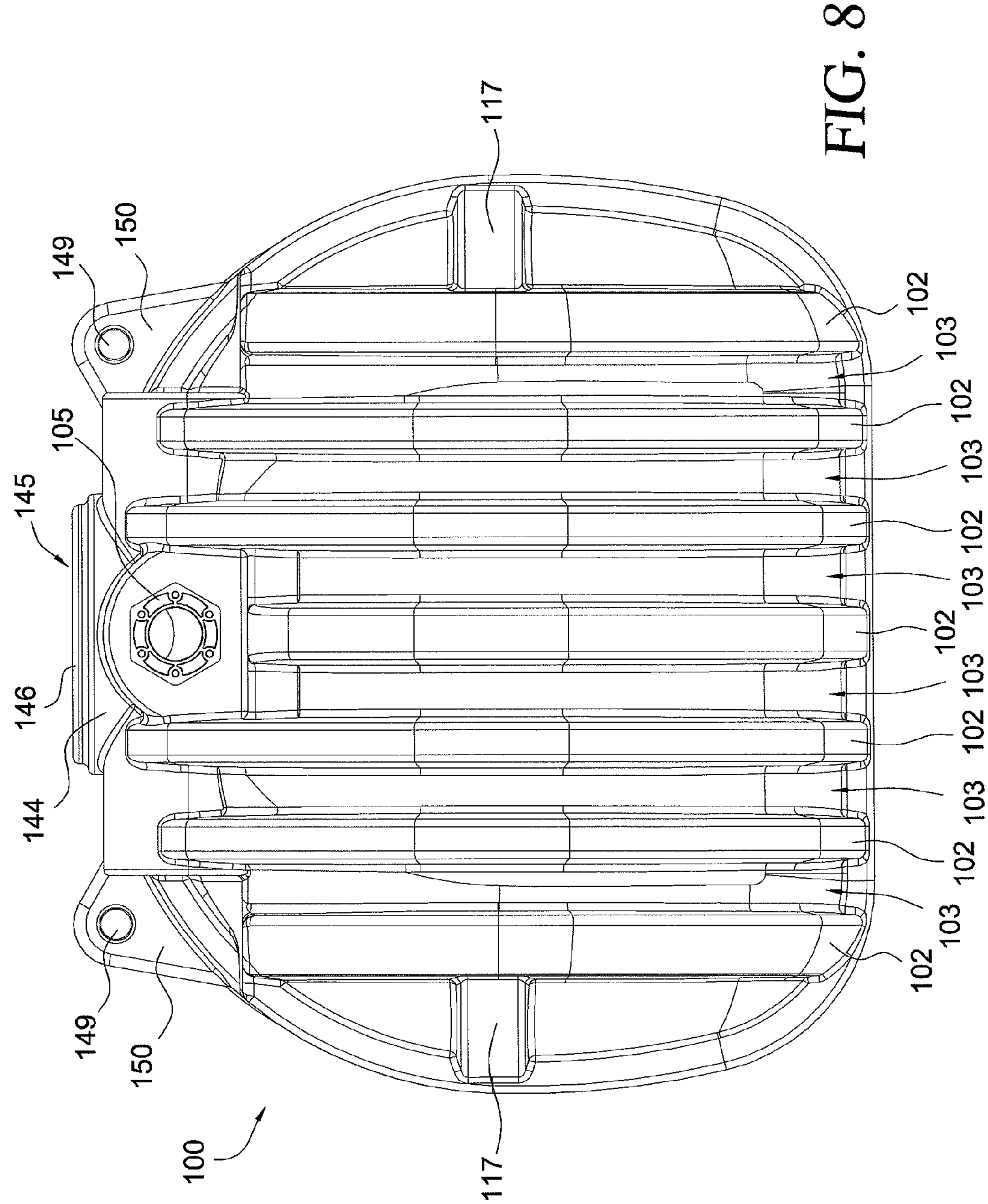
FIG. 8 is an end view of a pretreatment chamber end of a wastewater treatment system tank, in accordance with one or more embodiments of the present invention.

FIG. 8 is an end view of a pretreatment chamber end of a wastewater treatment system tank, in accordance with one or more embodiments of the present invention. In FIG. 8, an enlarged, close up view of the pretreatment chamber front wall 101 is provided to better illustrate the construction of the pretreatment chamber.

Figure 9:
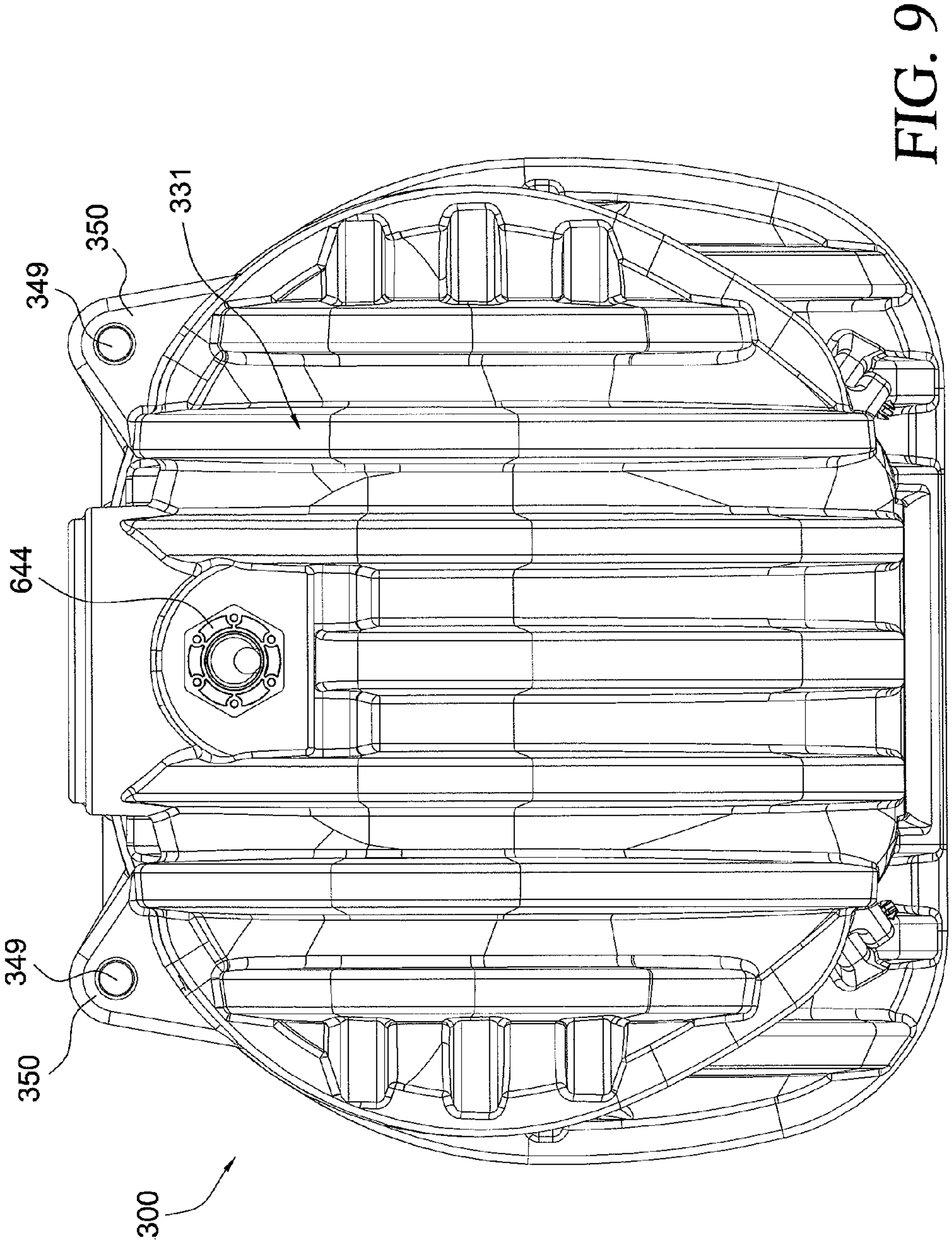
FIG. 9 is an end view of a clarification chamber end of a wastewater treatment system tank, in accordance with one or more embodiments of the present invention.

FIG. 9 is an end view of a clarification chamber end of a wastewater treatment system tank, in accordance with one or more embodiments of the present invention. In FIG. 9, an enlarged, close up view of the clarification chamber back wall 331 is provided to better illustrate the construction of the clarification chamber.

Figure 10:
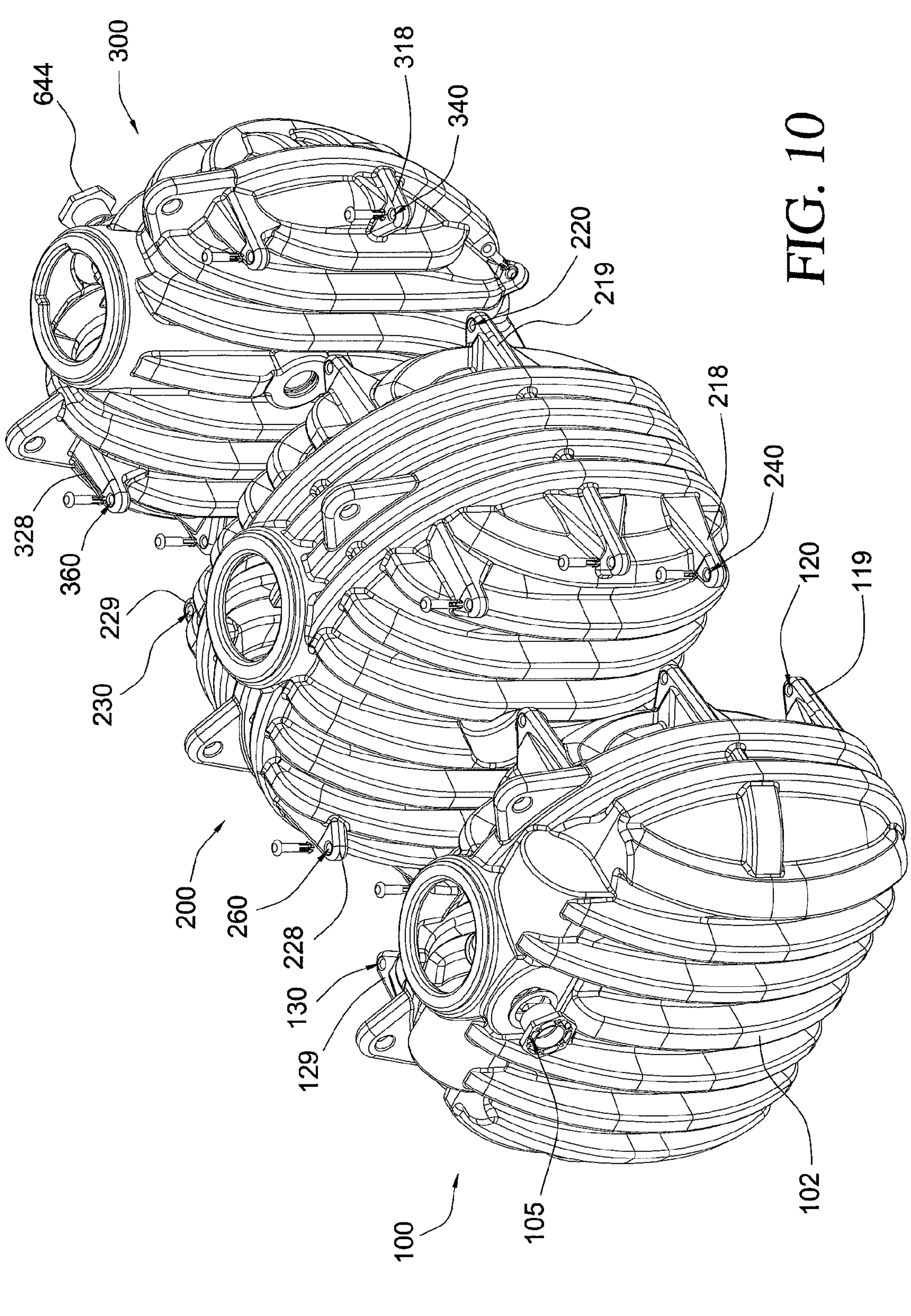
FIG. 10 is a top-perspective, exploded view of a wastewater treatment system tank showing a pretreatment chamber on the left, an aeration chamber in the middle, and a clarification chamber on the right, in accordance with one or more embodiments of the present invention.

FIG. 10 is a top-perspective, exploded view of a wastewater treatment system tank showing pretreatment chamber 100 on the left, aeration chamber 200 in the middle, and clarification chamber 300 on the right, in accordance with one or more embodiments of the present invention. In FIG. 10, each of the pretreatment chamber back wall right connector flange 119 has formed in it a pretreatment chamber back wall right connector flange opening 120, and each of the pretreatment chamber back wall left connector flange 129 has formed in it a pretreatment chamber back wall left connector flange opening 130. Each of the aeration chamber front wall right connector flange 218 has formed in it an aeration chamber front wall right connector flange opening 240, and each of the aeration chamber front wall left connector flange 228 has formed in it an aeration chamber front wall left connector flange opening 260. Each of the aeration chamber back wall right connector flange 219 has formed in it an aeration chamber back wall right connector flange opening 220, and each of the aeration chamber back wall left connector flange 229 has formed in it an aeration chamber back wall left connector flange opening 230 (best seen in FIG. 12). Each of the clarification chamber front wall right connector flange 318 has formed in it a clarification chamber front wall right connector flange opening 340, and each of the clarification chamber front wall left connector flange 328 has formed in it a clarification chamber front wall left connector flange opening 360. As described elsewhere herein, when the pretreatment chamber 100 is connected to the aeration chamber 200, the aeration chamber 200 is connected to the clarification chamber 300, and the connector flanges align so that their respective flange openings are coaxially aligned, then rivets 106 or rivets 106 and locking pins (see, FIGS. 35 to 38) may be inserted through the flange openings in both connector flanges to secure the chambers together.

Figure 11:
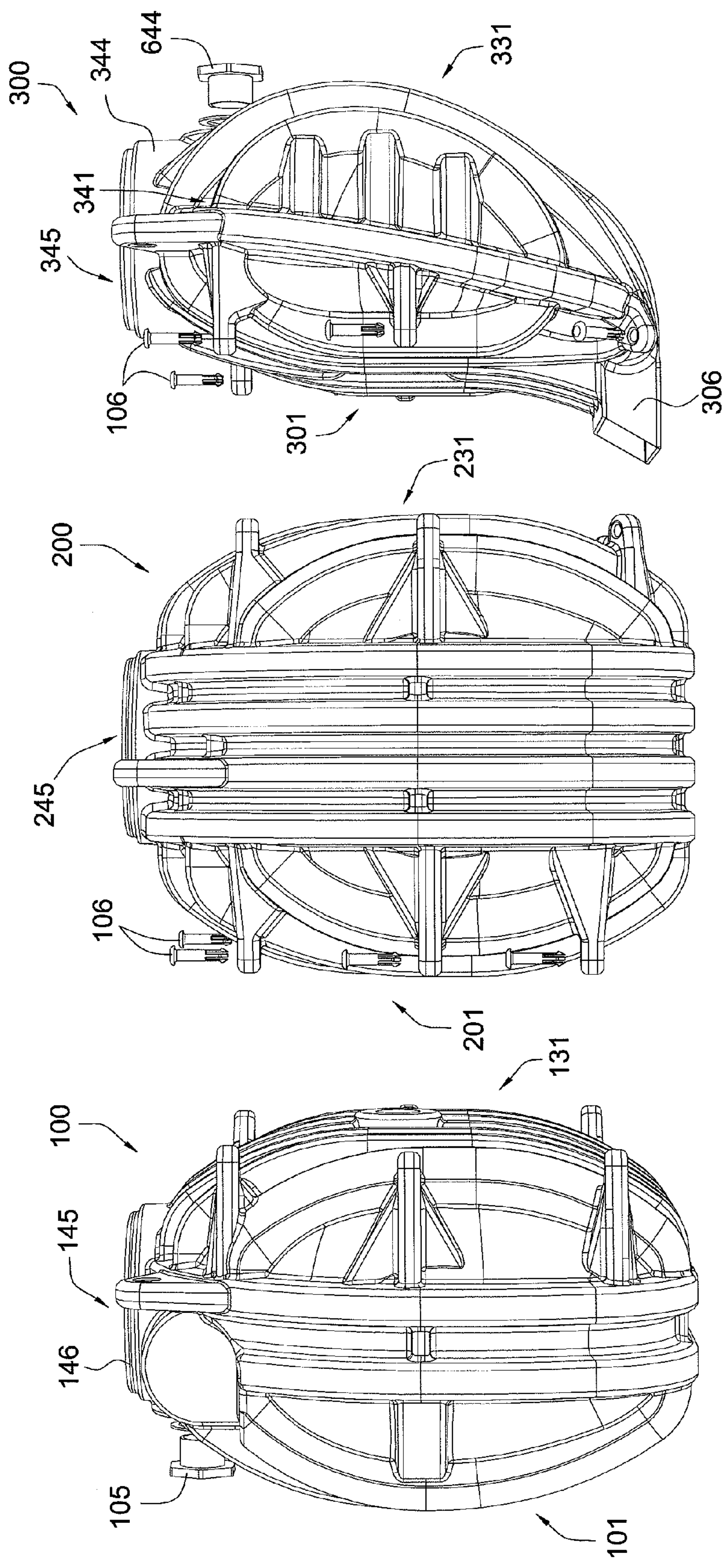
FIG. 11 is a right side, exploded view of a wastewater treatment system tank with a pretreatment chamber, an aeration chamber, and a clarification chamber, in accordance with one or more embodiments of the present invention.

FIG. 11 is a right side, exploded view of a wastewater treatment system tank with pretreatment chamber 100, aeration chamber 200, and clarification chamber 300, in accordance with one or more embodiments of the present invention. In FIG. 11, the shape and size similarities and differences of the three different chambers are more clearly illustrated. For example, it is clear that all three chambers possess a generally oblate spheroid shape with similar heights, but varying widths and slightly different detailed features, which are described herein.

Figure 12:
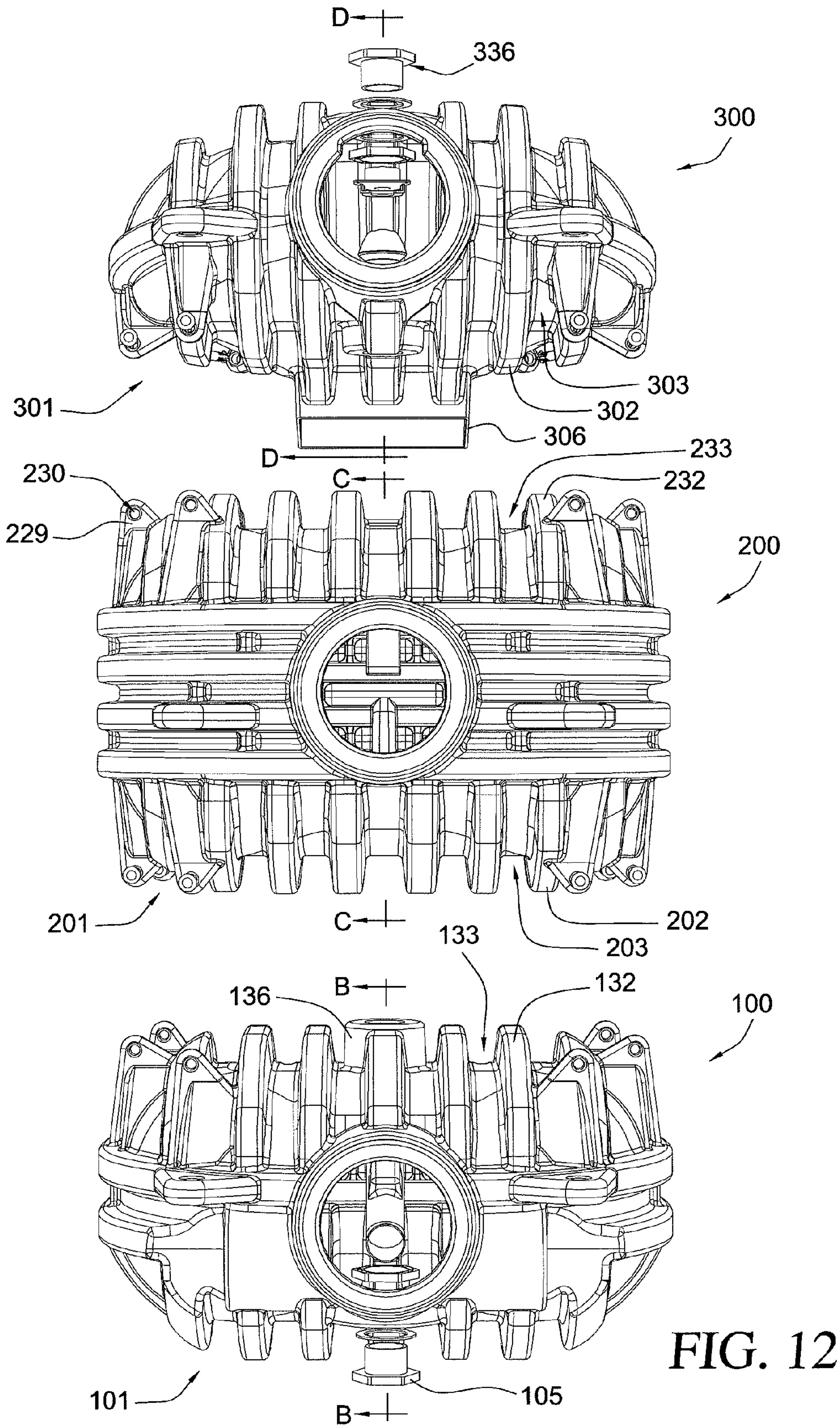
FIG. 12 is a top, exploded view of a wastewater treatment system tank with a pretreatment chamber, an aeration chamber, and a clarification chamber, in accordance with one or more embodiments of the present invention.

FIG. 12 is a top, exploded view of a wastewater treatment system tank with pretreatment chamber 100, aeration chamber 200, and clarification chamber 300, in accordance with one or more embodiments of the present invention. In FIG. 12, sludge return conduit 306 can be clearly seen extending from the bottom of clarification chamber 300 toward aeration chamber 200. It can be clearly seen in FIG. 12 that the ribs 132 and grooves 133 on the back wall 131 of pretreatment chamber 100 are offset from the ribs 202 and grooves 203 on the front wall 201 of aeration chamber 200 to permit back wall pretreatment chamber ribs 132 to slide into front wall aeration chamber grooves 203 and front wall aeration chamber ribs 202 to slide into back wall pretreatment chamber grooves 133 when pretreatment chamber 100 and aeration chamber 200 are pushed together. In addition, pretreatment chamber back wall cylindrical outlet 136 extends outwardly away from pretreatment chamber back wall 131, and is positioned to slide into and mate with aeration chamber front wall cylindrical inlet connector recess opening 204 at the same time the ribs 132, 202 and grooves 133, 203 of the pretreatment chamber back wall 131 and aeration chamber front wall 201 are pushed together.

In FIG. 12, the same can be said for ribs 232 and grooves 233 on the back wall 231 of aeration chamber 200 are offset from the ribs 302 and grooves 303 on the front wall 301 of clarification chamber 300 to permit back wall aeration chamber ribs 232 to slide into front wall clarification chamber grooves 303 and front wall clarification chamber ribs 302 to slide into back wall aeration chamber grooves 233 when aeration chamber 200 and clarification chamber 300 are pushed together. In addition, aeration chamber back wall cylindrical outlet 236 extends outwardly away from aeration chamber back wall 231, and is positioned to slide into and mate with clarification chamber front wall cylindrical inlet 304 at the same time the ribs 232, 302 and grooves 233, 303 of the aeration chamber back wall 231 and clarification chamber front wall 301 are pushed together.

Figure 13:
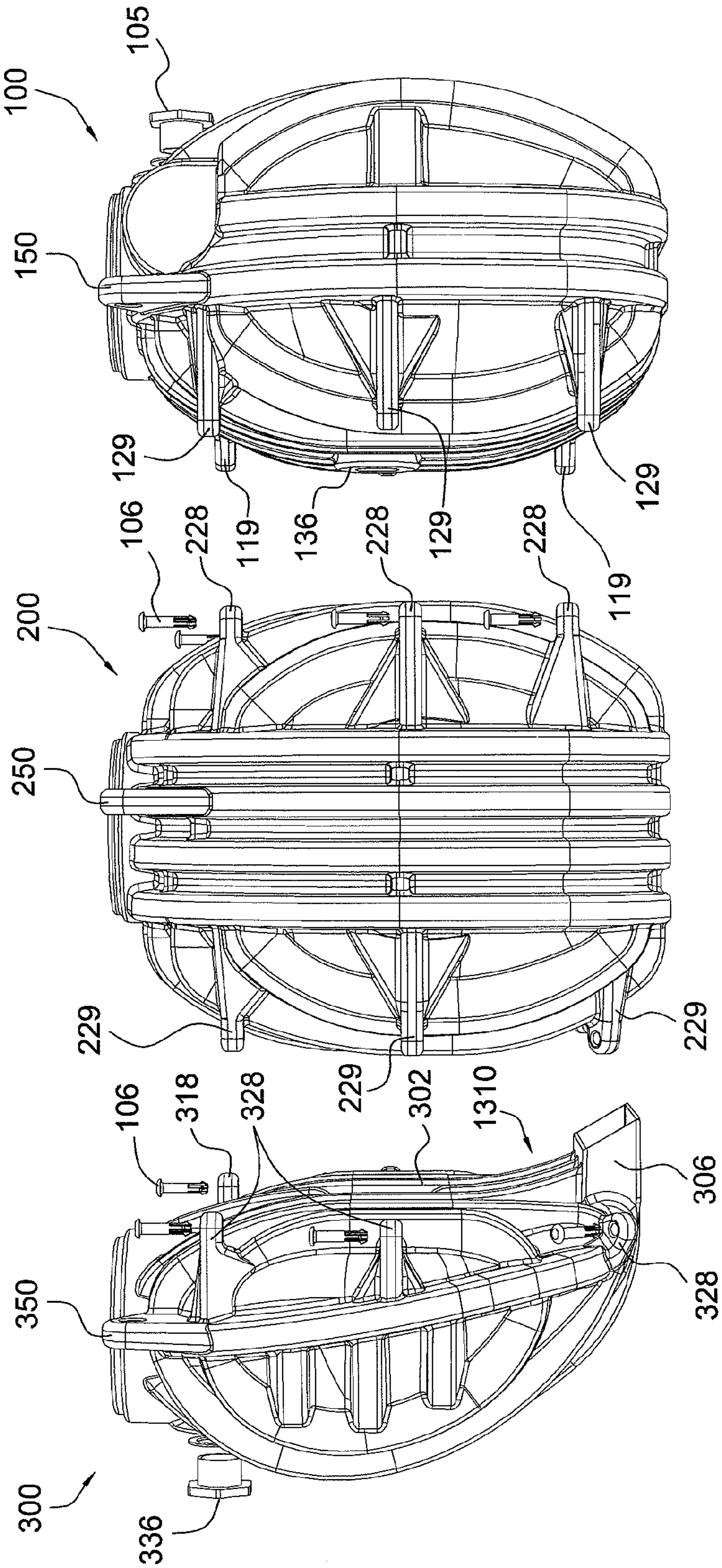
FIG. 13 is a left side, exploded view of a wastewater treatment system tank with a pretreatment chamber, an aeration chamber, and a clarification chamber, in accordance with one or more embodiments of the present invention.

FIG. 13 is a left side, exploded view of a wastewater treatment system tank with pretreatment chamber 100, aeration chamber 200, and clarification chamber 300, in accordance with one or more embodiments of the present invention. As shown in FIG. 13, sludge return conduit 306 has a substantially rectangular shape with an angled opening open toward aeration chamber 200 and sludge return conduit 306 extends outwardly from the bottom of clarification chamber 300 toward aeration chamber 200. Sludge return conduit 306 is configured to be inserted into and form a leak-proof seal with aeration chamber transfer port (see FIG. 6 reference number 254). Clarification chamber front wall ribs 302 have outwardly curving bottom portions 1310 that terminate on a top of sludge return conduit 306 to provide additional rigidity and stability to sludge return 306 and to help direct sludge into sludge return conduit 306 (see FIG. 20 for a cross-section view of clarification chamber 300 that clearly illustrates the forward curve of the inner walls of ribs 302).

Figure 14:
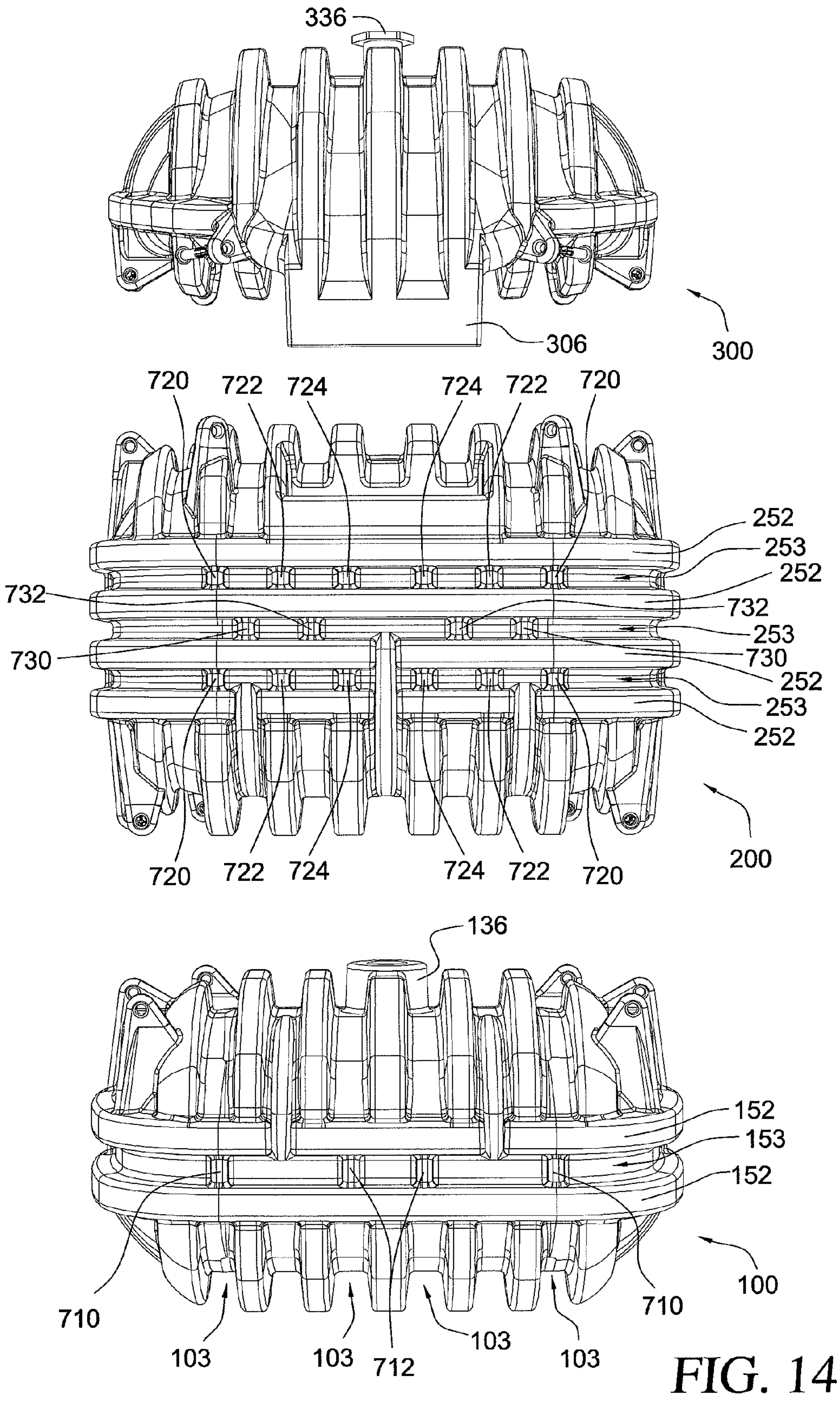
FIG. 14 is a bottom, exploded view of a wastewater treatment system tank with a pretreatment chamber, an aeration chamber, and a clarification chamber, in accordance with one or more embodiments of the present invention.

FIG. 14 is a bottom, exploded view of the wastewater treatment system tank of FIG. 7 with pretreatment chamber 100, aeration chamber 200, and clarification chamber 300, in accordance with one or more embodiments of the present invention. In FIG. 14, the staggered arrangement of the pretreatment chamber back ribs 132 with the aeration chamber front grooves 203 and the staggered arrangement of the aeration chamber back ribs 232 with the clarification chamber front grooves 303 is once again shown.

Figure 15:
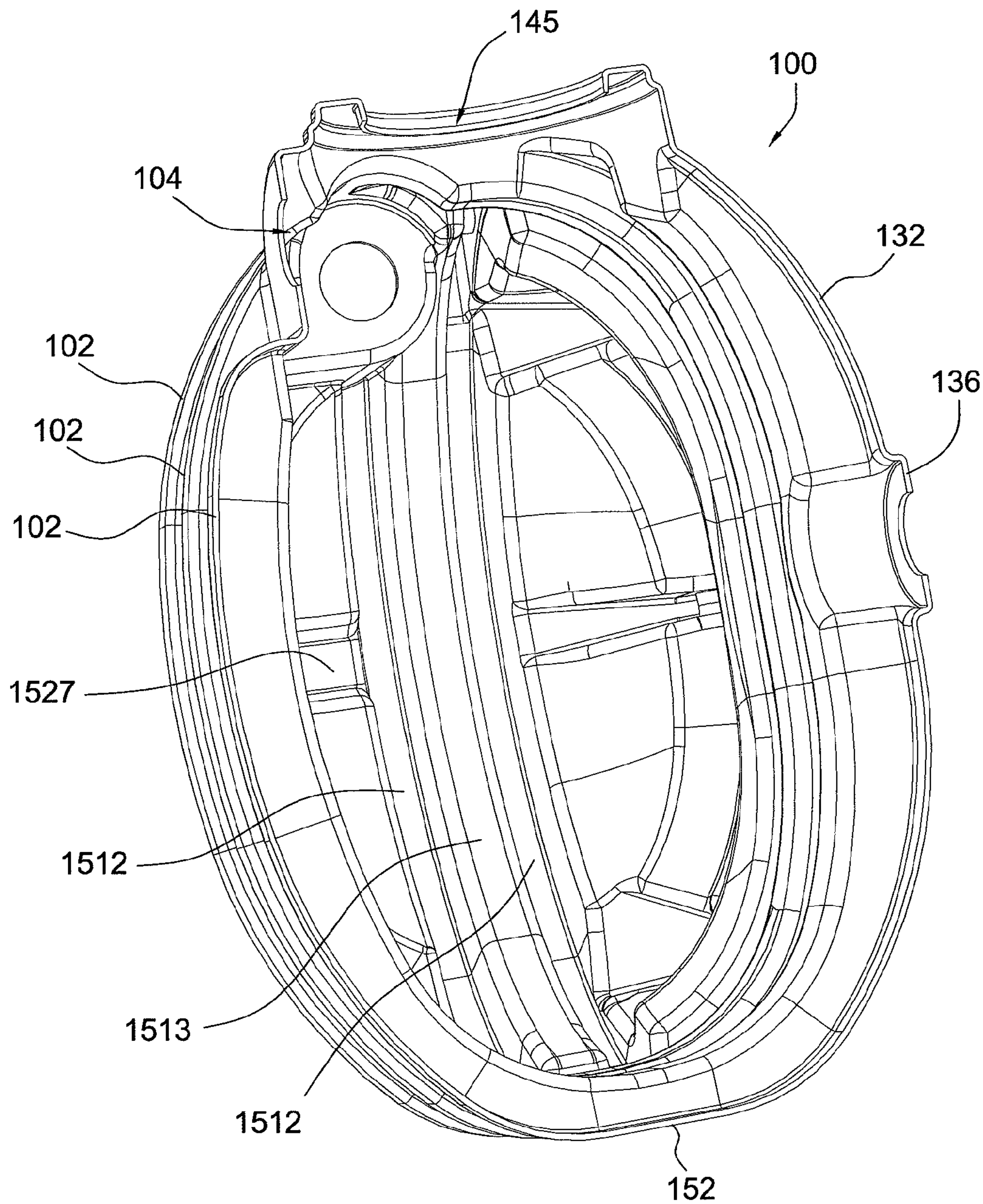
FIG. 15 is a cross-section view of the pretreatment chamber of the wastewater treatment system tank of FIG. 12 along line B-B, in accordance with one or more embodiments of the present invention.

FIG. 15 is a cross-sectional view of a pretreatment chamber 100 of the wastewater treatment system tank of FIG. 12 along line B-B, in accordance with one or more embodiments of the present invention. In FIG. 15, an inside rib 1513, which is the inside of left side wall groove 123, is shown between two inside grooves 1512, which are the inside of left side wall ribs 122. An inside indent 1527 is shown originating from a left side of the left-most of the two inside grooves 1512 and extending perpendicularly therefrom toward ribs 102. Inside indent 1527 is the inside of left wall side gusset 127.

Figure 16:
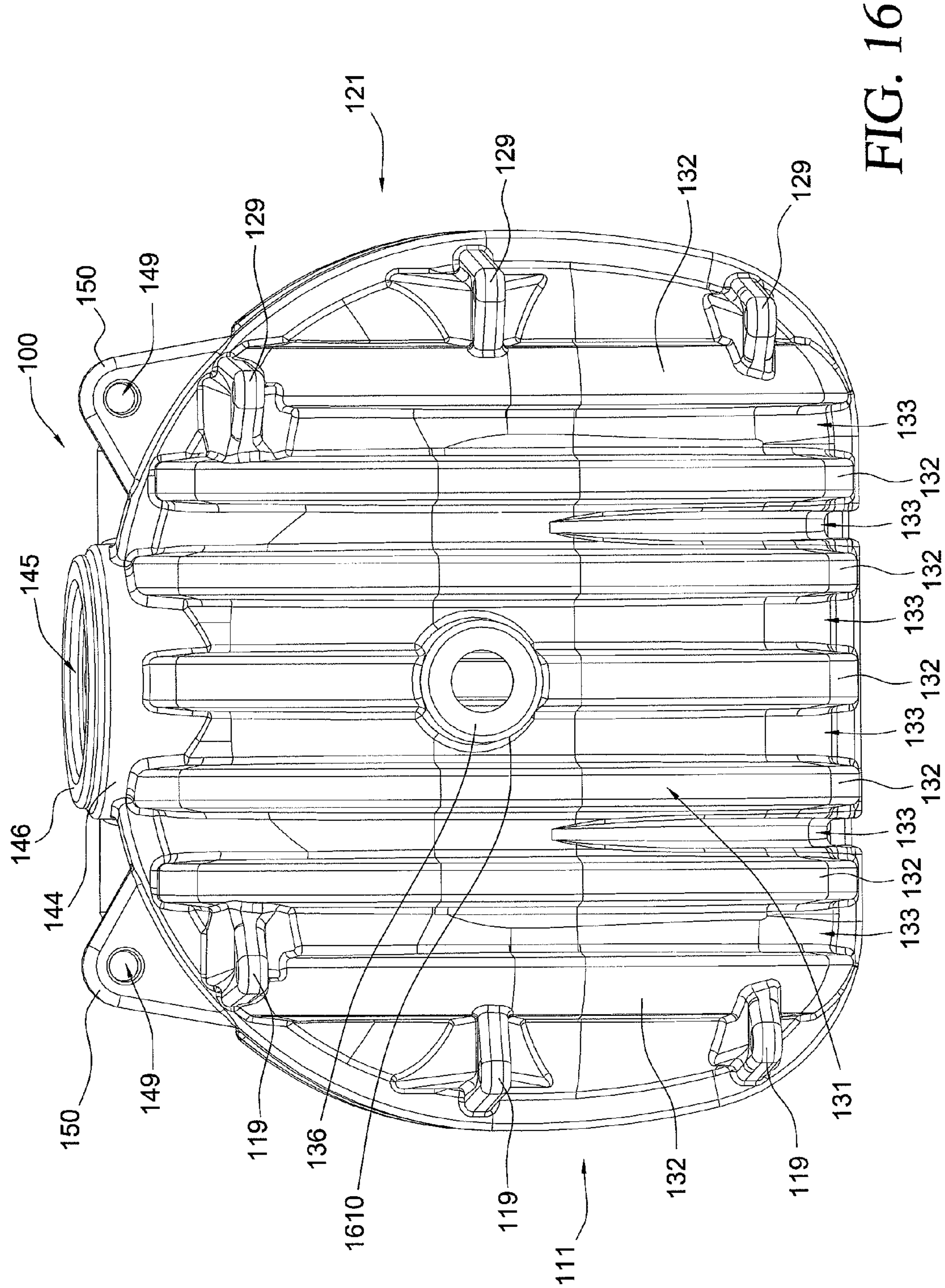
FIG. 16 is a back view of the pretreatment chamber of the wastewater treatment system tank of FIG. 12, in accordance with one or more embodiments of the present invention.

FIG. 16 is a back view of the pretreatment chamber 100 of the wastewater treatment system tank of FIG. 12, in accordance with one or more embodiments of the present invention. In FIG. 16, there are a total of seven, vertical back wall ribs 132 that are spaced apart by six, vertical back wall grooves 133. A center one of the seven back wall ribs 132 is aligned with and interrupted by back wall cylindrical outlet 136. The center back wall rib 132 is about 1.75 times as wide as the next two back wall ribs 132 to the left of center back wall rib 132 and to the next two back wall ribs 132 to the right of center back wall rib 132. The two outermost back wall ribs 132 are about 2 times as wide as the non-center back wall ribs. The center back wall rib 132 includes a raised annular portion 1610 is formed around and coaxially aligned with the back wall cylindrical outlet 136. The raised annular portion 1610 provides the necessary clearance for back wall cylindrical outlet 136 to connect to aeration chamber front wall cylindrical inlet connector recess opening 204 when the pretreatment chamber 100 and aeration chamber 200 are joined together. The set of three spaced-apart, back right connector flanges 119 extend from between pretreatment chamber right wall 111 and pretreatment chamber back wall 131 in a substantially horizontal plane away from pretreatment chamber back wall 131. Likewise, another set of three spaced-apart, back left connector flanges 129 extend from between pretreatment chamber left wall 121 and pretreatment chamber back wall 131 in a substantially horizontal plane away from pretreatment chamber back wall 131.

Figure 17:
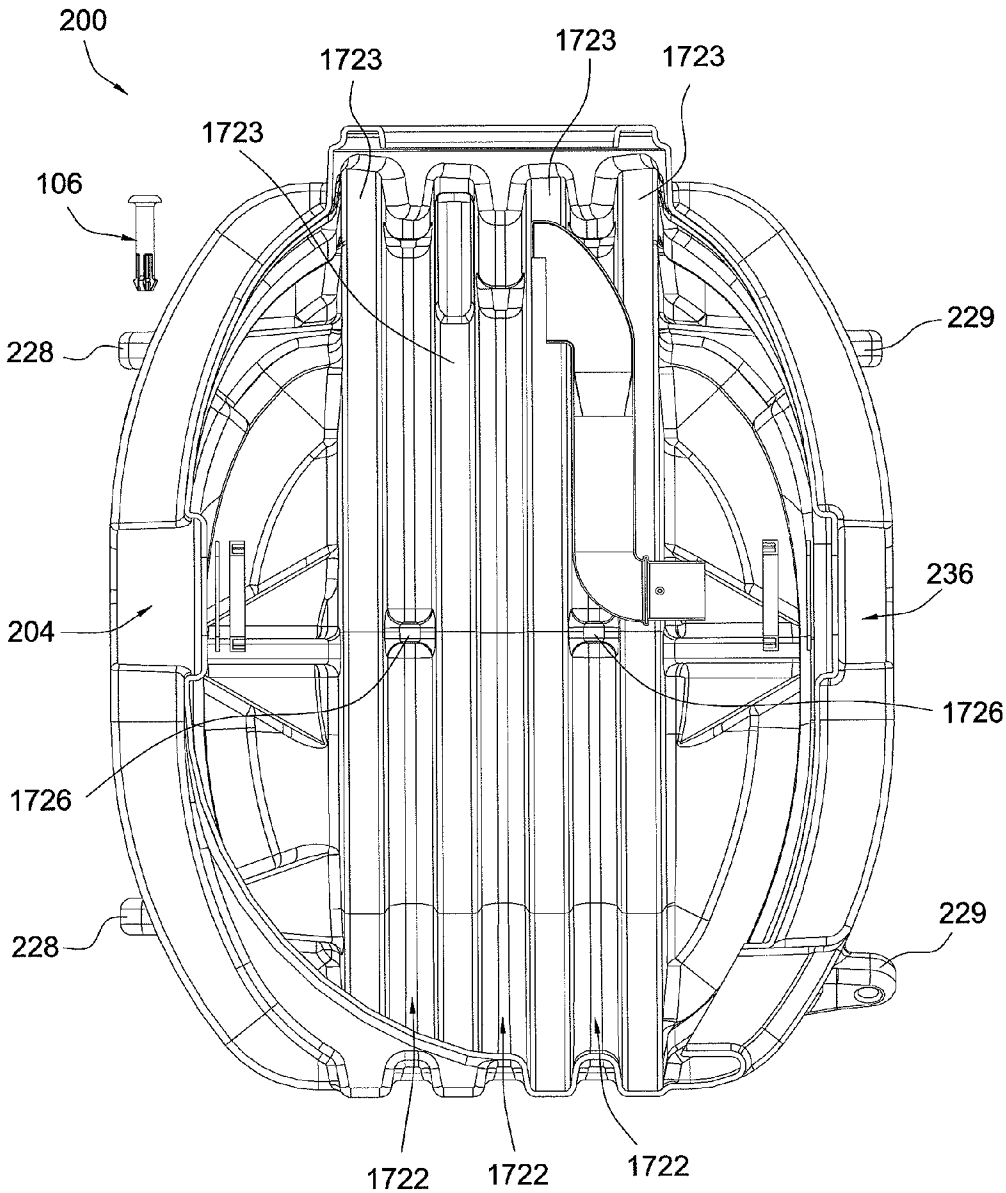
FIG. 17 is a partially-exploded, cross-section view of an aeration chamber of the wastewater treatment system tank of FIG. 12 along line C-C, in accordance with one or more embodiments of the present invention.

FIG. 17 is a partially-exploded, cross-section view of an aeration chamber 200 of the wastewater treatment system tank of FIG. 12 along line C-C, in accordance with one or more embodiments of the present invention. In FIG. 17, an inside rib 1723, which is the inside of left side wall groove 223, is shown between two inside grooves 1722, which are the inside of left side wall ribs 222. Two inside small gussets 1726 are shown, one each extending between the two left-most of the two inside ribs 1723.

Figure 18:
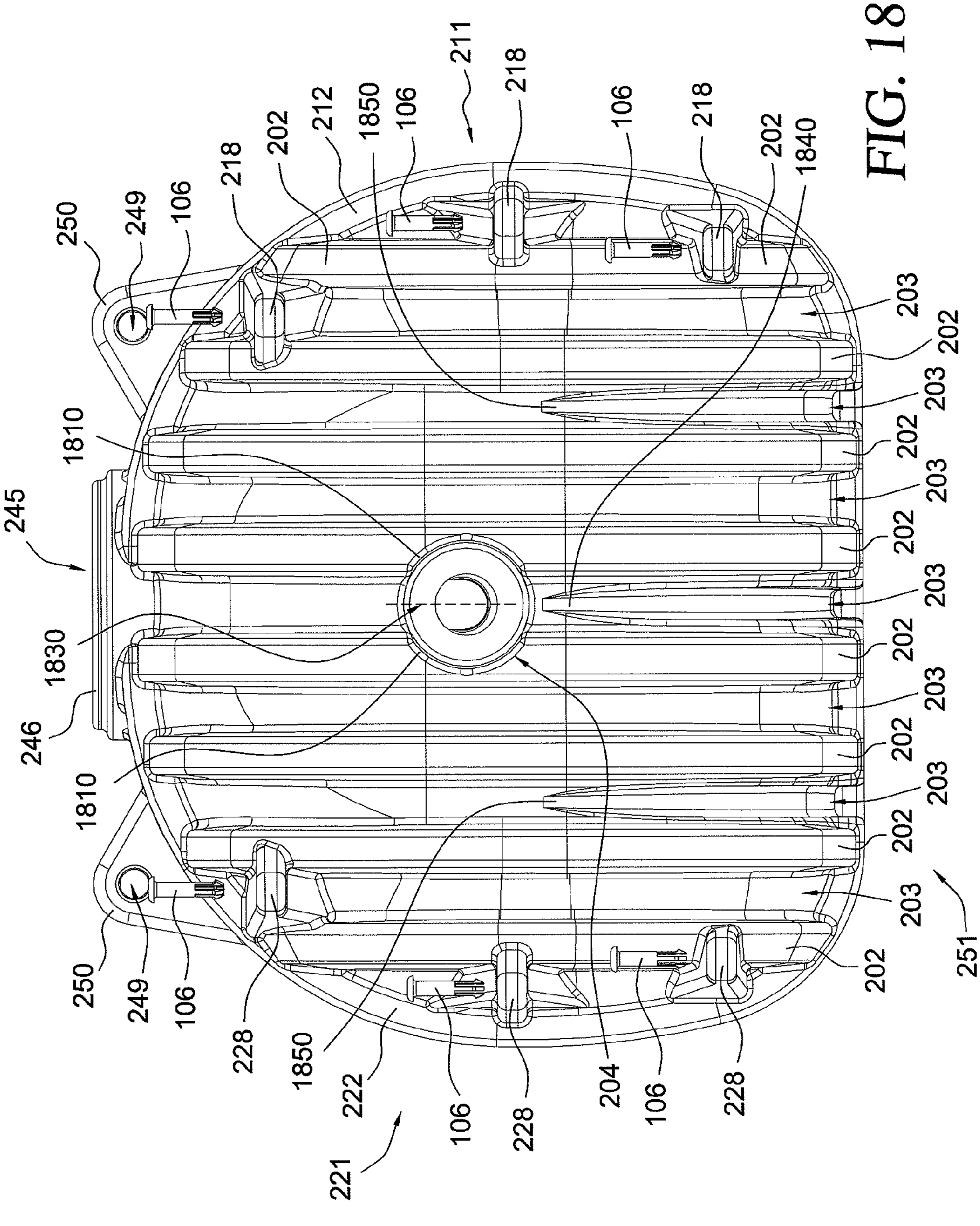
FIG. 18 is a front view of the aeration chamber of the wastewater treatment system tank of FIG. 12, in accordance with one or more embodiments of the present invention.

FIG. 18 is a front view of the aeration chamber of the wastewater treatment system tank 200 of FIG. 12, in accordance with one or more embodiments of the present invention. In FIG. 18, there are a total of eight, vertical front wall ribs 202 that are spaced apart by seven, vertical front wall grooves 203. A center pair of the eight front wall ribs 202 is aligned along and each includes an arcuate indent 1810 on opposite sides of and located around a portion of inlet opening connector recess opening 204. The center pair of front wall ribs 202, one on the left and one on the right, is spaced apart by a front wall center groove 203, which is longitudinally aligned with a vertical diameter line 1830 of inlet connector recess opening 204. A top portion of each of the center pair of front wall ribs 202 is connected to a top portion of the left-most right wall rib 212 at cylindrical wall 244 and extends vertically downwardly and around the front wall 201 and onto the bottom wall 251 where a bottom portion of each of the center pair of front wall ribs 202 is connected to a side of the left-most right wall rib 212 on the bottom wall 251. Three additional opposite pairs of front wall ribs 202 are spaced about equally apart to the left and right, respectively, and separated by grooves 203. Each of the two center front wall ribs 202 is about 1.25 times as wide as the next two front wall ribs 202 to the left and right of the center front wall ribs 202 and about as wide as outer-most front wall ribs 202. Similar to the center pair of front wall ribs 202, a top portion of each of the three additional opposite pairs of front wall ribs 202 is connected to a side-top portion of the left-most right wall rib 212 and extends vertically downwardly and around the front wall 201 an onto the bottom wall 251 where a bottom portion of each of the three additional opposite pairs of front wall ribs 202 is connected to a side of the left-most right wall rib 212 on the bottom wall 251. Although the two outermost front wall ribs 202 may actually connect to the left-most right side wall rib 212 near a junction of the right side wall 211 with the top wall 241 and a junction of the right side wall 211 with the bottom wall 251. Concave curves 1810 that are formed in the side walls of the two center front wall ribs 202 immediately next to the front wall center groove 203 are radially aligned with front wall cylindrical inlet connector recess opening 204. The concave curves 1810 provide the necessary clearance for pretreatment chamber back wall cylindrical outlet 136 to connect to aeration chamber front wall cylindrical inlet connector recess opening 204 when the pretreatment chamber 100 and aeration chamber 200 are joined together.

In FIG. 18, aeration chamber front wall center groove 203 has a second groove portion 1840 that begins just below a bottom of arcuate indent 1810 and is longitudinally aligned with vertical diameter line 1830 of inlet connector recess opening 204 and extends down to and around onto and to about the middle of aeration chamber bottom wall 251. As seen in FIG. 7, aeration chamber front wall center groove second groove 1840 extends through the left-most and middle left ribs 252 of the bottom wall 251. Aeration chamber front wall also includes second groove portions 1850, one in a second from the center groove 203 to the left and one to the right of the center groove 203 and each begins even with the beginning of aeration chamber front wall center groove 203 second groove portion 1840 just below a bottom of arcuate indent 1810. Each second from the center groove 203 second groove portions 1850 extend down to and around onto and across about a quarter of aeration chamber bottom wall 251. As seen in FIG. 7, aeration chamber front wall second from the center groove second groove 1850 extends through the left-most rib 252 of the bottom wall 251.

Figure 19:
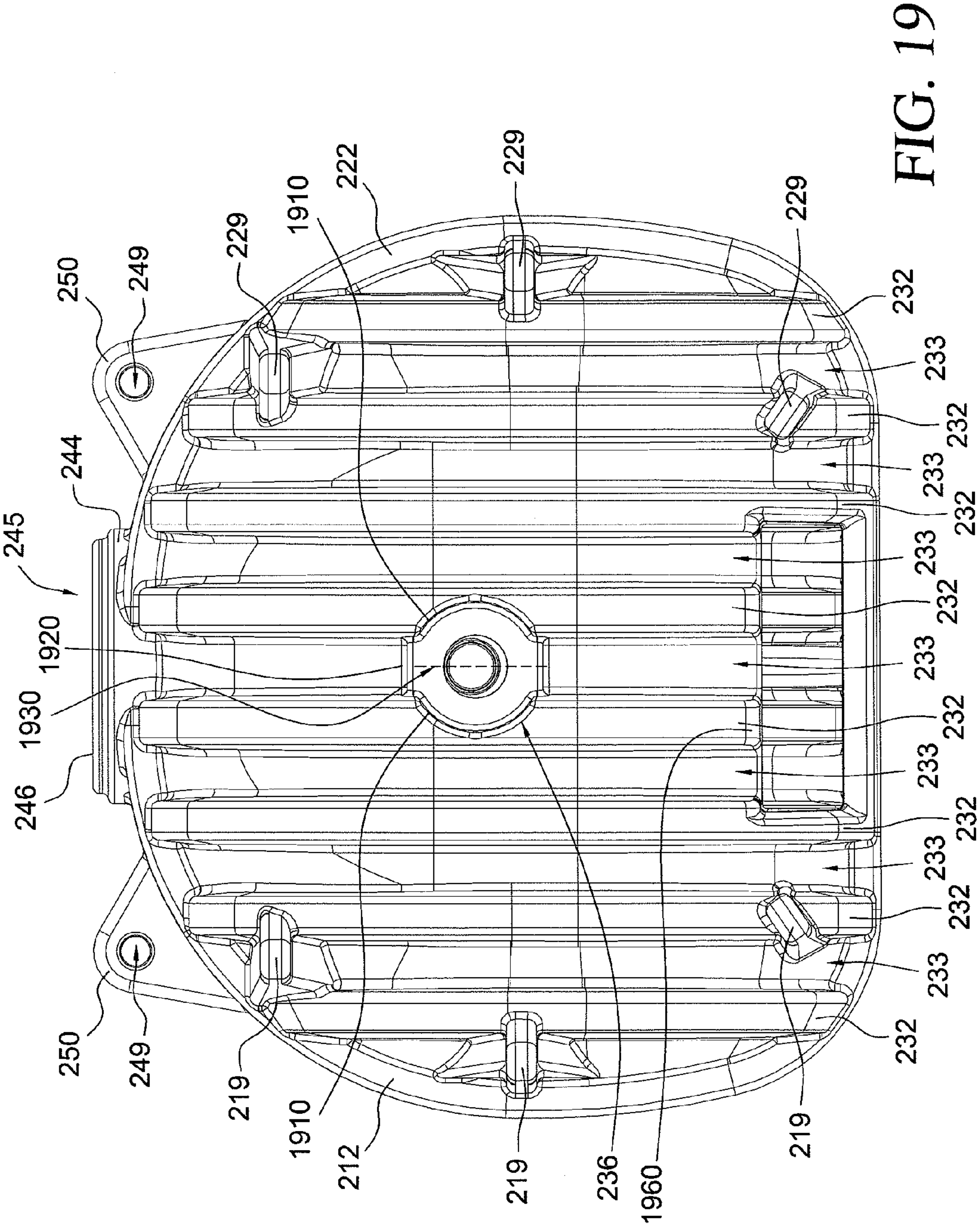
FIG. 19 is a back view of the aeration chamber of the wastewater treatment system tank of FIG. 12, in accordance with one or more embodiments of the present invention.

FIG. 19 is a back view of the aeration chamber of the wastewater treatment system tank 200 of FIG. 12, in accordance with one or more embodiments of the present invention. In FIG. 19, similar to the front, there are a total of eight, vertical back wall ribs 232 that are spaced apart by seven, vertical back wall grooves 233. A center pair of the eight back wall ribs 232 is aligned along and each includes a substantially arcuate indent 1910 on opposite sides of and located around a portion of outlet opening connector recess opening 236. At a top and bottom end of each substantially arcuate indent 1910 an indent 1920 is perpendicular to a vertical diameter line 1930 of outlet connector recess opening 236 and extends away from the end of each substantially arcuate indent 1910. The center pair of back wall ribs 232, one on the left and one on the right, is spaced apart by a back wall center groove 233, which is longitudinally aligned with the vertical diameter line 1930 of outlet connector recess opening 236. A top portion of each of the center pair of front wall ribs 232 is connected to a top portion of the right-most right wall rib 212 at cylindrical wall 244 and extends vertically down the back wall 231 and connects with a top portion 1960 of aeration chamber transfer port 254, which is formed in the bottom portion of aeration chamber back wall 231. Three additional opposite pairs of back wall ribs 232 are spaced about equally apart to the left and right, respectively, and separated by grooves 233. Each of the two center back wall ribs 232 is about 1.25 times as wide as the next two back wall ribs 232 to the left and right of the center back wall ribs 232 and about as wide as outer-most back wall ribs 232.

In FIG. 19, a top portion of each of the three additional opposite pairs of back wall ribs 232 is connected to a side-top portion of the right-most right wall rib 212 and extends vertically downwardly and around the back wall 231 and onto the bottom wall 251 where a bottom portion of each of the three additional opposite pairs of back wall ribs 232 is connected to a side of the right-most right wall rib 212 on the bottom wall 251. However, the two back wall ribs 232 next to the two center back wall ribs 232, each connect to an opposite side of the top portion 1960 of aeration chamber transfer port 254 in about a middle of each rib such that about half of each rib extends down along and forms a side of aeration chamber transfer port 254. The two outermost left and right back wall ribs 232 may actually connect, respectively, to the right-most right side wall rib 212 near a junction of the right side wall 211 with the top wall 241 and a junction of the right side wall 211 with the bottom wall 251 and to the left-most left side wall rib 222 near a junction of the left side wall 221 with the top wall 241 and a junction of the left side wall 221 with the bottom wall 251. When clarification chamber sludge return conduit 306 is inserted into aeration chamber transfer port 254 it forms a leak proof seal between clarification chamber sludge return conduit 306 and aeration chamber transfer port 254.

In FIG. 19, aeration chamber left and right hoist points 250 with lift openings 249 are seen extending upwardly from the aeration chamber top wall 241, to just less than or about the top of raised annular lip 246. The top and middle aeration chamber back wall flanges 219, 229 are seen connected to the aeration chamber back wall 231 so as to be substantially perpendicular to the vertical diameter line 1930, and the bottom aeration chamber back wall flanges 219, 229 are seen connected to the aeration chamber back wall 231 so as to be at about a forty-five degree angle to the vertical diameter line 1930.

Figure 20:
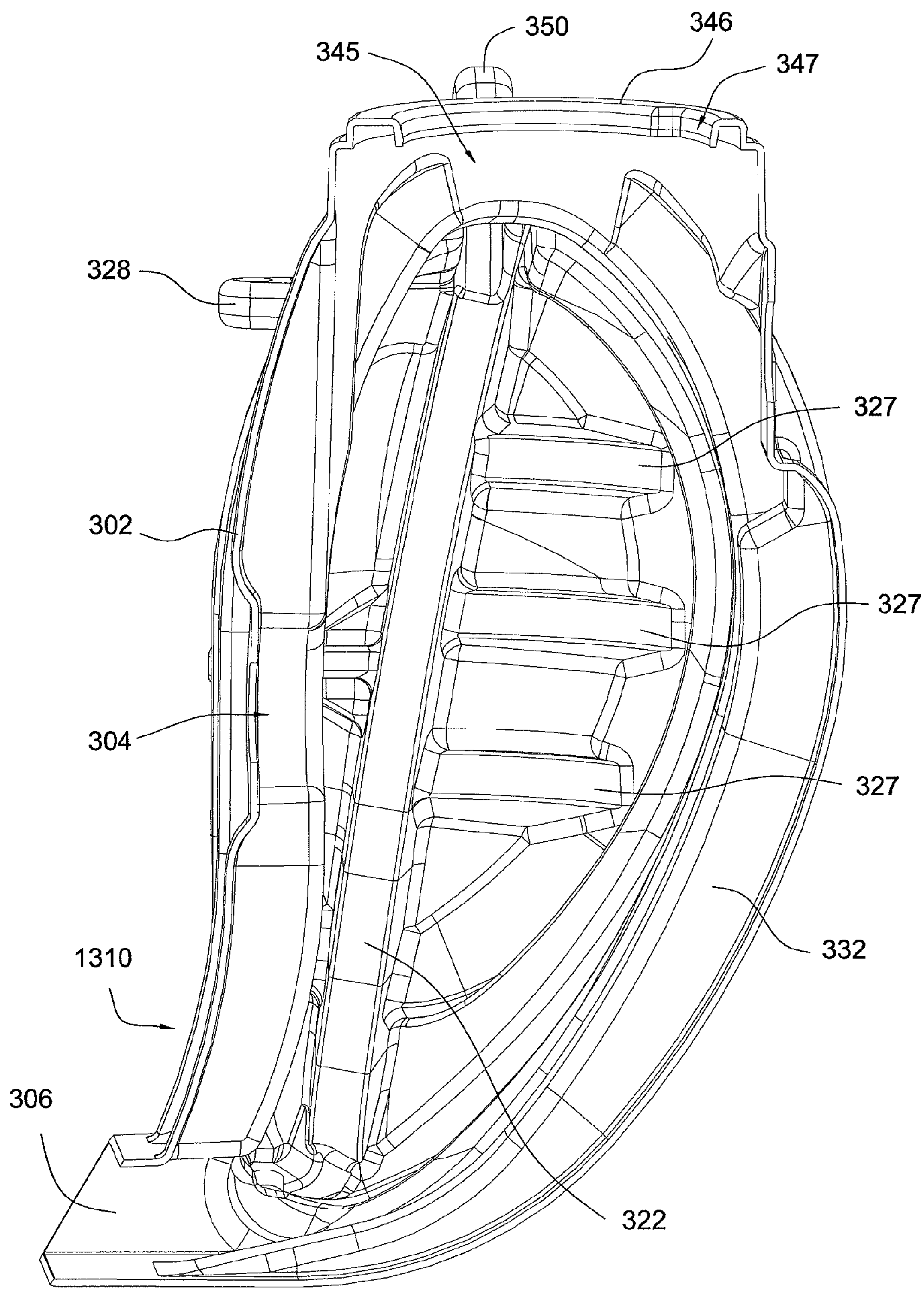
FIG. 20 is a cross-section view of a clarification chamber of the wastewater treatment system tank of FIG. 12 along line D-D, in accordance with one or more embodiments of the present invention.

FIG. 20 is a cross-section view of a clarification chamber of the wastewater treatment system tank of FIG. 12 along line D-D, in accordance with one or more embodiments of the present invention. In FIG. 20, the clarification chamber front wall cylindrical inlet 304 is seen formed in a clarification chamber center front wall 301 in the center rib 302, which has outwardly curving bottom portion 1310 that extends to and connects with the top 1360 of sludge return conduit 306. A portion of the short recessed groove 347 in the annular ring 346 is seen on the back wall side of the clarification chamber 300.

Figure 21:
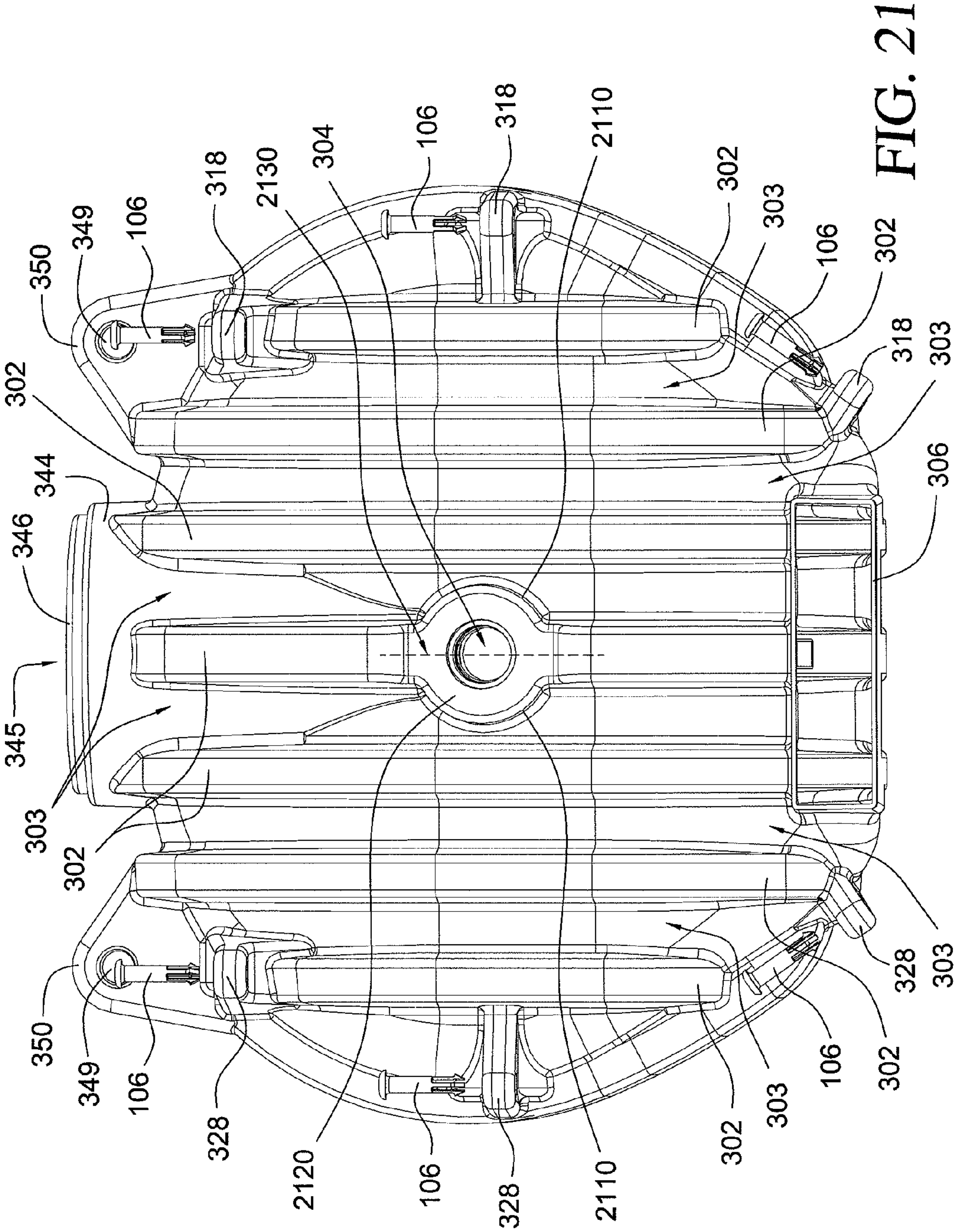
FIG. 21 is a front view of the clarification chamber of the wastewater treatment system tank of FIG. 12, in accordance with one or more embodiments of the present invention.

FIG. 21 is a front view of the clarification chamber of the wastewater treatment system tank of FIG. 12, in accordance with one or more embodiments of the present invention. In FIG. 21, there are a total of seven, vertical clarification chamber front wall ribs 302 that are spaced apart by six, vertical clarification chamber front wall grooves 303. A center one of the seven front wall ribs 302 is aligned with and interrupted by clarification chamber front wall cylindrical inlet 304. The center front wall rib 302 is about 1.75 times as wide as the next two front wall ribs 302 to the left of center front wall rib 302 and to the next two front wall ribs 302 to the right of center front wall rib 302. The two outermost front wall ribs 302 are about 2 times as wide as the non-center front wall ribs. The center front wall rib 302 includes a pair of opposite convex projections 2110 that are formed around and coaxially aligned with the front wall cylindrical inlet 304 to form a raised cylindrical portion 2120. The raised cylindrical portion 2120 provides the necessary shape for clarification chamber wall cylindrical inlet 304 to fit in and connect to aeration chamber back wall cylindrical outlet connector recess opening 236, as defined by each substantially arcuate indent 1910 and indent 1920 on the back wall of aeration chamber 200 in FIG. 19, when the clarification chamber 300 of FIG. 21 and aeration chamber 200 of FIG. 19 are joined together. In FIG. 21, the center front wall rib 302 is longitudinally aligned with a vertical diameter line 2130 of inlet connector recess opening 304.

In FIG. 21, clarification chamber left and right hoist points 350 with lift openings 349 are seen extending upwardly from the clarification chamber top wall 341, to just less than or about the top of raised annular lip 346. The top and middle clarification chamber front wall flanges 318 are seen connected to the clarification chamber front wall 301 so as to be substantially perpendicular to the vertical diameter line 2130, and the bottom clarification chamber front wall flanges 318, 328 are seen connected to the clarification chamber front wall 301 so as to be at about a forty-five degree angle to the vertical diameter line 2130. Rivets 106 are shown positioned above each of the clarification chamber front wall flanges 318, 328 for insertion after the clarification chamber 300 and aeration chamber 200 are connected together and the clarification chamber front wall flanges 318, 328 and the aeration chamber back wall flanges 219, 229 are aligned with each other, respectively.

In FIG. 21, sludge return conduit 306 is shown at the bottom of clarification chamber front wall 301 and through which a portion of the inside of the clarification chamber back wall 331 can be seen. Also, a distal end 2150 of sludge return downwardly depending extension 638 can be seen at the top middle of and opening into sludge return conduit 306.

Figure 22:
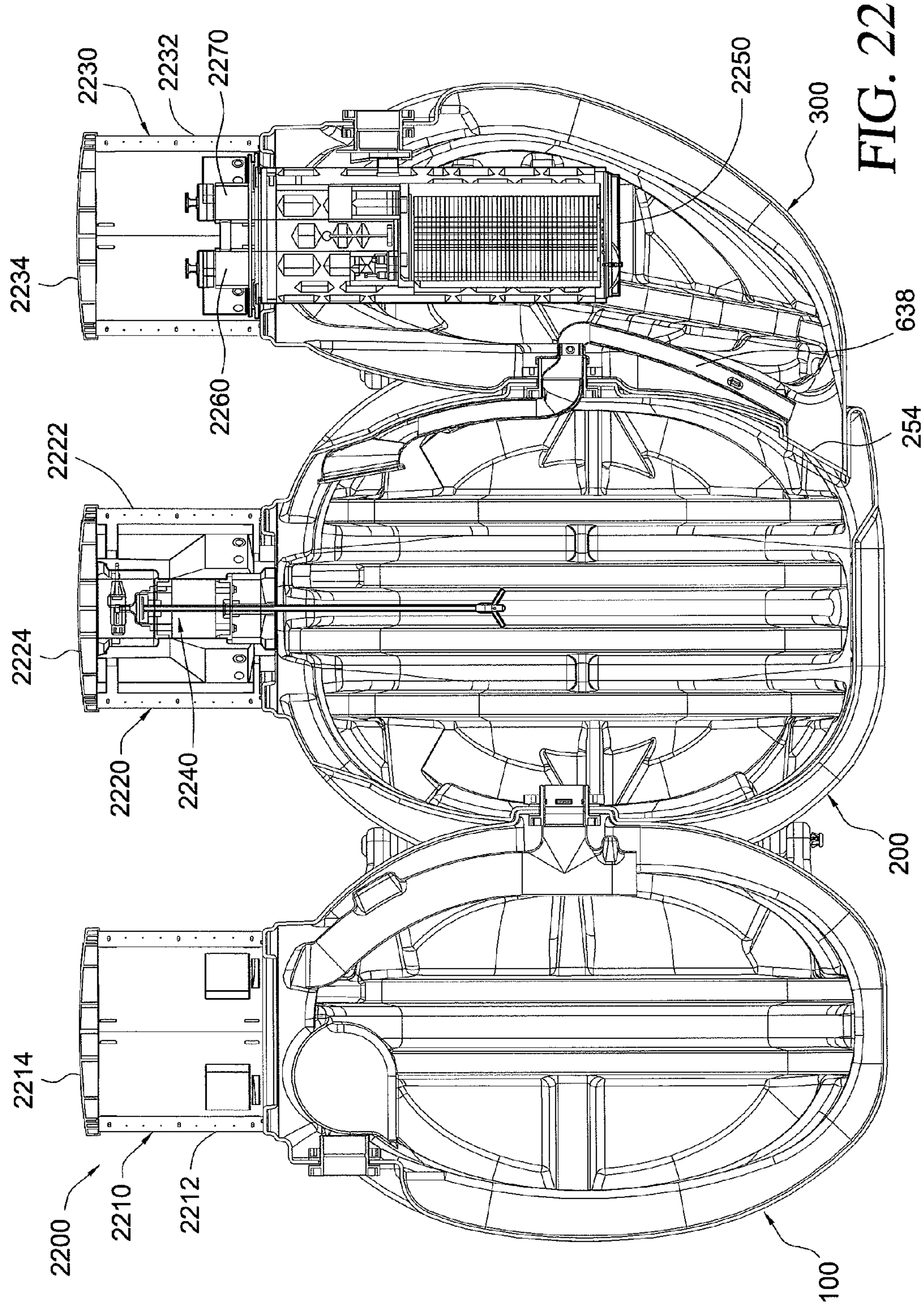
FIG. 22 is a cross-section view of the wastewater treatment system tank of FIG. 5 along line A-A showing risers connected to the pretreatment chamber, the aeration chamber, and the clarification chamber, in accordance with one or more embodiments of the present invention.

FIG. 22 is a cross-section view of a complete wastewater treatment system 2200 using the wastewater treatment system tank 10 of FIG. 5 along line A-A showing risers connected to the pretreatment chamber 100, the aeration chamber 200, and the clarification chamber 300, in accordance with one or more embodiments of the present invention. As seen in FIG. 22, wastewater treatment system 2200 includes the wastewater treatment system tank 10 comprises pretreatment chamber 100 connected to aeration chamber 200, which is in turn connected to clarification chamber 300. A pretreatment chamber cylindrical riser 2210 is connected and sealed to the top of pretreatment chamber cylindrical wall 144 and raised annular lip 146 to cover pretreatment chamber access opening 145. Pretreatment chamber cylindrical riser 2210 includes a cylindrical wall 2212 and a substantially circular top 2214. Pretreatment chamber cylindrical wall 2212 comprises a plurality of spaced-apart vertical ribs 2215 extending from a bottom to a top of pretreatment chamber cylindrical wall 2212, and a plurality of spaced-apart horizontal arcuate rib sections 2217 that are perpendicular to and connected between the plurality of spaced-apart vertical ribs 2215 to form a plurality of circular ribs around pretreatment chamber cylindrical wall 2212.

In FIG. 22, wastewater treatment system 2200 further includes an aeration chamber cylindrical riser 2220 that is connected and sealed to the top of aeration chamber cylindrical wall 244 and raised annular lip 246 to cover aeration chamber access opening 245. Aeration chamber cylindrical riser 2220 includes a cylindrical wall 2222 and a substantially circular top 2224. Aeration chamber cylindrical wall 2222 comprises a plurality of spaced-apart vertical ribs 2225 extending from a bottom to a top of aeration chamber cylindrical wall 2222, and a plurality of spaced-apart horizontal arcuate rib sections 2227 that are perpendicular to and connected between the plurality of spaced-apart vertical ribs 2225 to form a plurality of circular ribs around aeration chamber cylindrical wall 2222. An aerator system 2240 is installed at the top of aeration chamber access opening 245. A top part of the aerator system 2240 extends above the aeration chamber access opening 245 and is covered by aeration chamber riser 2220 and a bottom part of the aerator system 2240 extends into aeration chamber 200.

In FIG. 22, wastewater treatment system 2200 still further includes a clarification chamber cylindrical riser 2230 is connected and sealed to the top of clarification chamber cylindrical wall 344 and raised annular lip 346 to cover clarification chamber access opening 345. Clarification chamber cylindrical riser 2230 includes a cylindrical wall 2232 and a substantially circular top 2234. Clarification chamber cylindrical wall 2232 comprises a plurality of spaced-apart vertical ribs 2235 extending from a bottom to a top of clarification chamber cylindrical wall 2232, and a plurality of spaced-apart horizontal arcuate rib sections 2237 that are perpendicular to and connected between the plurality of spaced-apart vertical ribs 2235 to form a plurality of circular ribs around clarification chamber cylindrical wall 2232. A Bio-Kinetic® system 2250 is installed at the top of clarification chamber access opening 345 such that all of Bio-Kinetic® system 2250 extends into clarification chamber 300. As a part of the Bio-Kinetic® system 2250 and the clarification chamber access opening 345 an optional chlorination system 2260 and an optional dechlorination system 2270 may be installed and be covered by clarification chamber riser 2230.

Figure 23:
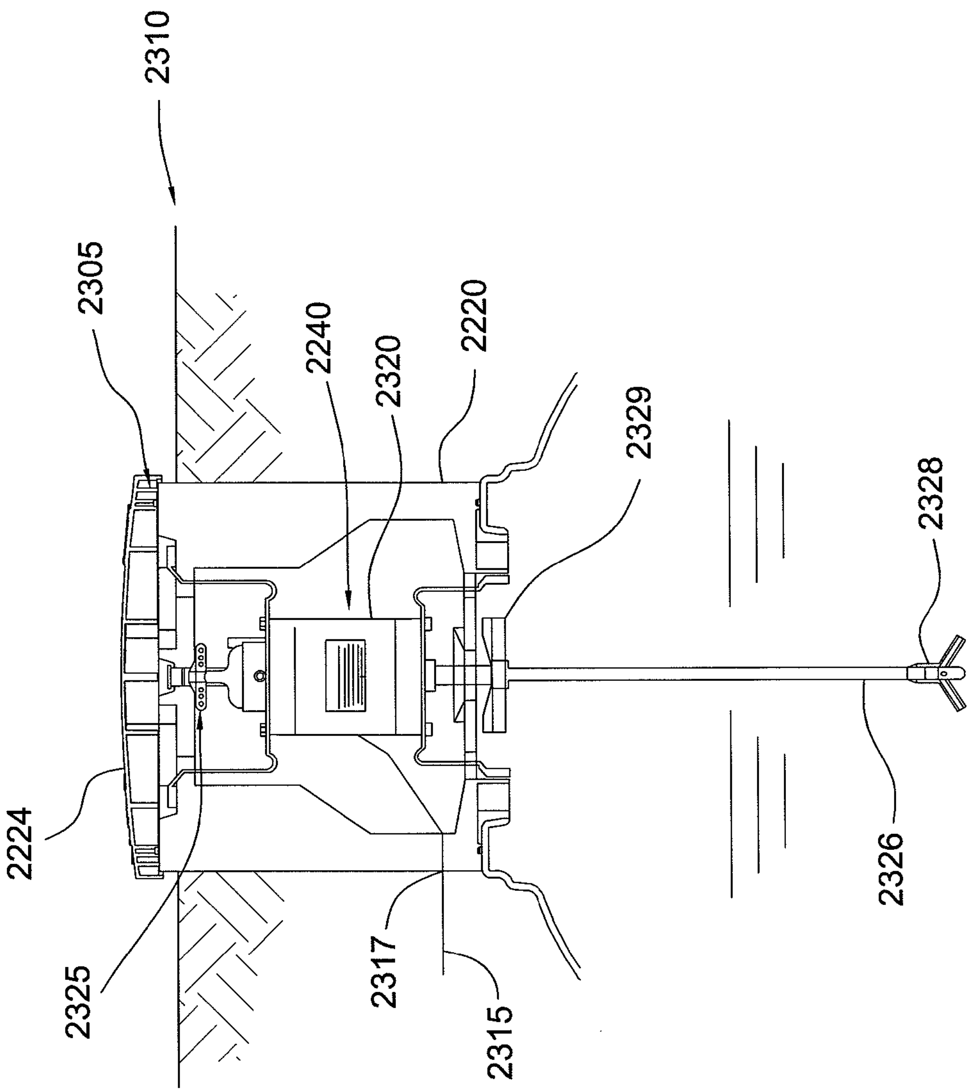
FIG. 23 is a close-up, detailed, cross-section view of the riser attached to the aeration chamber of the wastewater treatment system tank of FIG. 22 showing an aerator installed therein, in accordance with one or more embodiments of the present invention.

FIG. 23 is a close-up, detailed, cross-section view of the riser attached to the aeration chamber of the wastewater treatment system tank of FIG. 22 showing an aerator 2320 installed therein, in accordance with one or more embodiments of the present invention. For example, the aerator 2320 may be the Singulair aerator manufactured by Norweco, Inc of Norwalk, Ohio and that is powered by a 1725 RPM, 115 volt, 60 hertz, single-phase, fractional horsepower motor. Power is supplied by an underground power cable 2315 and enters into aeration chamber riser 2220 through a power cable entrance 2317 in the cylindrical wall. The aerator riser cover is a fresh air vented cover 2224 that has been designed specifically for use with the Singulair aerator 2320 in the wastewater treatment system 10 of the present invention. The Singulair aerator 2320 costs less to operate and consumes fewer kilowatt hours of electricity than most major appliances. The Singulair aerator 2320 has a prewired electrical control center contained in a NEMA rated enclosure. The control center contains a power switch and time clock that control aerator operation.

As noted above in regard to FIG. 23, the aerator 2320 has been specifically designed for use in the wastewater treatment system 10 of the present invention and includes special alloy and molded plastic parts to prolong aerator life. Aerator bearings are pre-lubricated and sealed. The Singulair aerator 2320 is installed in a plastic mounting riser 2220 above the aeration chamber. Fresh air enters the aerator through four air intake ports (not shown) located under an aerator lifting handle 2325. Air is drawn down a hollow aspirator shaft 2326 where it is introduced below a liquid surface in the aeration chamber 200. Only a molded plastic aspirator tip 2328 and the lower portion of the stainless steel aspirator shaft 2326 are submerged. The aerator 2320 is not designed to run under water and will automatically shut off if a high water condition occurs. If the liquid rises to the level of a foam restrictor 2329 that is located a short distance below aerator 2320, the control center will shut off power to the aerator 2320.

In FIG. 23, an aerator riser vent 2305 is designed into the perimeter of the riser cover 2224 above the Singulair aerator. The perimeter vents 2305 supply fresh air to the aerator 2320, which is drawn through the aspirator 2326 and into the wastewater. To ensure best performance, after final installation and backfilling, a finished grade 2310 should be maintained six inches below the top of the vented riser cover 2224 and graded to drain runoff away from the cover. In addition, the vented access cover should not be obstructed by plants, shrubbery, mulch or landscaping of any other object so as to restrict the flow of air to the perimeter vents 2305.

In FIG. 23, the control center of the aerator 2320 is supplied with an adjustable time clock that determines the operating cycle of the aerator. For example, the time clock can permit the aerator to run from 30-60 minutes out of each hour and is adjustable in 5 minute increments and delays can be set to run from 0-60 minutes. The performance of the wastewater treatment system 2200 has been certified to meet NSF/ANSI Standard 40 effluent quality requirements and USEPA secondary treatment guidelines at the minimum time clock setting. In an alternate embodiment, the time clock is not adjustable, but, instead is preset to run for a pre-specified amount of time, for example, at least 30 minutes out of each hour. Likewise, in yet another alternate embodiment, the time is not adjustable, but, instead alternates between running for 60 minutes and then being off for 60 minutes.

Figure 24:
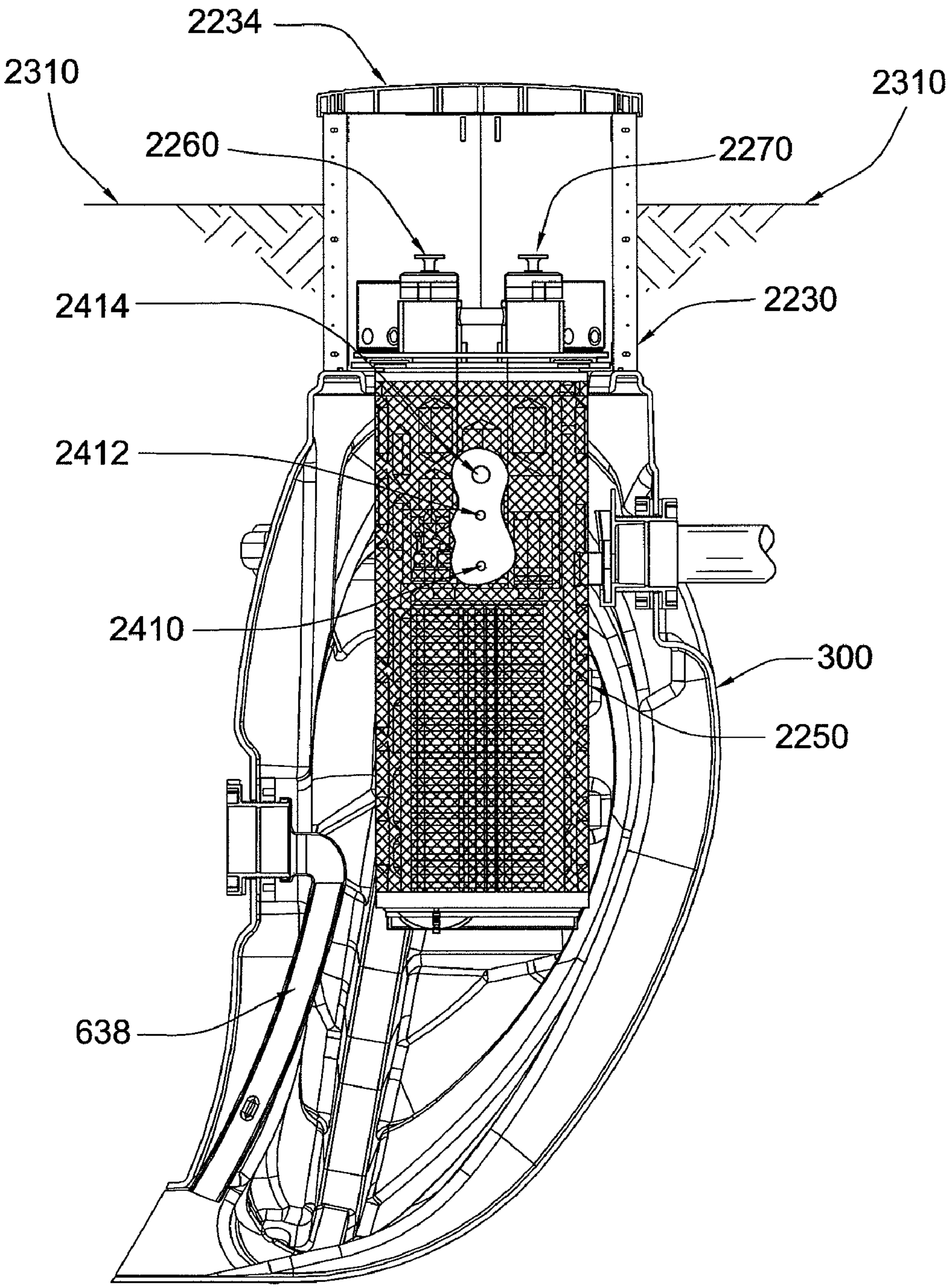
FIG. 24 is a close-up, detailed, cross-section view of the riser attached to the clarification chamber of the wastewater treatment system tank of FIG. 22 showing a wastewater management system installed therein, in accordance with one or more embodiments of the present invention.

FIG. 24 is a close-up, detailed, cross-section view of the riser attached to the clarification chamber of the wastewater treatment system tank of FIG. 22 showing a wastewater management system 2250 installed therein, in accordance with one or more embodiments of the present invention. In FIG. 24, the wastewater management system 2250 is connected to a control center (see FIG. 25, reference number 2520) wired to a dedicated 115 VAC, single-phase circuit at the main electrical service panel. A 15 amp circuit is recommended, but a 10 amp minimum is required. The wastewater management system 2250 includes a set of three distinct flow equalization ports, a design flow equalization port 2410, a sustained flow equalization port 2412 and a peak flow equalization port 2414. Although not shown in FIG. 24, an additional set of three distinct flow equalization ports can be positioned on the other side of the wastewater management system 2250 and exactly opposite the shown set of three distinct flow equalization ports.

Figure 25:
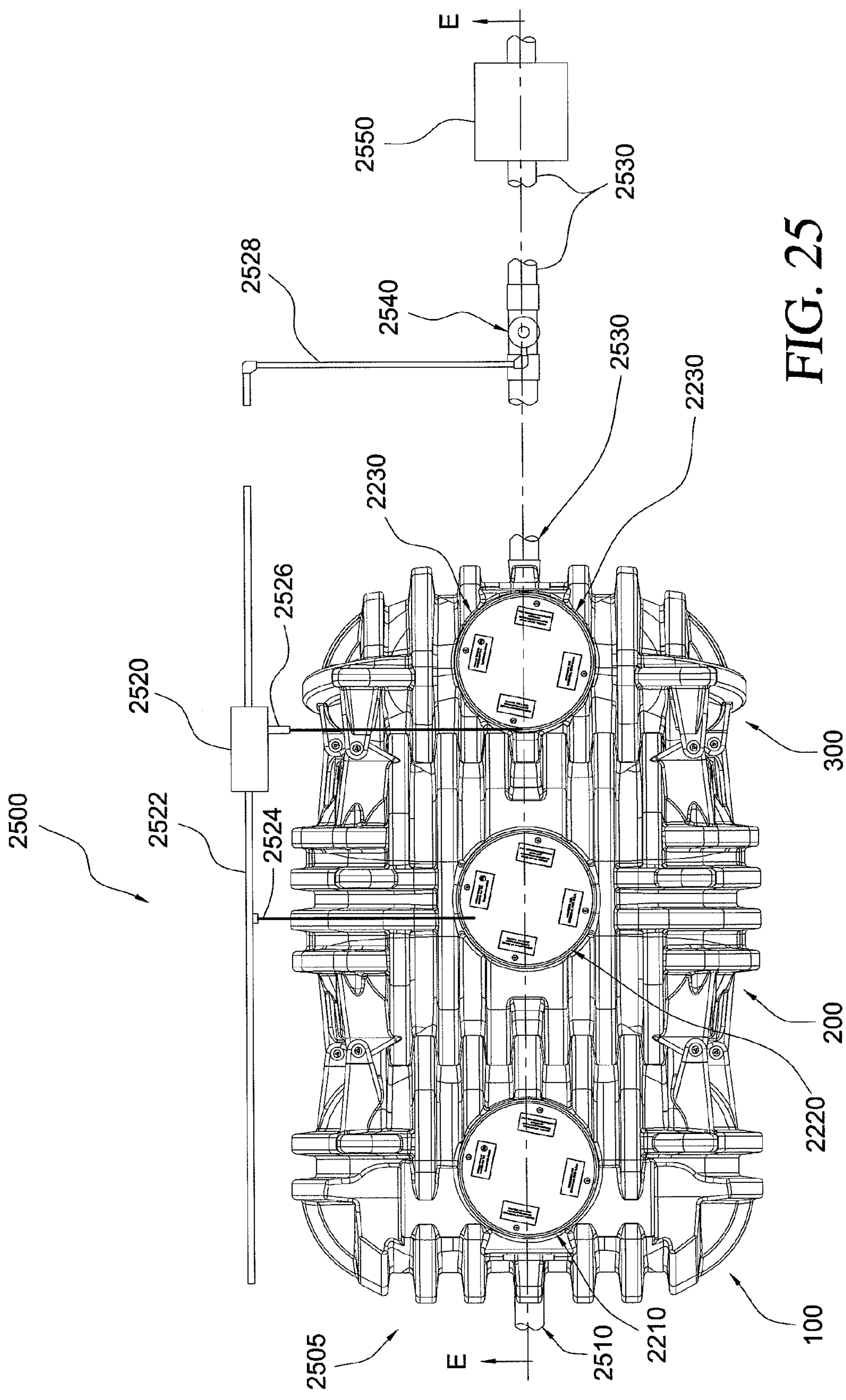
FIG. 25 is a top view of a wastewater treatment system installation with a pretreatment chamber, an aeration chamber, and a clarification chamber, in accordance with one or more embodiments of the present invention.

FIG. 25 is a top plan view of a wastewater treatment system installation 2500 with a wastewater treatment system tank 2505 including the pretreatment chamber 100, the aeration chamber 200 and the clarification chamber 300, in accordance with one or more embodiments of the present invention. Although the chambers shown here in FIG. 25 making up wastewater treatment system tank 2505, as well as in FIGS. 26, 28 and 29, have a slightly different design than the chambers in wastewater treatment system tank 10 of FIG. 1, it is understood that the different wastewater treatment system tank designs 10, 2505 are interchangeable within wastewater treatment system installation 2500. The new wastewater treatment system tank designs in FIGS. 25, 26, 28 and 29 will be described later herein in relation to FIGS. 39-47. In FIG. 25, a wastewater inlet pipe 2510, for example, a four inch inlet pipe, is shown connected to pretreatment chamber 100 and which serves to bring the wastewater to pretreatment chamber 100. A control center 2520 is shown connected to a main power line 2522, which is also connected by a first supply line 2524 to the aeration chamber riser 2220 and the aerator (not shown) contained therein. The control center 2520 is connected by a second supply line 2526 to the clarification chamber riser 2230 and the wastewater management system (not shown) contained therein. The control center 2520 also includes an air pump (not shown), for example, the air pump is a 120 volt air pump that produces 0.14 cubic feet per minute (cfm). An effluent drain line 2530 (shown in broken line), for example, a four inch diameter drain line, is connected to the clarification chamber outlet 336 at a first end, to an ultraviolet disinfection system 2540 some distance away from the clarification chamber outlet 336 and to a freefalling sampling port 2550 at a second end. The ultraviolet disinfection system 2540, for example, an AT 1500 ultraviolet disinfection system, is connected to the effluent drain line 2530 between the clarification chamber 300 and the freefalling sampling port 2550. The ultraviolet disinfection system 2540 is electrically connected to the control center 2520 by a third supply line 2528 and provides additional disinfection of the effluent fluid, since the embodiment of FIG. 25 does not use chlorination disinfection. In general, the freefalling sampling port 2550 has a minimum of a six inch diameter.

Figure 26:
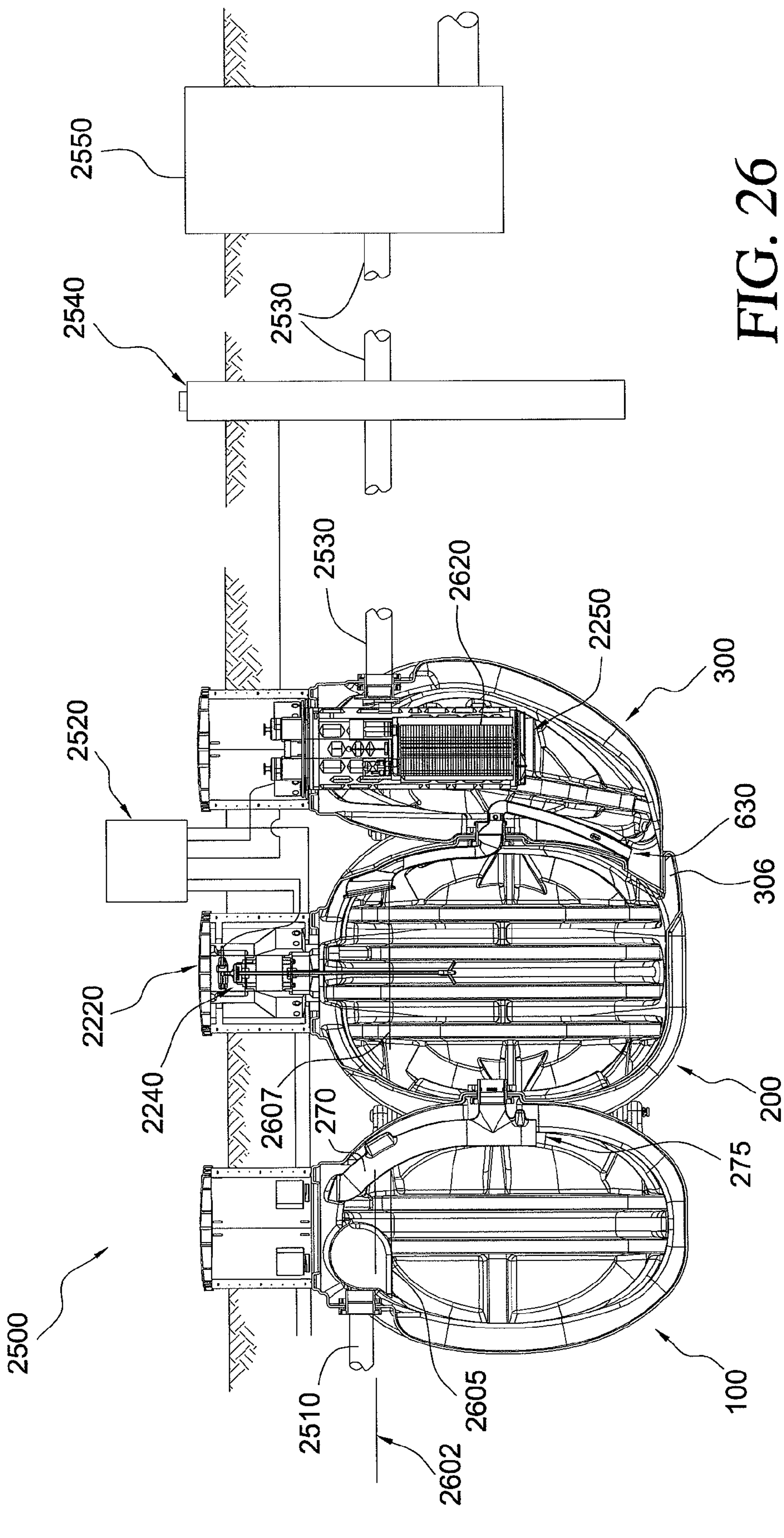
FIG. 26 is a cross-sectional view of the wastewater treatment system installation of FIG. 25 along line E-E, in accordance with one or more embodiments of the present invention.

FIG. 26 is a cross-sectional view of the wastewater treatment system 2500 installation of FIG. 25 along line E-E, in accordance with one or more embodiments of the present invention. In FIG. 26, a bottom level 2602 of inlet pipe 2510 is seen above a pretreatment design wastewater level 2605 in pretreatment chamber 100. Likewise, an aeration design wastewater level 2607 is seen above a top 2611 of pretreatment tee leg 273 and above a bottom 2613 of sludge return inlet 620 in aeration chamber 200. As designed, wastewater enters pretreatment chamber 100 through inlet pipe 2510 where the initial anaerobic treatment of the wastewater is performed and then passes up through pretreatment tee bottom inlet 275, then through pretreatment tee leg 273 and into aeration chamber 200. In the aeration chamber 200, aerobic treatment of the wastewater is performed to separate out solids in the wastewater and the wastewater then spills into the sludge return inlet 620 and through aeration chamber outlet 236 and clarification chamber inlet 304. The wastewater then flows down and through sludge return extension 630 to the bottom of the clarification chamber 300 to just above sludge return conduit 306.

In FIG. 26, a bubble stone diffuser 2620 is shown between an exterior wall of wastewater treatment system 2250 and the next interior wall. In general, the bubble stone diffuser 2620 is a minimum of 12 inches in length, is fluidly connected to the air pump in the control center 2520 and produces a fine bubble. The addition of the bubbles into the wastewater treatment system 2250 improves the efficiency of the final processing of the wastewater before it is sent out of the wastewater treatment system 2250 through the effluent pipe 2530.

Figure 27:
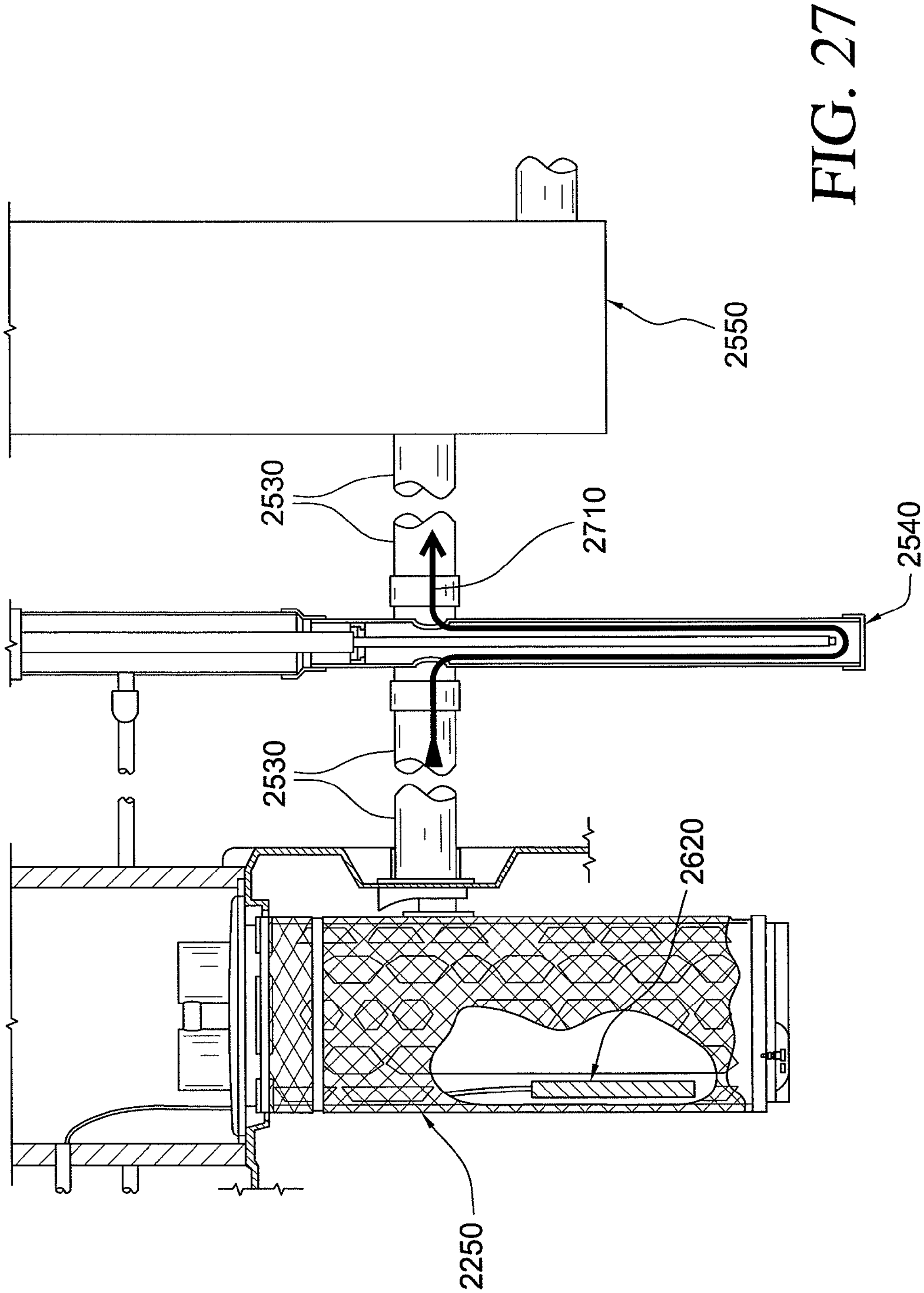
FIG. 27 is a partial cross-sectional side view of a discharge system of the wastewater treatment system installation of FIG. 22, in accordance with one or more embodiments of the present invention.

FIG. 27 is a partial cross-sectional side view of a discharge system of the wastewater treatment system installation of FIG. 22, in accordance with one or more embodiments of the present invention. In FIG. 27, details of the wastewater treatment system 2250, the bubble stone diffuser 2620, the ultraviolet disinfection system 2540, and the freefalling sampling port 2550 are shown. Line 2710 shows the flow direction of the effluent fluid through a bottom half of the ultraviolet disinfection system 2540.

Figure 28:
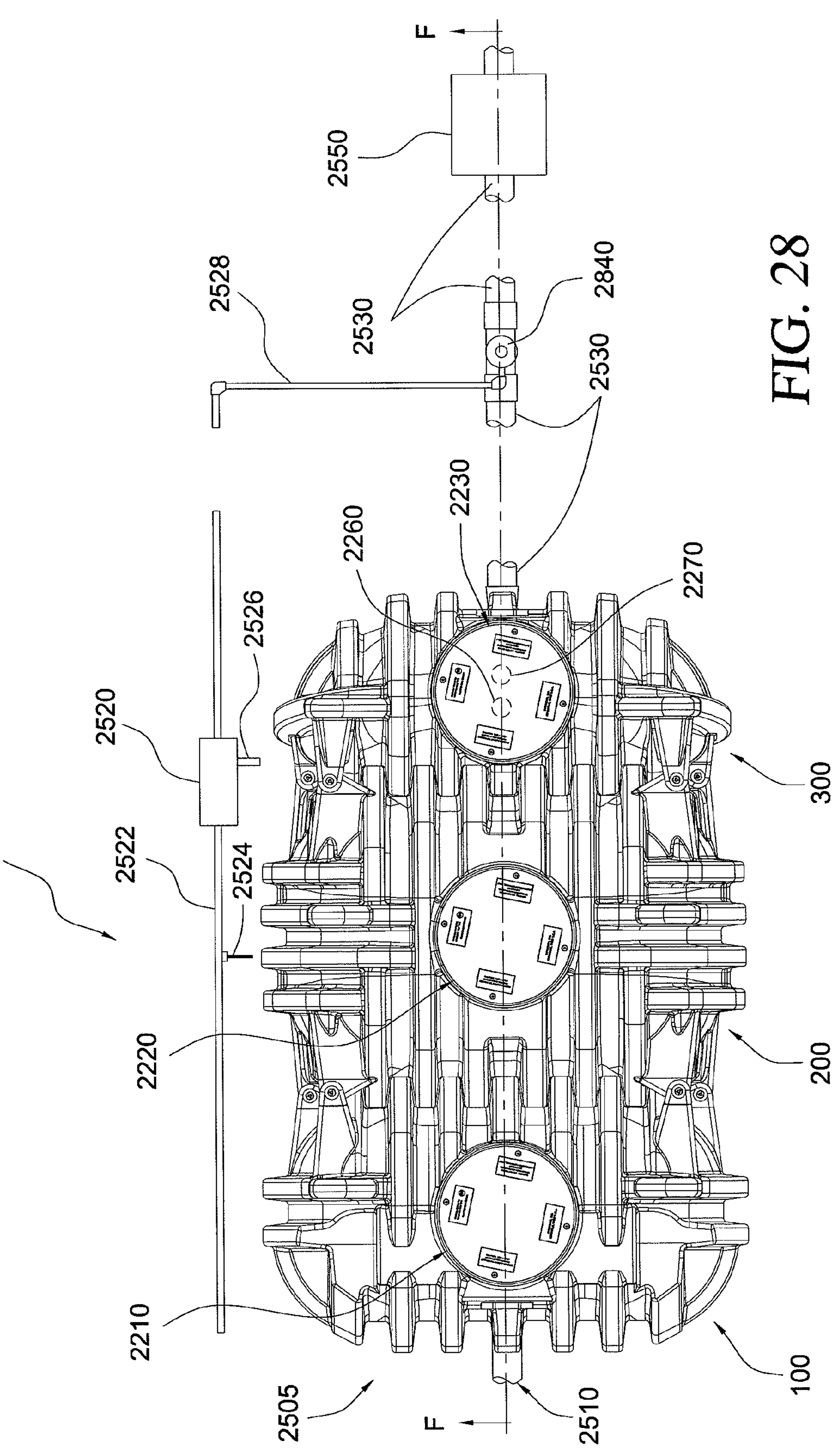
FIG. 28 is a top view of a wastewater treatment system installation with a pretreatment chamber, an aeration chamber, and a clarification chamber, in accordance with another embodiment of the present invention.

FIG. 28 is a top view of a wastewater treatment system installation with a pretreatment chamber, an aeration chamber, and a clarification chamber, in accordance with another embodiment of the present invention. In FIG. 28, the wastewater treatment system installation 2500 with a wastewater treatment system 2505 including the pretreatment chamber 100, the aeration chamber 200 and the clarification chamber 300 of FIG. 25 is repeated with some minor variations. The first of the differences includes the chlorination system 2260 and the dechlorination system 2270 connected to the top of wastewater treatment system 2250 in the clarification chamber 300. For example, in FIG. 28, the chlorination system 2260, may also include a Blue Crystal Tablet Chlorination System with a ChemCheck® system and the dechlorination system 2270 may include a Bio-Max® Dechlorination System with ChemCheck® system, both manufactured by Norweco of Norwalk, Ohio. The ChemCheck® system is installed in a feed tube of either of the above tablet feed systems and monitors the level of chemical in the feed tube and sends an alert to indicate the need for additional chemicals. The second of the differences is that the ultraviolet disinfection system 2540 is replaced with an inline dechlorination system 2840, for example, a LF 1000 with Bio-Max® Tablet Dechlorination System with ChemCheck® System, which is also manufactured by Norweco of Norwalk, Ohio.

Figure 29:
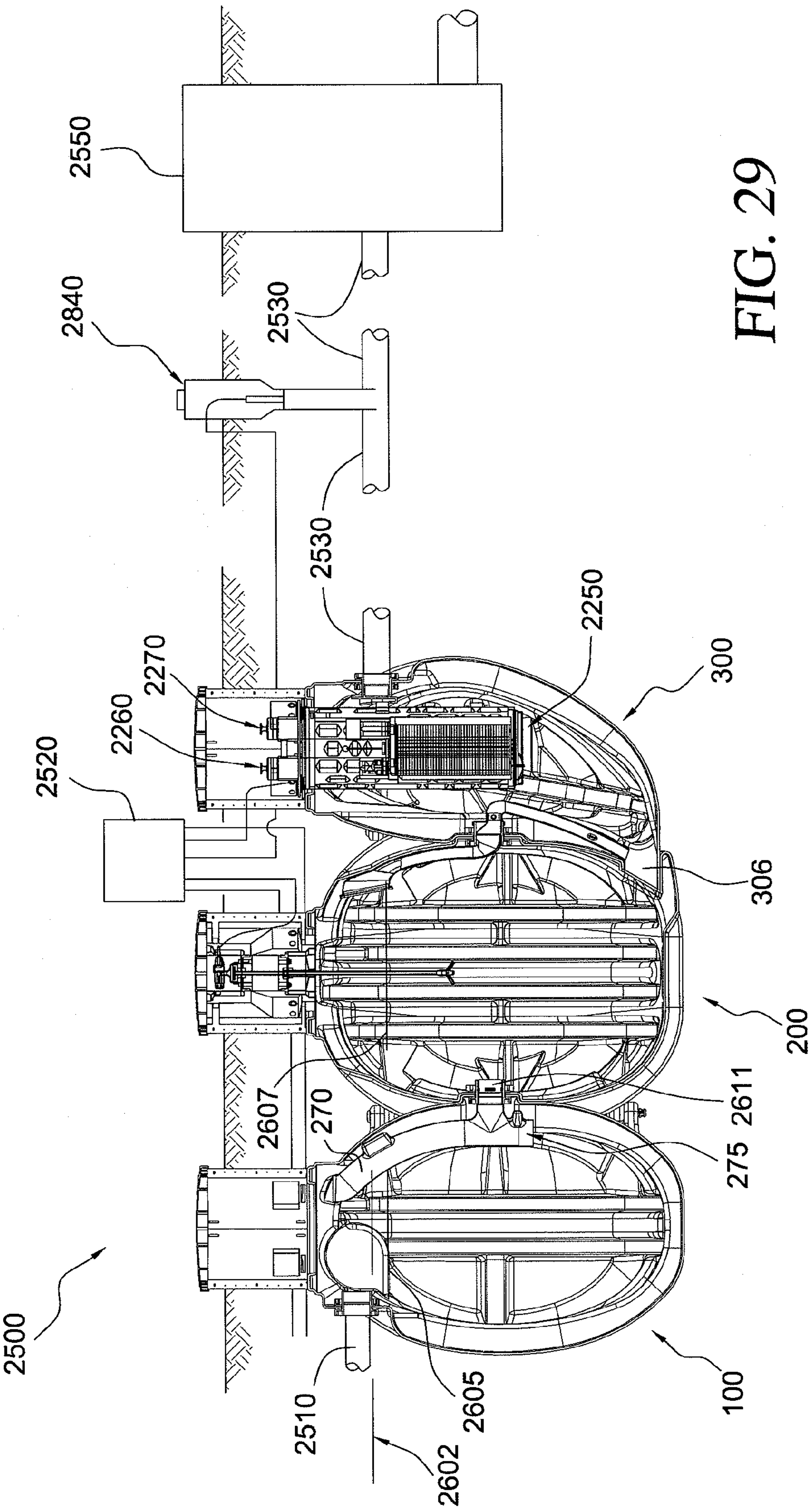
FIG. 29 is a cross-sectional view of the wastewater treatment system installation of FIG. 28 along line F-F, in accordance with one or more embodiments of the present invention.

FIG. 29 is a cross-sectional view of the wastewater treatment system installation of FIG. 28 along line F-F, in accordance with one or more embodiments of the present invention. In FIG. 29, the chlorination system 2260 is connected to the control center 2520 by a first wiring connection 2910 to permit the monitoring and alerting of a low chemical state, and the dechlorination system 2270 is connected to the control center 2520 by a second wiring connection 2920 to permit the monitoring and alerting of a low chemical state in the dechlorination system 2270. If multiple feed tubes are used, wiring of the systems in series is recommended, but not required.

Figure 30:
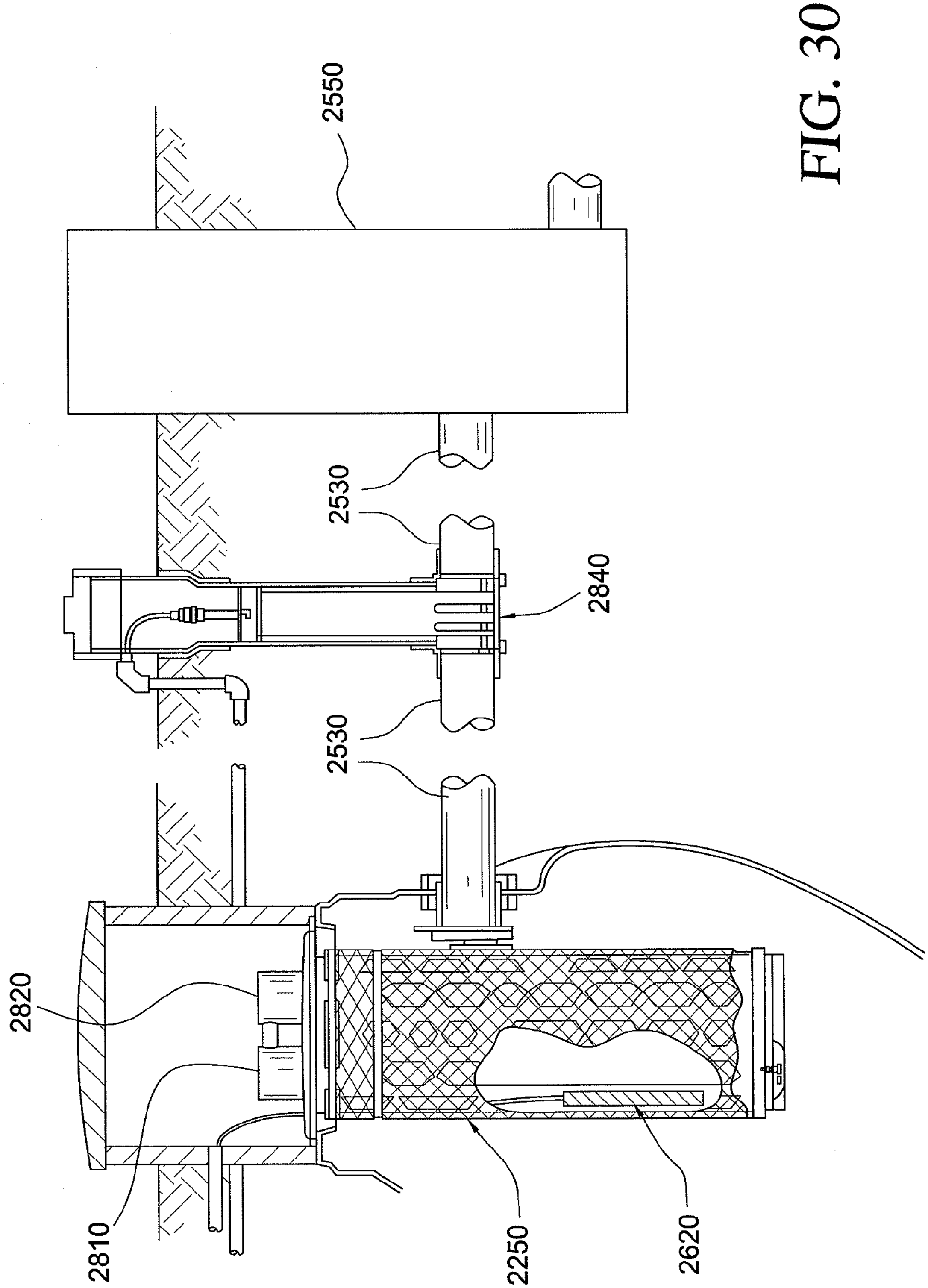
FIG. 30 is a partial cross-sectional side view of a discharge system of the wastewater treatment system installation of FIG. 25, in accordance with one or more embodiments of the present invention.

FIG. 30 is a partial cross-sectional side view of a discharge system of the wastewater treatment system installation of FIG. 28, in accordance with one or more embodiments of the present invention. In FIG. 30, details of the wastewater treatment system 2250, the bubble stone diffuser 2620, the inline dechlorination system 2840, and the freefalling sampling port 2550 are shown.

Figure 31:
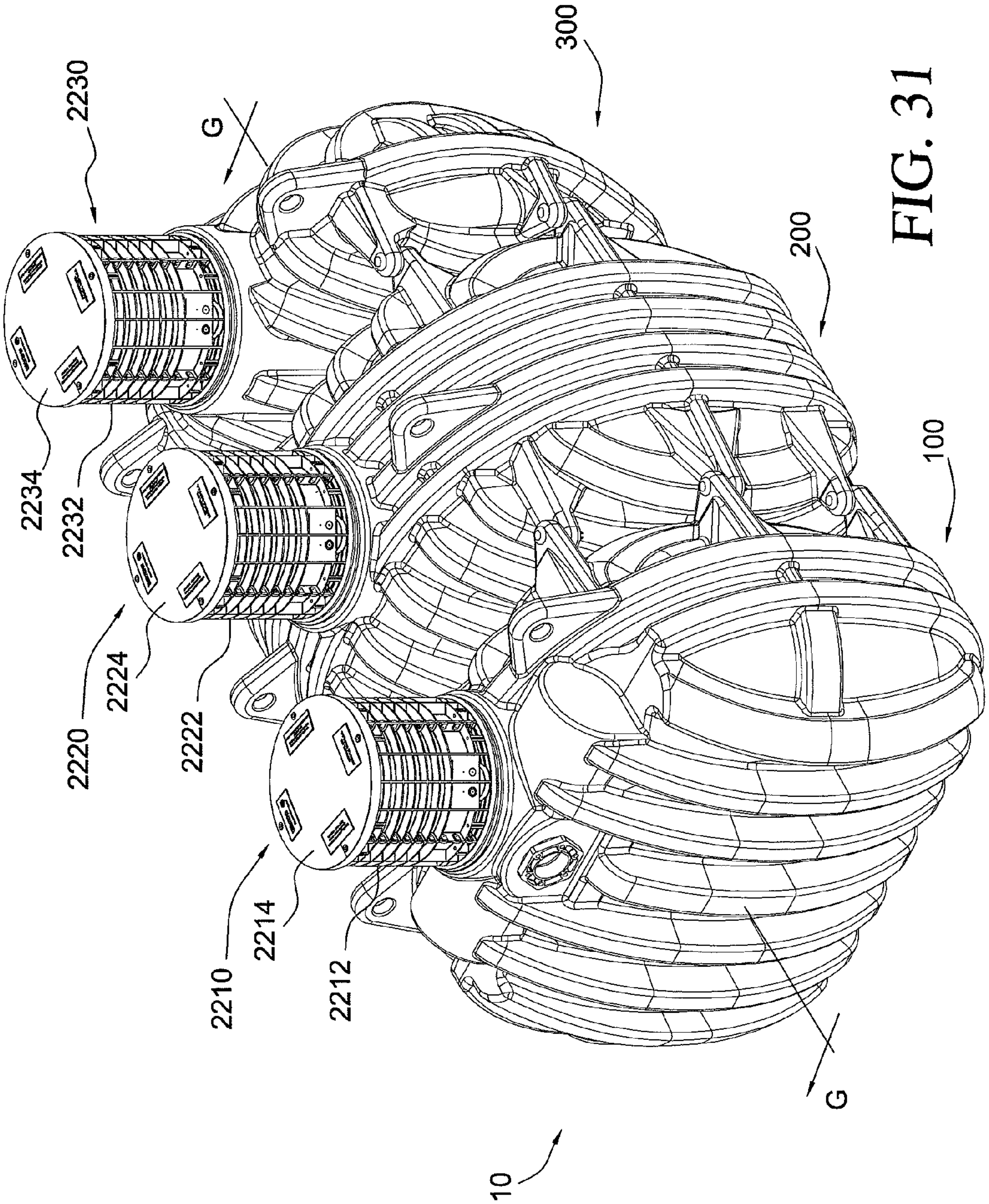
FIG. 31 is a side-perspective view of a wastewater treatment system tank with a pretreatment chamber, an aeration chamber, and a clarification chamber with a riser attached to each chamber, in accordance with one or more embodiments of the present invention.

FIG. 31 is a front-side perspective view of a wastewater treatment system tank with a pretreatment chamber, an aeration chamber, and a clarification chamber with a riser attached to each chamber, in accordance with one or more embodiments of the present invention. In FIG. 31, the pretreatment chamber riser 2210, the aeration chamber riser 2220 and the clarification chamber riser 2230 are shown connected to their respective chambers in wastewater treatment system tank 10.

Figure 32:
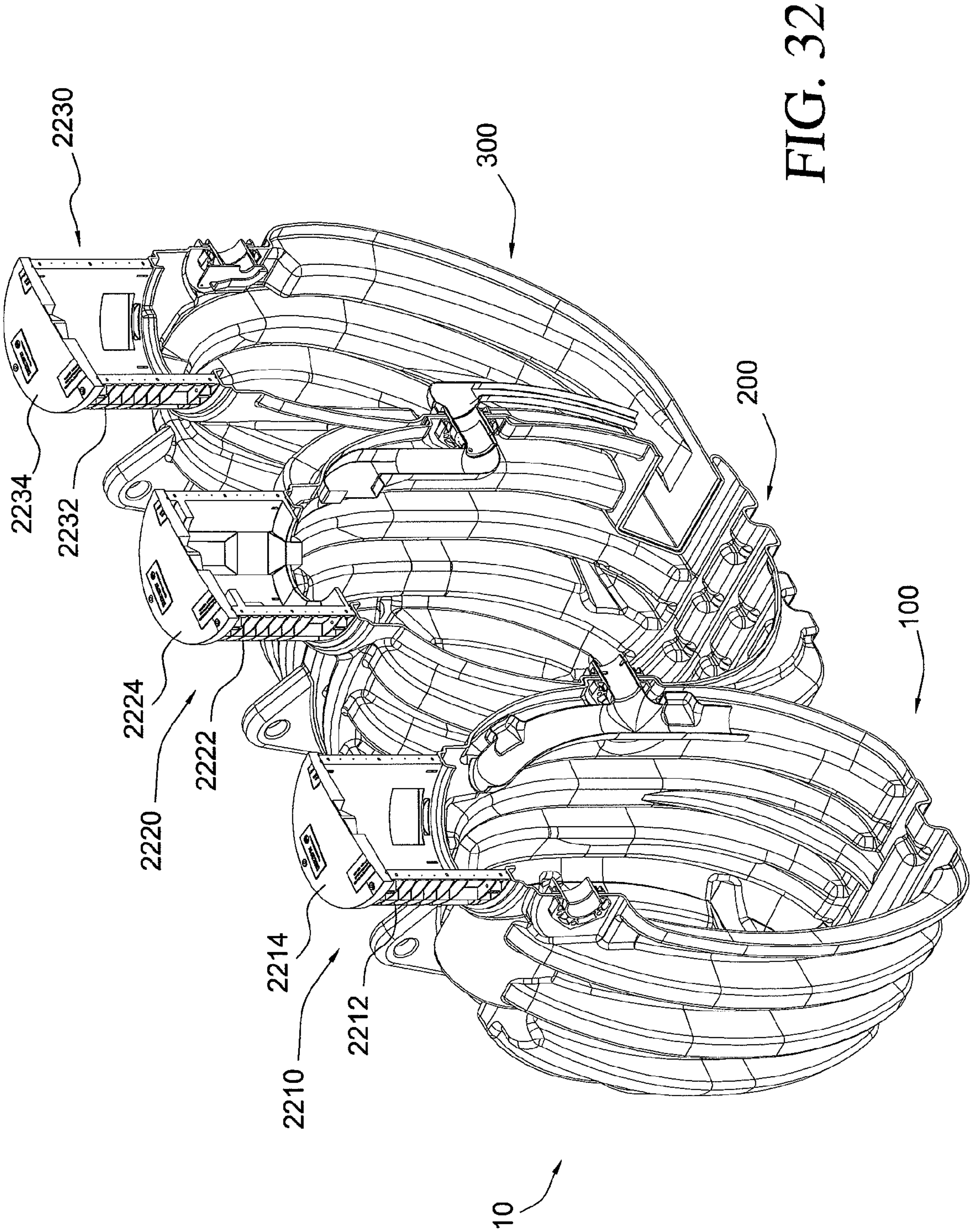
FIG. 32 is a side perspective, cross-sectional view of the wastewater treatment system tank of FIG. 31 along line G-G, in accordance with one or more embodiments of the present invention.

FIG. 32 is a side perspective, cross-sectional view of the wastewater treatment system tank 10 of FIG. 31 along line G-G, in accordance with one or more embodiments of the present invention.

Figure 33:
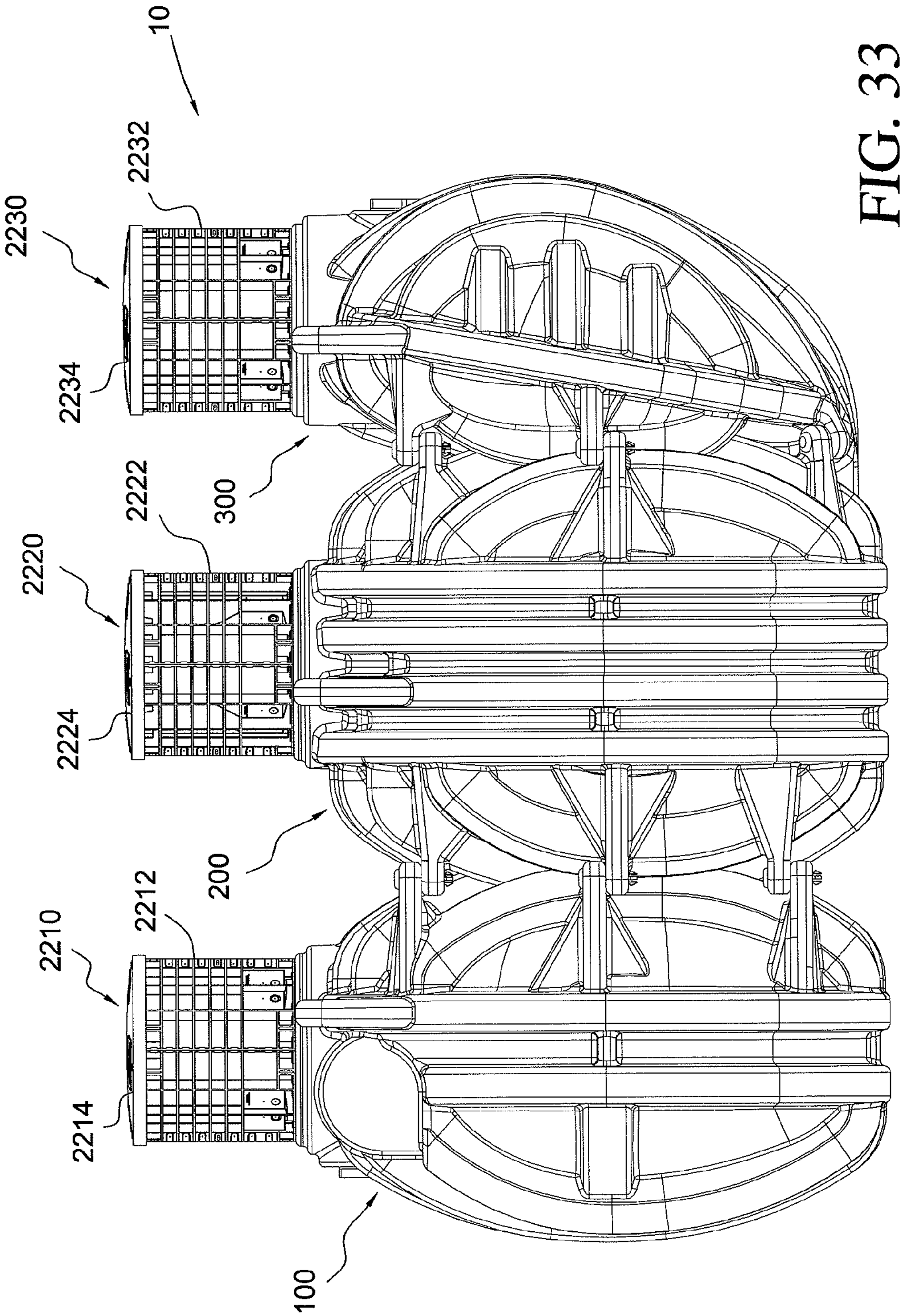
FIG. 33 is a right side view of the wastewater treatment system tank of FIG. 31, in accordance with one or more embodiments of the present invention.

FIG. 33 is a right side view of the wastewater treatment system tank 10 of FIG. 31 showing the exterior features as described above, in accordance with one or more embodiments of the present invention.

Figure 34:
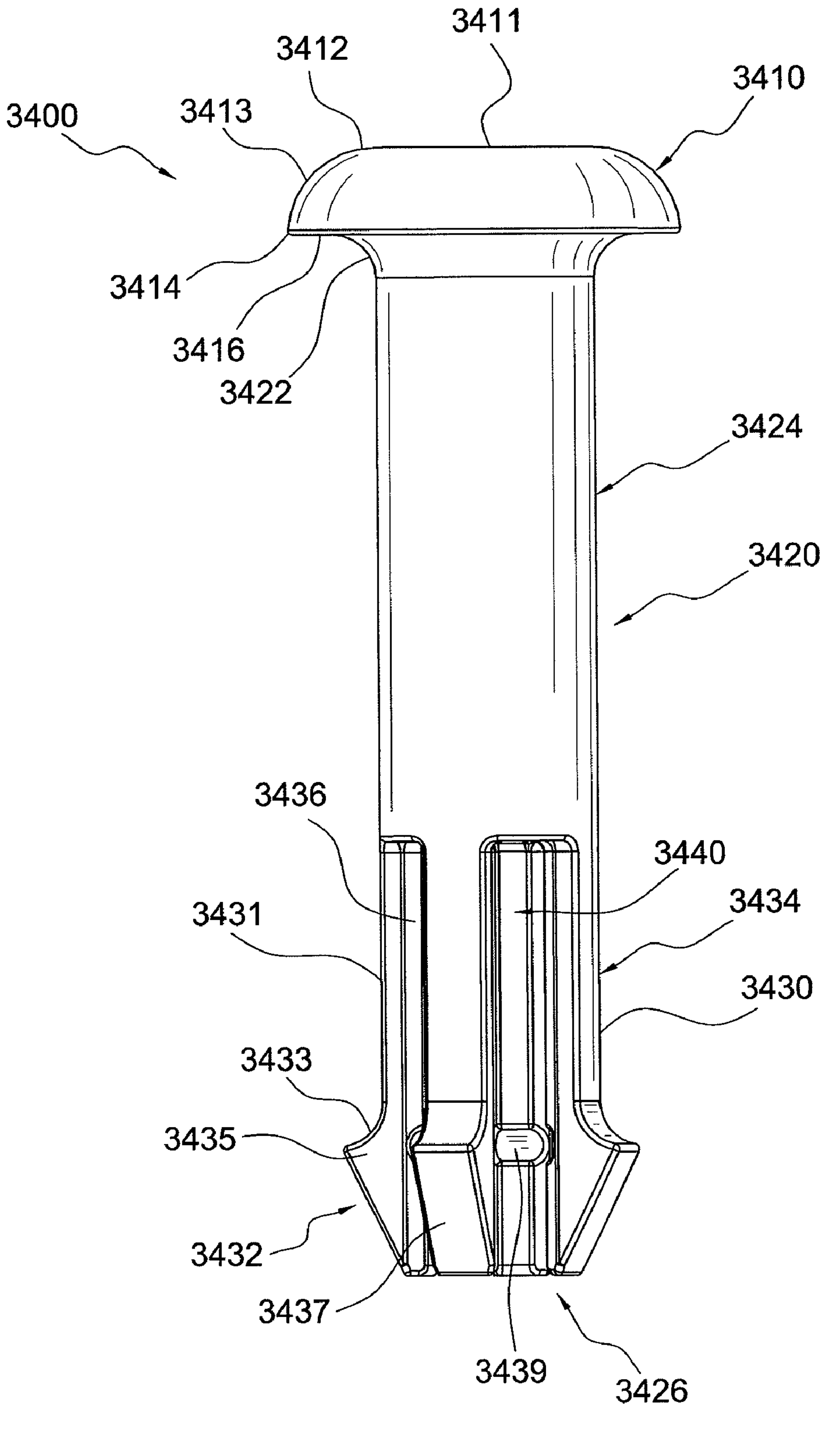
FIG. 34 is a side view of a rivet used to connect sets of flanges on a pretreatment chamber with cooperating flanges on an aeration chamber, and a second set of flanges on the aeration chamber with cooperating flanges on a clarification chamber, in accordance with one or more embodiments of the present invention.

FIG. 34 is a side view of a rivet used to connect sets of flanges on a pretreatment chamber with cooperating flanges on an aeration chamber, and a second set of flanges on the aeration chamber with cooperating flanges on a clarification chamber, in accordance with one or more embodiments of the present invention. In FIG. 34, a rivet 3400 is made of the same polyethylene material as each of the chambers of the wastewater treatment system 10. Rivet 3400 includes a head 3410 with a substantially flat circular top 3411 with an outer circumferential portion 3412 from which an outer outwardly and downwardly depending partially annular wall 3413 depends and ends with a bottom ridge 3414. A substantially flat ring-shaped bottom portion 3416 extends substantially perpendicularly away from bottom ridge 3414 and toward a substantially cylindrical shaft 3420. A top portion 3422 of shaft 3420 meets an inner edge (not numbered) of substantially flat ring-shaped bottom portion 3416 and the top portion 3422 depends inwardly and downwardly away from the inner edge of substantially flat ring-shaped bottom portion 3416 and toward and connects to an upper portion 3424 of shaft 3420. The upper portion 3424 makes up about 60% of shaft 3420 and is solid and a lower portion 3434 makes up about 40% of shaft 3420 and includes multiple flexible prongs 3430 separated by multiple grooves 3440 which extend to and are open at an end 3426 of shaft 3420. Each flexible prong 3430 includes a substantially straight, downwardly depending rectangular body 3431 with a substantially triangular-shaped end portion 3432 including a curved section 3433 that depends outwardly and downwardly from rectangular body 3431 and has an end point 3435 from which an inwardly and downwardly depending face 3437 extends to and terminates by connecting with an inner surface 3436 of flexible prong 3430. On inner surface 3436 of each prong and substantially even with curved section 3433 is a grooved section 3439 that acts to receive and hold in place a locking mechanism to lock the flexible prongs 3430 in an open position and prevent them from being compressed and removed from the flange openings 120, 130. The flexible prongs 3430 are designed to flex inwardly when inserted into the flange openings and then return to their non-flexed position when the triangular-shaped end portion 3432 exits the bottom flange opening.

Figure 35:
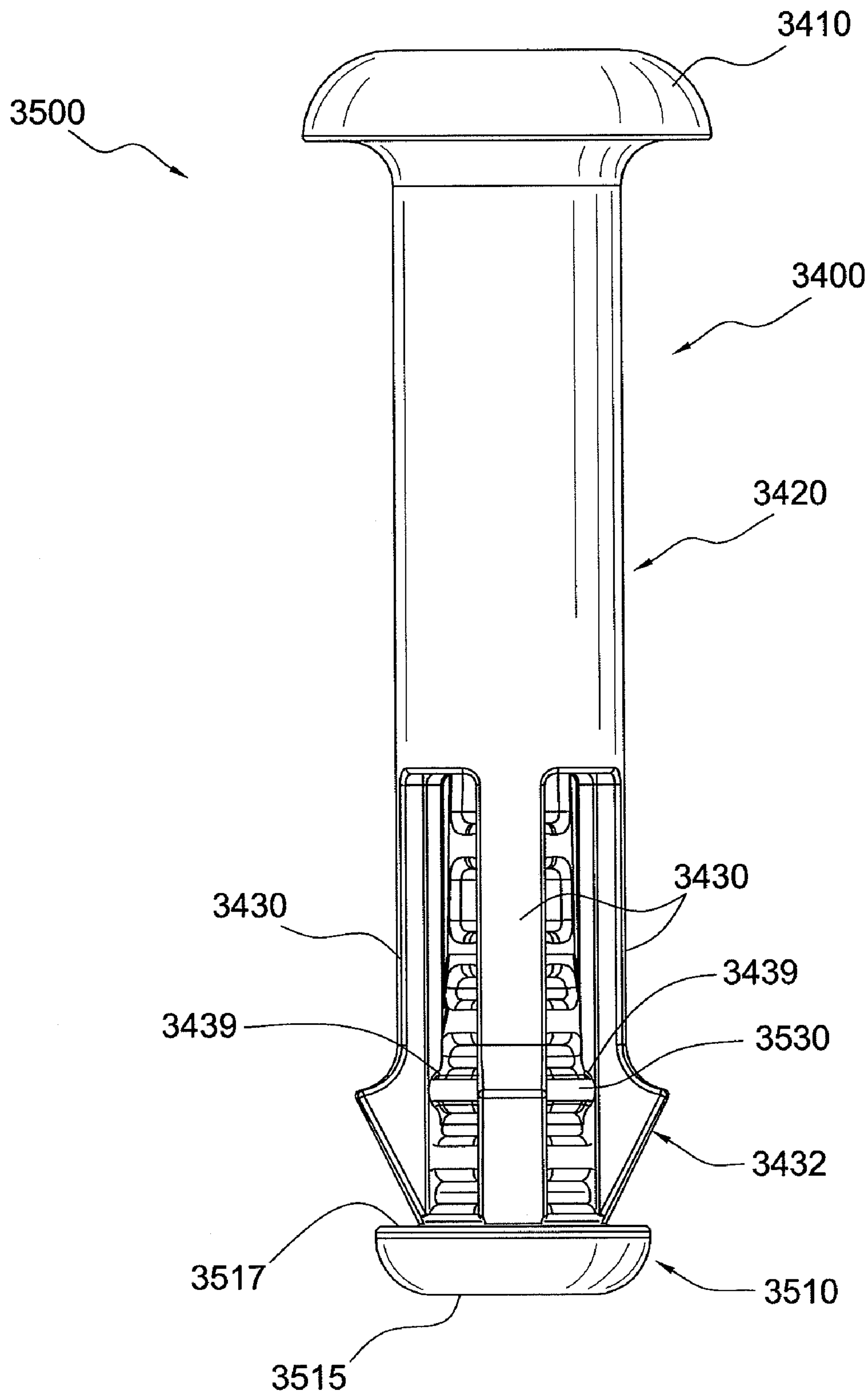
FIG. 35 is a side view of the rivet of FIG. 34 and a locking pin used to connect sets of flanges on a pretreatment chamber with cooperating flanges on an aeration chamber, and a second set of flanges on the aeration chamber with cooperating flanges on a clarification chamber, in accordance with one or more embodiments of the present invention.

FIG. 35 is a side view of a rivet and locking pin combination 3500, which includes the rivet 3400 of FIG. 34 with a locking pin 3510 inserted into and seated in the shaft 3420 of rivet 3400, in accordance with one or more embodiments of the present invention. As seen in FIG. 35, the locking pin 3510 is inserted between the flexible prongs 3430 such that a bottom side 3517 of a head 3515 of the locking pin 3510 rests against the distal ends of each of the triangular-shaped end portions 3432. An annular fastening ring 3530, which is located on a portion of the body of the locking pin 3510, seats in grooves 3439 on the insides of each of the triangular-shaped end portions 3432 and fastens the locking pin 3510 and rivet 3400 together. A more detailed view and description of the construction of the locking pin 3510 is provided below in relation to FIG. 36.

Figure 36:
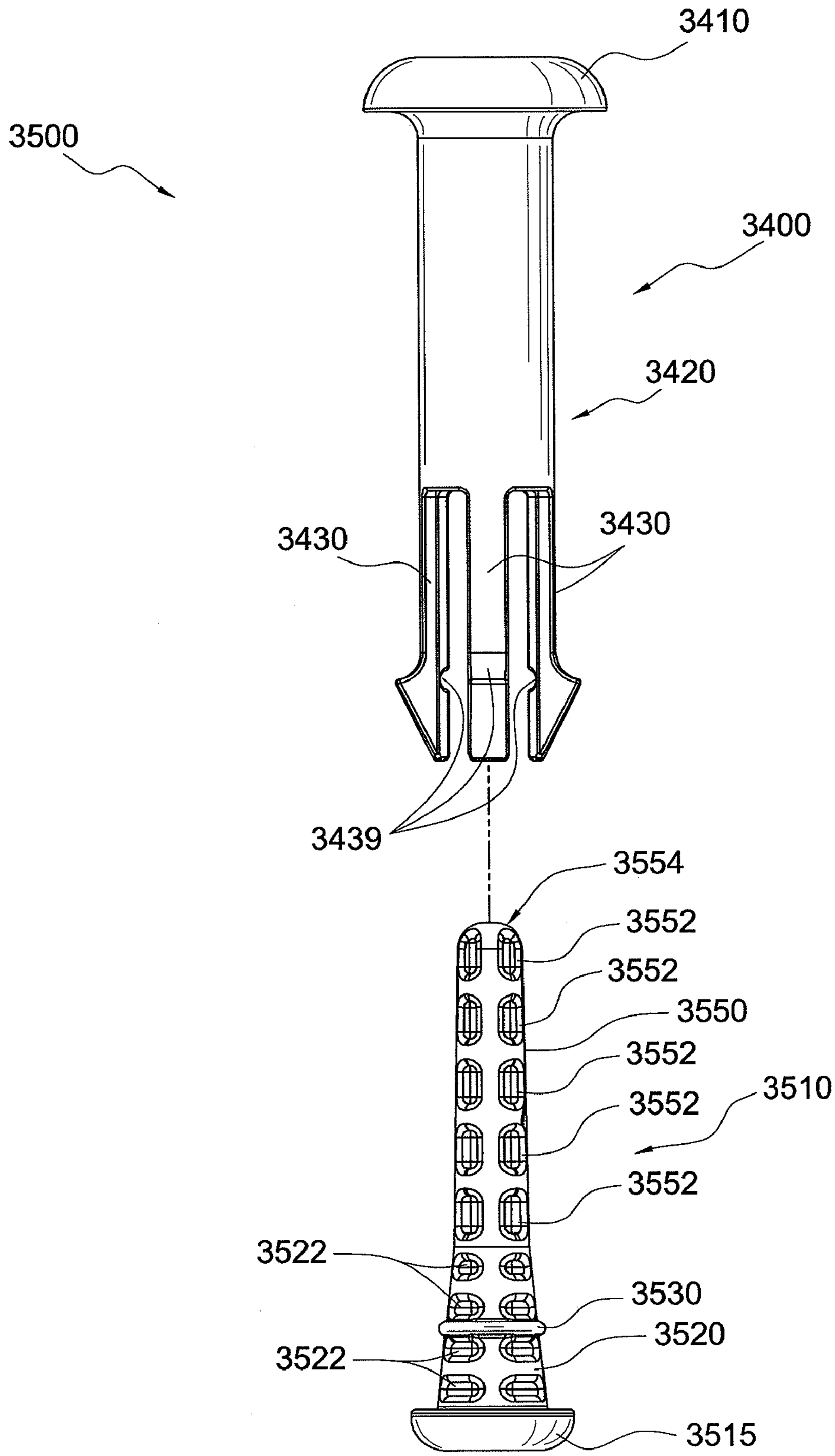
FIG. 36 is an exploded side view of the rivet and locking pin of FIG. 35, in accordance with one or more embodiments of the present invention.

FIG. 36 is an exploded side view of the rivet and locking pin of FIG. 35, in accordance with one or more embodiments of the present invention. In FIG. 36, the locking pin 3510 is seen as having a substantially conical shape that is configured to fit into the inside of and mate with rivet 3400. The locking pin 3510 includes a head 3515 with a rounded top and a substantially flat bottom from which a conical section 3520 extends inwardly away from the substantially flat bottom of the head 3515 and connects with a top end of a substantially cylindrical body section 3550. The conical section 3520 includes an annular ring 3530 located around substantially the middle of and coaxially aligned with the conical section 3520. The conical section 3520 has eight pairs of opposing lateral openings evenly arranged around the conical section 3520 with four pairs above the annular ring 3530 and four pairs below the annular ring 3530. The annular ring 3530 is positioned and sized to cooperatively mate with the grooves 3439 on the inside of the shaft 3420 of the rivet 3400. The cylindrical body 3550 has a rounded end 3554 to ensure a smooth insertion into the inside of the shaft 3420 of the rivet 3400. The cylindrical body 3550 also has ten pairs of evenly spaced, opposing and longitudinally aligned openings 3552.

Figure 37:
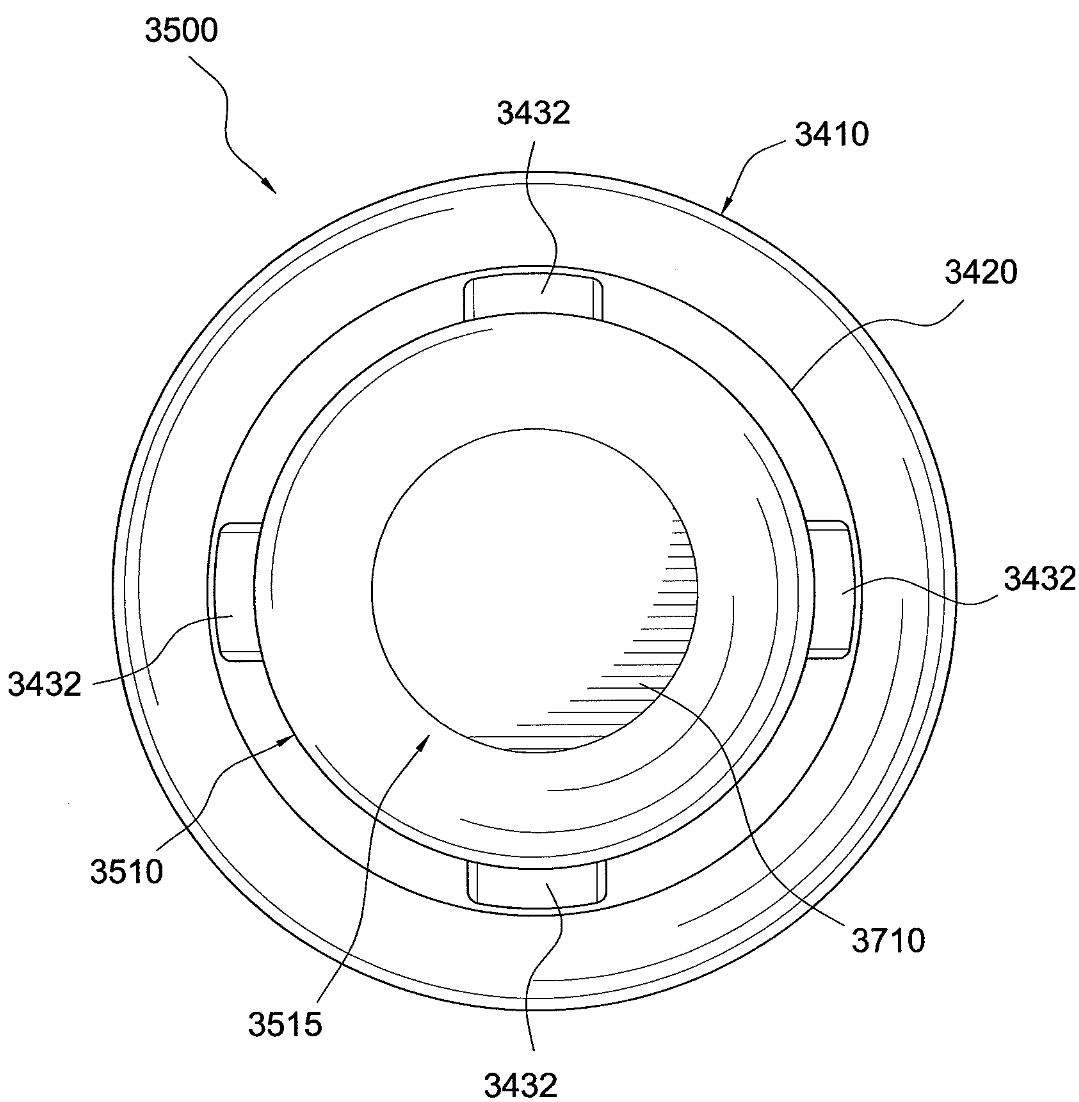
FIG. 37 is a bottom view of the rivet and locking pin of FIG. 35, in accordance with one or more embodiments of the present invention.

FIG. 37 is a bottom view of the mated rivet and locking pin of FIG. 35, in accordance with one or more embodiments of the present invention. In FIG. 37, the top 3710 of the head 3515 of locking pin 3510 is seen in the center of the locking pin 3510. Outer edges of the triangular-shaped end portions 3432 may be seen from beneath the head 3515 and between the head 3515 and the shaft 3420 of the rivet 3400.

Figure 38:
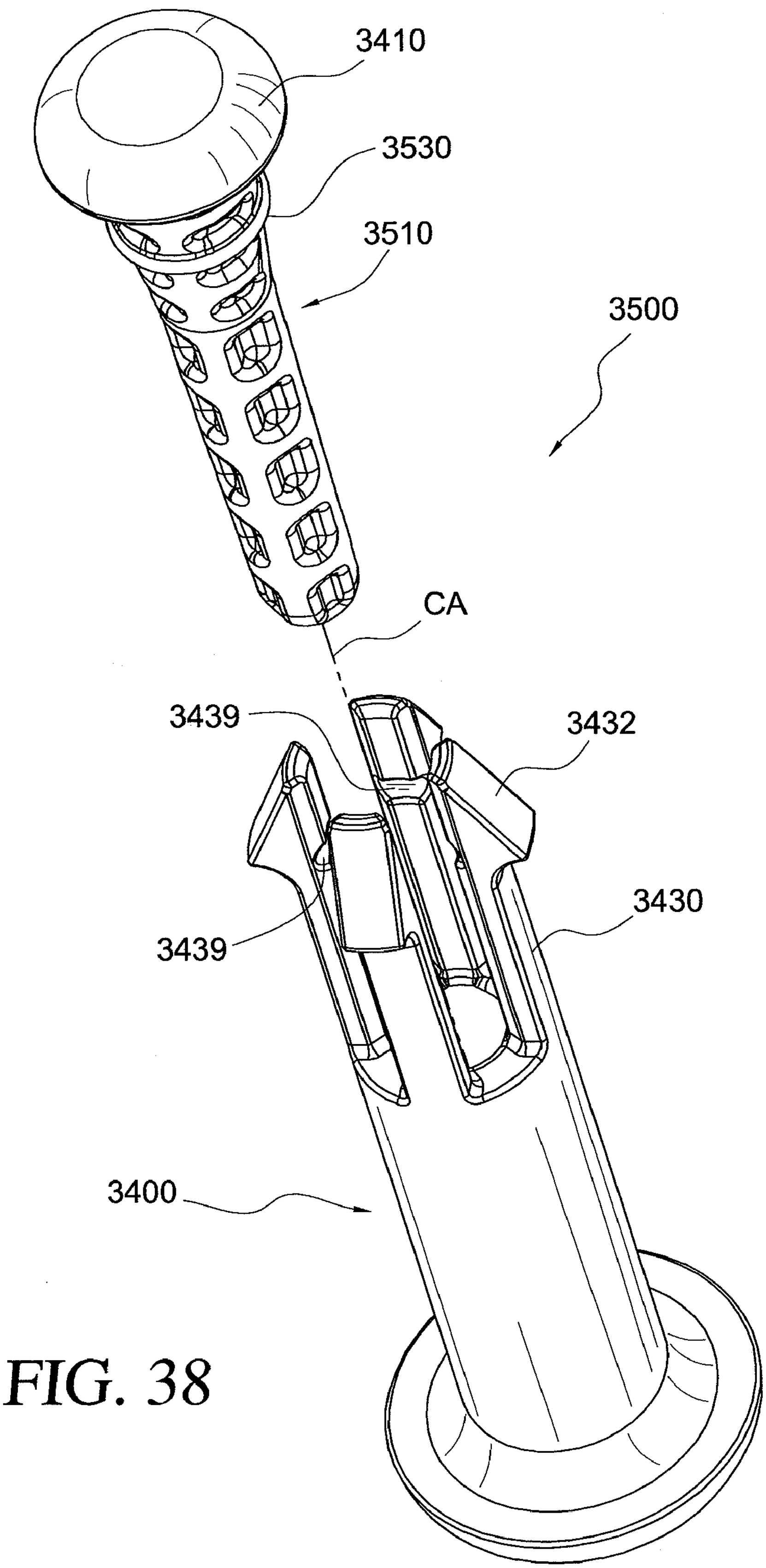
FIG. 38 is a perspective view of the exploded side view of the rivet and locking pin of FIG. 36, in accordance with one or more embodiments of the present invention.

FIG. 38 is a bottom side, exploded perspective view of the rivet and locking pin of FIG. 36, in accordance with one or more embodiments of the present invention. In FIG. 38, with locking pin 3510 removed, the annular ring 3530 and grooves 3439 can be more clearly seen. The annular ring 3530 is designed to fasteningly seat in and mate with the grooves 3439 when locking pin 3510 is inserted into the inside of the shaft 3420 of the rivet 3400 along the coaxial axis CA of the rivet 3400.

Figure 39:
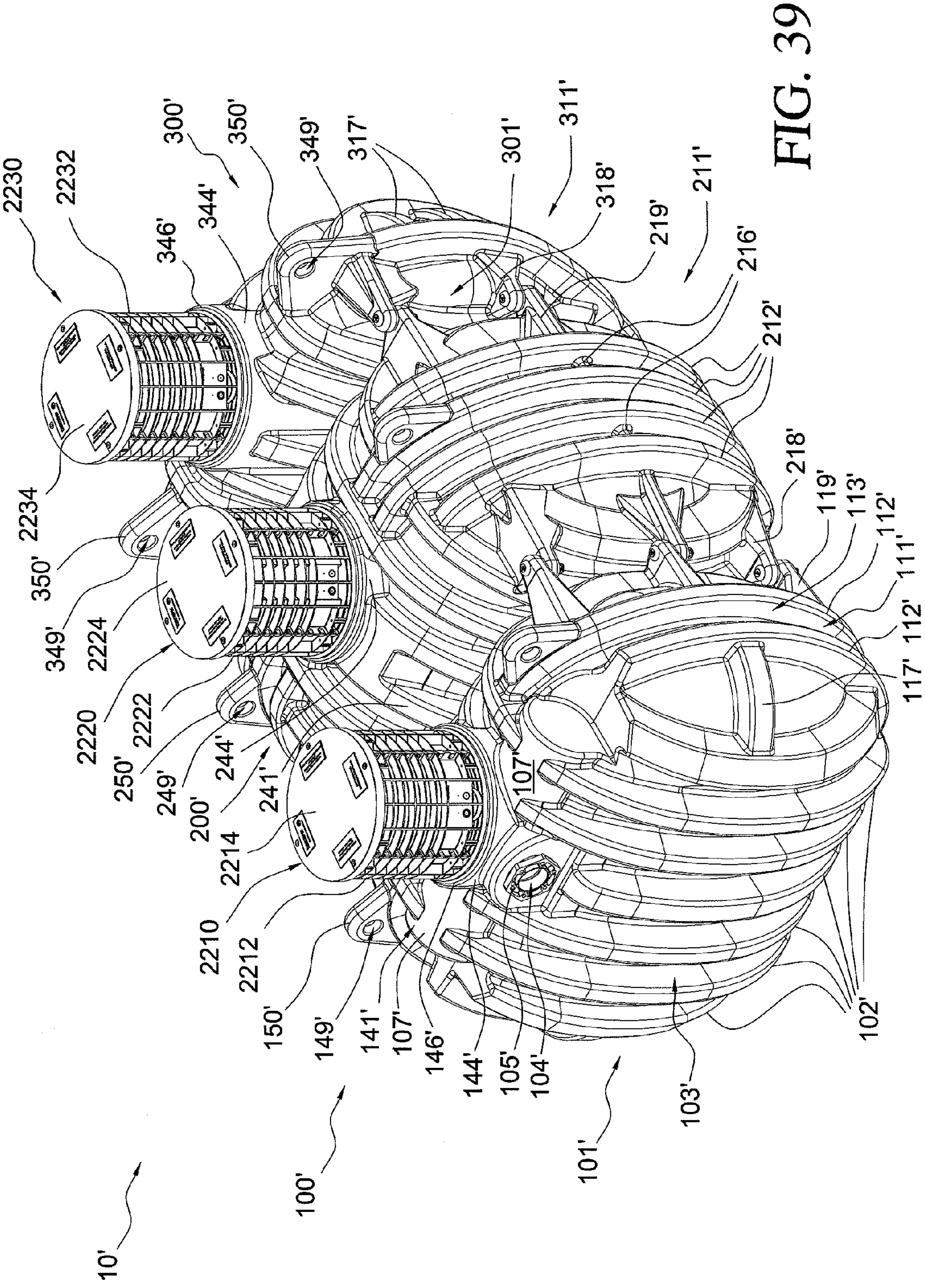
FIG. 39 is a side-perspective view of a wastewater treatment system tank with a pretreatment chamber, an aeration chamber, and a clarification chamber, in accordance with one or more other embodiments of the present invention.

FIG. 39 is a side-perspective view of a wastewater treatment system tank 10' including a pretreatment chamber, an aeration chamber, and a clarification chamber, in accordance with one or more other embodiments of the present invention. In FIG. 39, a pretreatment chamber 100' is shown including a front wall 101' and a right wall 111' connected to a right side of the pretreatment chamber front wall 101' and a pretreatment chamber back wall (not shown, and while similar to back wall 131 in FIG. 11, it is not identical) is connected to a right side of the pretreatment chamber right wall 111'. The pretreatment chamber back wall 131' is connected to a front wall 201' of an aeration chamber 200' of which a right wall 211' is connected to a right side of the aeration chamber front wall 201'. A back wall of the aeration chamber (not shown, and while similar to back wall 231 in FIG. 11, it is not identical) is connected to a front side 301' of a clarification chamber 300' of which a right side 311' is connected.

In FIG. 39, although not exactly the same, each of the pretreatment chamber 100', aeration chamber 200' and clarification chamber 300' has a generally oblate spheroid shape with ribbed walls on their front and back sides that extend vertically from the bottom wall to the top wall. In addition, the pretreatment and aeration chambers 100', 200' have multiple ribs that extend down from on or near the front side of a top wall, around the bottom wall and back up on or near the back side of the top wall. The clarification chamber 300' has a single substantially vertical rib that extends from near a top wall down each side of the clarification chamber to near a bottom wall 351' of the clarification chamber 300'. Gussets (i.e., cross-piece ribs) are also used on the left and right walls of the pretreatment and clarification chambers 127', 117' and 327', 317', respectively, between the vertical ribs on the left and right walls and the furthest outside rib on either the front or back wall. The curved oblate spheroid shape of each chamber, in combination with the ribbed walls and gussets, provide the necessary support and strength to prevent the chambers from collapsing when the system is installed and buried in the ground.

In FIG. 39, a top of pretreatment chamber front wall 101' has formed therein an inlet opening 104' through which an inlet access means 105' extends to connect to and receive incoming wastewater from an external supply source, for example, a pipe. An access opening 145' (obscured in FIG. 39, but seen in FIGS. 43 and 47) having a substantially cylindrical wall 144', which is formed in and extends upwardly away from top wall 141', and a raised annular lip 146' that is connected to a top of substantially cylindrical wall 144' to permit access for maintenance and repairs is covered by pretreatment chamber cylindrical riser 2210, which includes cylindrical wall 2212 and substantially circular top 2214. Alternatively, substantially circular top 2214 may be used to cover access opening 145'. Regardless, either substantially circular top 2214 or a bottom edge of cylindrical wall 2212 mates with and can be sealed to the tank to cover access opening 145'. The riser and/or cover are sealed to the tank using an "O"-ring and tamper resistant fasteners. Inlet opening 104' also extends through substantially cylindrical wall 144' to empty into pretreatment chamber 100' just below access opening 145'. In general, riser columns are used to variously house mechanical and electrical components of the overall system and to permit the wastewater treatment system tank 10' to be completely buried so that no part of any of the chambers is near the surface. An arched portion 107' is located along a front half of top wall 141' and extends to and connects to substantially cylindrical wall 144' on either side of access opening 145' and is substantially perpendicular to inlet opening 104'. A pair of substantially triangularly-shaped hoist points 150' extend substantially perpendicularly upward and away from top wall 141' and are spaced equidistantly apart on opposite sides of access opening 145'. A lift opening 149' is formed in each hoist point to permit easy connection to a hook, a cable, a rope, or the like to permit the pretreatment chamber to be lifted, moved and/or placed in the ground during installation. In general, a top of each hoist point 150' does not extend beyond a top of access opening 145'. This is best shown in FIGS. 3 and 4.

In FIG. 39, a set of three spaced-apart, back right connector flanges 119' extend from between pretreatment chamber right wall 111' and pretreatment chamber back wall 131' in a substantially horizontal plane toward aeration chamber 200'. Although not seen in FIG. 39, another set of three spaced-apart, back left connector flanges 129' extend from between pretreatment chamber left wall (not shown) and pretreatment chamber back wall 131 in a substantially horizontal plane toward aeration chamber 200'.

Figure 40:
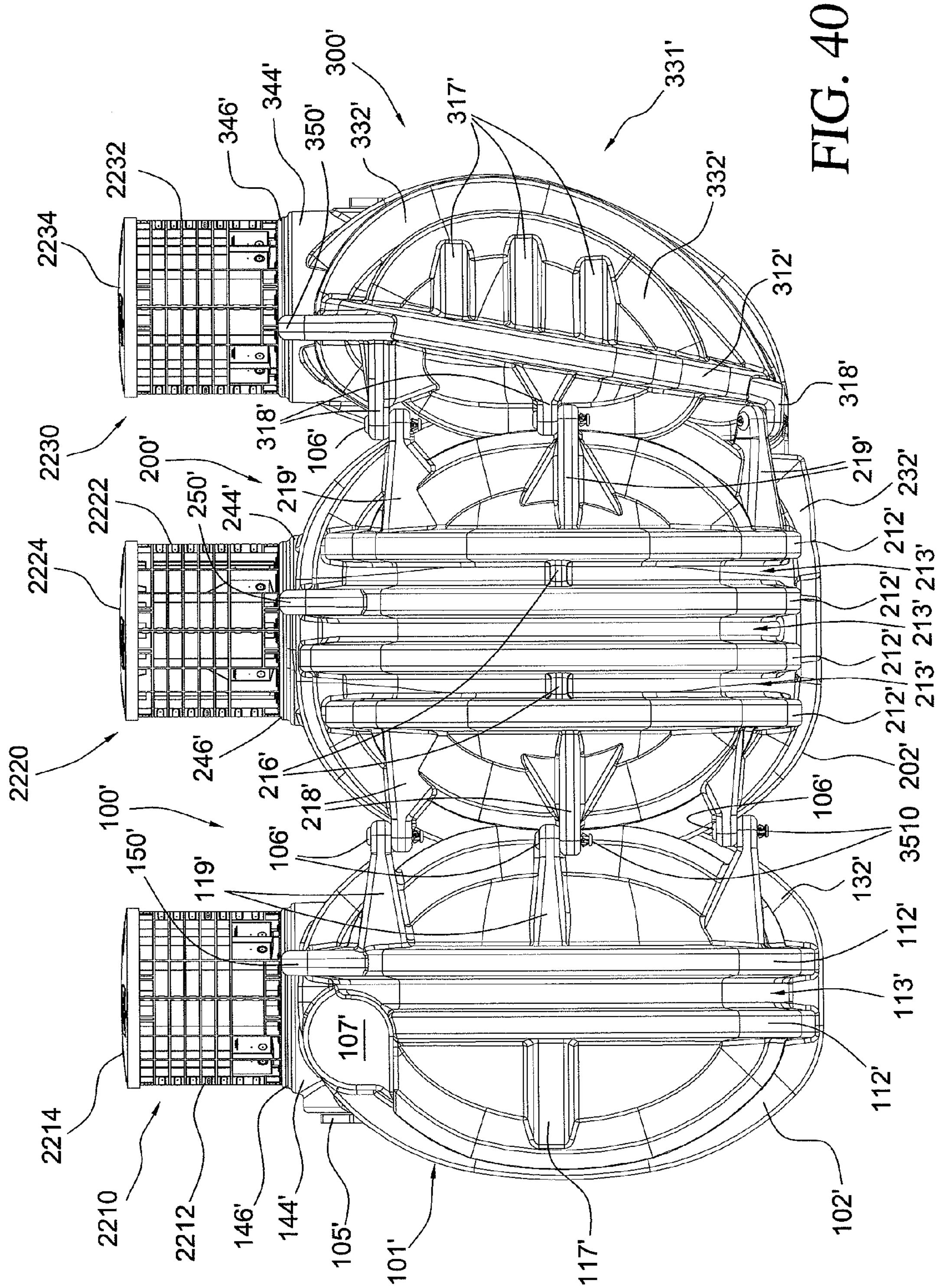
FIG. 40 is a right side view of a wastewater treatment system tank with a pretreatment chamber, an aeration chamber, and a clarification chamber, in accordance with one or more other embodiments of the present invention.
Figure 41:
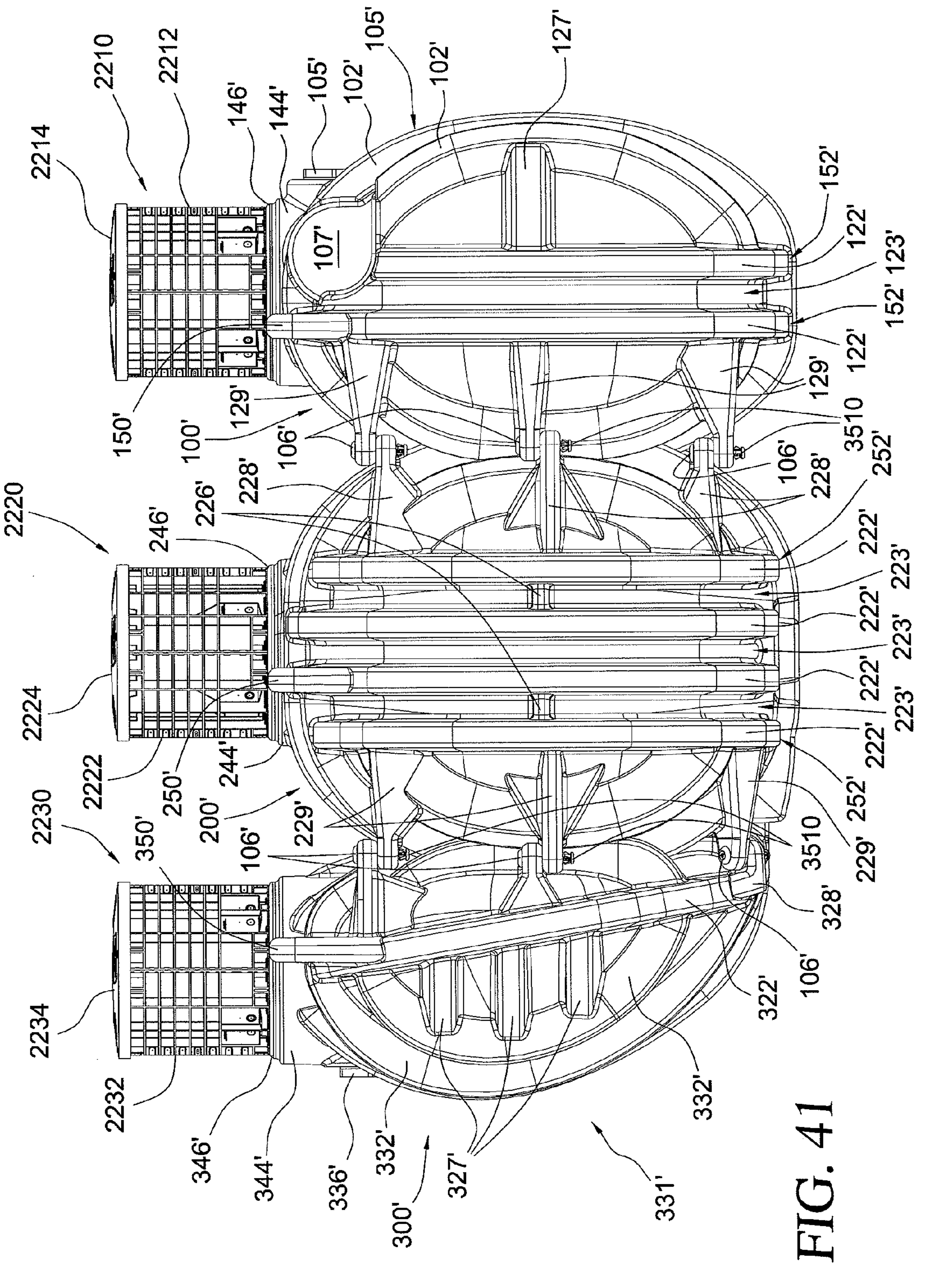
FIG. 41 is a left side view of a wastewater treatment system tank with a pretreatment chamber, an aeration chamber, and a clarification chamber, in accordance with one or more other embodiments of the present invention.

In FIG. 39, aeration chamber front wall 201' has formed therein an inlet opening (not shown) to connect to and receive incoming pretreated wastewater from pretreatment chamber 100'. An access opening 245' (obscured in FIG. 39, but seen in FIGS. 43 and 47) having a substantially cylindrical wall 244', which is formed in and extends upwardly away from an aeration chamber top wall 241', and a raised annular lip 246' that is connected to a top of substantially cylindrical wall 244' to permit access for maintenance, repairs, installation of the aeration systems equipment (not shown here, but see description for FIGS. 22 and 23). The access opening 245' is covered by aeration chamber cylindrical riser 2220 that is mated with raised annular lip 246' and the top of substantially cylindrical wall 244' to seal access opening 245'. In general, aeration chamber cylindrical riser 2220 on aeration chamber 200' is used to house mechanical and electrical components of the overall system and to permit the wastewater treatment system tank 10' to be completely buried so that no part of any of the chambers is near the surface, but access to the chambers can be affected through the risers. Alternatively, the access opening 245' or which may be covered by a simple substantially flat cover, for example, substantially circular top 2224 that mates with and can be sealed to raised annular lip 246' and the top of substantially cylindrical wall 244' and for maintenance and repairs. A pair of substantially triangularly-shaped hoist points 250' extend substantially perpendicularly upward and away from top wall 241' and are spaced equidistantly apart on opposite sides of access opening 245'. A lift opening 249' is formed in each hoist point to permit easy connection to a hook, a cable, a rope, or the like to permit the pretreatment chamber to be lifted, moved and/or placed in the ground during installation. In general, a top of each hoist point 250' does not extend beyond a top of access opening 245'. This is best shown in FIGS. 40 and 41.

In FIG. 39, a set of three spaced-apart, front right connector flanges 218' extend from between aeration chamber right wall 211' and aeration chamber front wall 201 in a substantially horizontal plane toward pretreatment chamber 100'. Although not seen in FIG. 39, another set of three spaced-apart, front left connector flanges 228' extend from between aeration chamber left wall (not shown) and aeration chamber front wall 201' in a substantially horizontal plane toward pretreatment chamber 100'. A top and a middle aeration chamber front right connector flanges 218' extend below a top and middle pretreatment back right connector flanges 119' to permit individual fastening means to fixedly connect the top flanges to each other and the middle flanges to each other, for example, rivet 3400 or the rivet 3400 and locking pin 3510 combination. A bottom aeration chamber front right connector flange 218' extends above a bottom pretreatment back right connector flange 119' to permit another fastening means to fixedly connect the bottom flanges to each other, for example, rivet 3400 or the rivet 3400 and locking pin 3510 combination. Although not shown, the same configurations and connections are made between the left connector flanges 129' on the pretreatment chamber back wall 131' and the left connector flanges on the aeration chamber front wall 201'. In addition, a set of three spaced-apart, back right connector flanges 219' extend from between aeration chamber right wall 211' and aeration chamber back wall 231' in a substantially horizontal plane toward clarification chamber 300'. Although not seen in FIG. 39, another set of three spaced-apart, back left connector flanges 229' extend from between aeration chamber left wall (not shown) and aeration chamber back wall 231' in a substantially horizontal plane toward clarification chamber 300'.

In FIG. 39, clarification chamber front wall 301' has formed therein an inlet opening (not shown) to connect to and receive incoming aerobically treated wastewater from aeration chamber 200'. An access opening 345' (obscured in FIG. 39, but seen in FIGS. 43 and 47) having a substantially cylindrical wall 344', which is formed in and extends upwardly away from a clarification chamber top wall 341', and a raised annular lip 346' that is connected to a top of substantially cylindrical wall 344'. Raised annular lip and the top of substantially cylindrical wall 344' is mated with and permanently or removably sealed to clarification chamber cylindrical riser 2230 to permit access to the chamber for maintenance and repairs and to install a non-mechanical flow equalization device, for example, a Bio-Kinetic® filtration system, which is described in U.S. Pat. No. 5,413,706 issued on May 9, 1995, the content of which is incorporated herein in its entirety. Various other embodiments of the Bio-Kinetic® system 2250 are described in U.S. Pat. Nos. 5,207,896, 5,409,604, 5,264,120, 6,860,994, 7,666,301, 7,674,372, and 7,691,272, the contents of all of which are also incorporated herein in their entireties, therefore additional description of the wastewater management system 2250 is notprovided herein. Access opening 345' may alternatively be covered by a simple substantially flat cover, for example, substantially circular top 2234 that mates with and can be removably sealed to raised annular lip 346' and the top of substantially cylindrical wall 344' to permit maintenance and repairs. In general, a riser column on clarification chamber 300' is used to house mechanical and electrical components of the overall system and to permit the wastewater treatment system tank 10' to be completely buried so that no part of any of the chambers is near the surface, but access to the chambers can be effected through the risers. Although not shown in FIG. 39, the non-mechanical flow equalization device may be seen installed in the clarification chamber 300' in FIGS. 22, 24, 26 and 29.

Returning to FIG. 39, the clarification chamber 300' receives the flow of liquid from the aeration chamber and the non-mechanical flow equalization device is located in clarification chamber 300' to receive, filter, settle and flow equalize clarified liquid and then discharge the final clarified liquid. The access opening 345' is covered with clarification chamber cylindrical riser 2230 that that is mated with and sealed to access opening 345'. In general, clarification chamber cylindrical riser 2230 is used to house mechanical and electrical components of the overall system and to permit the wastewater treatment system tank 10' to be completely buried so that no part of any of the chambers is near the surface. A pair of substantially triangularly-shaped hoist points 350' extend substantially perpendicularly upward and away from top wall 341' and are spaced equidistantly apart on opposite sides of access opening 345'. A lift opening 349' is formed in each hoist point to permit easy connection to a hook, a cable, a rope, or the like to permit the pretreatment chamber to be lifted, moved and/or placed in the ground during installation. In general, a top of each hoist point 350' does not extend beyond a top of access opening 345'. This is best shown in FIGS. 40 and 41.

In FIG. 39, a set of three spaced-apart, front right connector flanges 318' extend from between clarification chamber right wall 311' and clarification chamber front wall 301' in a substantially horizontal plane toward aeration chamber 200'. Although not seen in FIG. 39, another set of three spaced-apart, front left connector flanges 328' extend from between clarification chamber left wall (not shown) and clarification chamber front wall 301' in a substantially horizontal plane toward aeration chamber 200'. The top and middle clarification chamber front right connector flanges 318' extend substantially perpendicularly away from the clarification chamber front wall 301' to above the top and middle aeration chamber back right connector flanges 219' that, likewise, extend substantially perpendicularly away from the aeration chamber back wall 231' to permit individual fastening means to fixedly connect the top flanges to each other and the middle flanges to each other, for example, rivet 3400 or the rivet 3400 and locking pin 3510 combination. A bottom clarification chamber front right connector flange 318' extends below a bottom aeration back right connector flange 219' to permit another fastening means to fixedly connect the bottom flanges to each other, for example, rivet 3400 or the rivet 3400 and locking pin 3510 combination. As seen in FIG. 39, unlike the top and middle flanges, a bottom clarification chamber front right connector flange 318' extends to below a bottom aeration back right connector flange 219', and each extends downwardly and away from its respective chamber wall at an approximately 45° angle to be connected to each other with the rivet 106 or the rivet 3400 and locking pin 3510 combination. Although not shown, the same configurations and connections are made between the left connector flanges on the aeration chamber back wall 231' and the left connector flanges on the clarification chamber front wall 301'.

The wastewater treatment system tank 10' is constructed of rotationally molded, UV stabilized, high density polyethylene. Integrally molded ⅜" treatment chamber walls and the ribbed tank design ensure durability and maximum strength. Risers and lids are generally injection molded, and can be made of heavy duty, glass-filled polypropylene as well as other equivalent designs. All components within the system that will contact the wastewater are constructed entirely of molded plastic, stainless steel or rubber.

A benefit of the present invention is that the variety of ribs, grooves, gussets, flanges and other surfaces that comprise the wastewater treatment tank 10' of FIG. 39 act to keep the wastewater treatment tank 10' from shifting and/or rising up due to the freezing and thawing of the earth after it is installed and buried in the ground.

FIG. 40 is a right side view of the wastewater treatment system tank of FIG. 39 with pretreatment chamber 100', aeration chamber 200', and clarification chamber 300', in accordance with one or more other embodiments of the present invention. In FIG. 40, two pretreatment chamber right wall ribs 112' are separated by a pretreatment chamber right wall groove 113' and extend vertically down pretreatment chamber right wall 111' and curve around and onto bottom wall 151' to become pretreatment chamber bottom wall ribs 152' and connect with the right outer most ribs 102' and 132' on front wall 101' and back wall 131', respectively. The first right wall rib 112', which is nearest the pretreatment chamber front wall 101', begins at about the top of the pretreatment chamber right wall 111' and a right edge of top wall 141' that is about level with a bottom of arched portion 107'. The second right wall rib 112', which is nearest the pretreatment chamber back wall 131, begins on top wall 141' and is connected to a top of back wall rib 132' behind arched portion 107'.

In FIG. 40, four aeration chamber right wall ribs 212' are separated by three aeration chamber right wall grooves 213' and extend vertically down aeration chamber right wall 211' and curve around and onto bottom wall 251' and the two right outer ribs connect to outer front wall rib 202' and outer back wall rib 232'. Each of the aeration chamber right wall ribs 212' begin on aeration chamber top wall 241', with the two ribs 212' on the front-side of aeration chamber 200' each connected to a second to the outer front wall rib 202' and the two ribs 212' on the back-side of aeration chamber 200' each connected to a second to the outer back wall rib 232', and the second to outer front wall rib 202' and the second to the outer back wall rib 232' extend across top wall 241' and connect to each other. Two small gussets 216' are formed between the ribs 212', a first gusset 216' being between the first and second right wall ribs 212' and the second gusset 216' being between the third and fourth right wall ribs 212'. The two small gussets 216', 216' are horizontally axially aligned with each other and a top of the middle aeration chamber right front wall flange 218' and a top of the middle aeration chamber right back wall flange 219'.

In FIG. 40, pretreatment chamber right back wall flanges 119' overlap aeration chamber right front wall flanges 218' and are fastened together using fastening means, for example, rivets 106' or rivets 3400 and locking pins 3510 as shown in FIGS. 34-38 with compressible/expandable end tabs to lock the overlapping flanges together. During installation of the rivet 106' through axially-aligned openings in the overlapping flanges, the compressible/expandable end tab is compressed to pass through the axially-aligned openings. When the compressible/expandable end tab has passed through the axially-aligned openings it expands outwardly and the tabs engage a bottom of the lower flange, thus locking the flanges together. The rivets 106' remain compressible after installation, so it is possible to disconnect chambers by compressing the bottom tabs of each rivet 106' and pushing the rivet up and out of the axially-aligned openings. Additional detail on the design of the rivet and locking pins is provided above in the description related to FIGS. 34-38. In addition to the rivet 3400 and rivet and locking pin combination 3500, other fastening means can include, for example, but are not limited to, a rigid annular ring, an cylindrical plug with an annular ring, a "C"-clip, a semi-rigid or rigid circular disk, and the like. The fastening means can be removably inserted into and mated with groove 3439 or permanently inserted into and mated with groove 3439 by an adhesive, a glue, heat, pressure, heat and pressure, welding, and the like.

In FIG. 40, a single right wall rib 312' extends at an angle down clarification chamber right wall 311' toward aeration chamber 200' and ends near bottom wall 351'. The right wall rib 312' begins on top wall 341' connected to a second to the outermost back wall rib 332' and a second to the outermost front wall rib 302' and extends downwardly from approximately a top of clarification chamber right wall 311' from below a bottom of an outer edge of hoist point 350'. The right wall rib 312' extends downwardly at an angle away from a center line of clarification chamber 300' toward a bottom edge of the clarification chamber front wall 301'. Three gussets 317' are formed between the clarification chamber right wall rib 312' and a first rib 332' on a back wall 331' of clarification chamber 300'. Each of the three gussets 317' are substantially perpendicular to and terminate against clarification chamber back wall 331' and are horizontally axially aligned with the middle clarification chamber right front wall flange 318'.

FIG. 41 is a left side view of a wastewater treatment system tank with pretreatment chamber 100', aeration chamber 200', and clarification chamber 300', in accordance with one or more other embodiments of the present invention. Since the chambers are substantially symmetrical, FIG. 41 is essentially a mirror image of FIG. 40. In FIG. 41, two pretreatment chamber left wall ribs 122' are separated by a pretreatment chamber left wall groove 123' and extend vertically down pretreatment chamber left wall 121' and curve around and onto bottom wall 151' to form pretreatment chamber bottom wall ribs 152' and connect with the left outer most ribs 102' and 132' on front wall 101' and back wall 131'. The first left wall rib 122', which is nearest the pretreatment chamber front wall 101', begins at about the top of the pretreatment chamber left wall 121' and a left edge of top wall 141' that is about level with a bottom of arched portion 107'. The second left wall rib 122', which is nearest the pretreatment chamber back wall 131', begins on top wall 141' and is connected to cylindrical wall 144' behind arched portion 107'.

In FIG. 41, pretreatment chamber left back wall flanges 129' overlap aeration chamber left front wall flanges 228' and are fastened together using fastening means, for example, the rivets and/or rivet and locking pin combination and/or other examples described above in relation to FIG. 40. Additional detail on the design of the rivets 106', 3400 and locking pins 3510 is provided above in the description related to FIGS. 34-38.

In FIG. 41, four aeration chamber left wall ribs 222' are separated by three aeration chamber left wall grooves 223' and extend vertically down aeration chamber left wall 221' and curve around and continue across bottom wall 251' and the two left outer ribs connect to outer front wall rib 202' and outer back wall rib 232'. Each of the aeration chamber left wall ribs 222' begin on aeration chamber top wall 241' and are each connected to a second to the outer front wall rib 202' and a second to the outer back wall rib 232' that extend across top wall 241' and connect to each other. Two small gussets 226' are formed between the ribs 222', a first gusset 226' being between the first and second left wall ribs 222' and the second gusset 226' being between the third and fourth left wall ribs 222'. The two small gussets 226', 226' are horizontally axially aligned with each other and a top of the middle aeration chamber left front wall flange 228' and a top of the middle aeration chamber left back wall flange 229'.

In FIG. 41, a single left wall rib 322' extends at an angle down clarification chamber left wall 321' toward aeration chamber 200' and ends near bottom wall 351'. The left wall rib 322' begins on top wall 341' and is connected to a second to the outermost back wall rib 332' and a second to the outermost front wall rib 302' and extends downwardly from approximately a top of clarification chamber left wall 321' from below a bottom of an outer edge of hoist point 350'. The left wall rib 322' extends downwardly at an angle away from a center line of clarification chamber 300' toward a bottom edge of the clarification chamber front wall 301'. Three gussets 327' are formed between the clarification chamber left wall rib 322' and a first rib 332' on a back wall 331' of clarification chamber 300'. Each of the three gussets 327' are substantially perpendicular to and terminate against clarification chamber back wall left rib 332' and are horizontally axially aligned with the middle clarification chamber left wall flange 328'.

Figure 42:
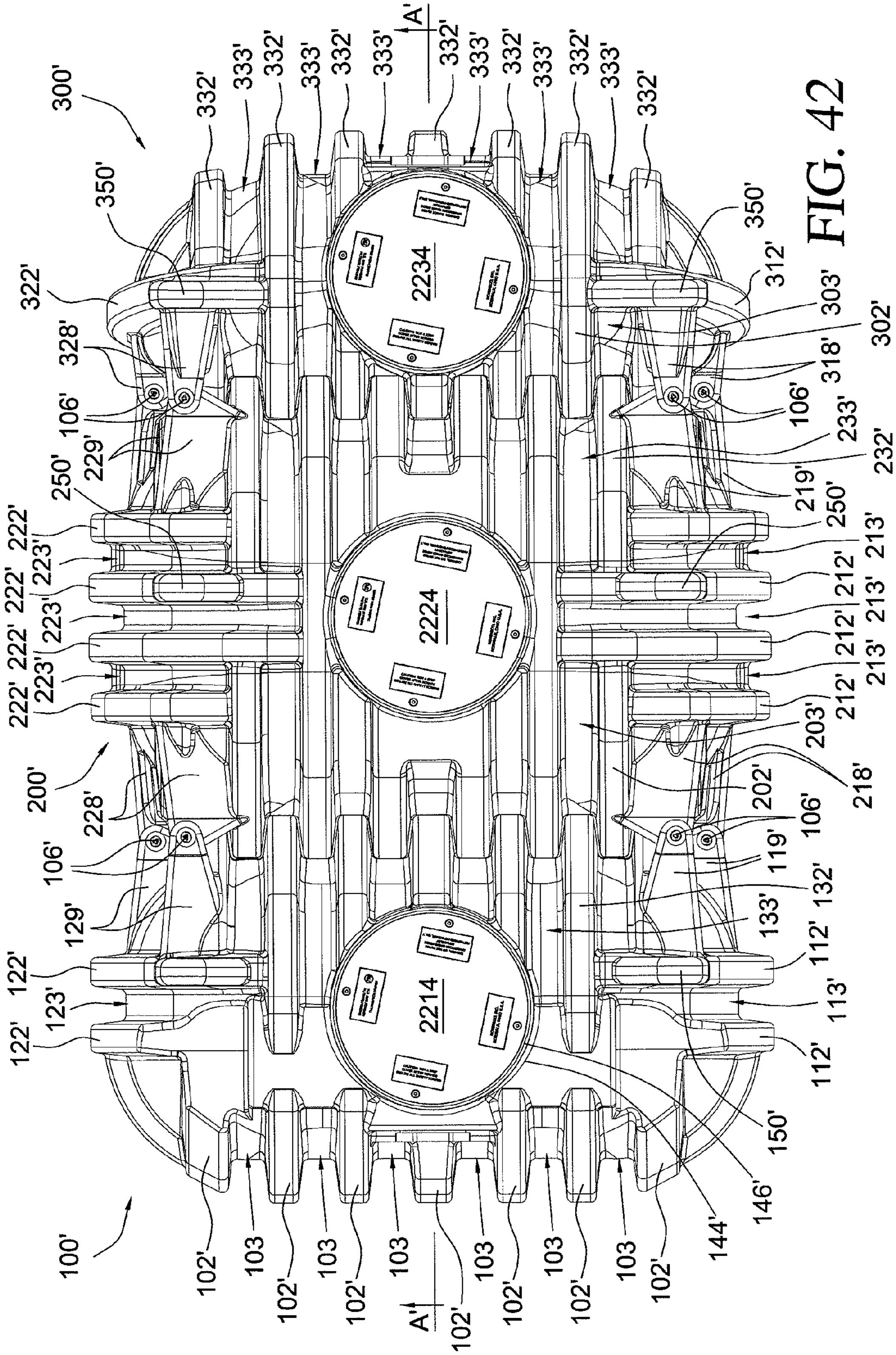
FIG. 42 is a top view of a wastewater treatment system tank with a pretreatment chamber, an aeration chamber, and a clarification chamber, in accordance with one or more other embodiments of the present invention.

FIG. 42 is a top view of the wastewater treatment system tank with pretreatment chamber 100', aeration chamber 200', and clarification chamber 300' of FIG. 39, in accordance with one or more other embodiments of the present invention. In FIG. 42, the top of the discharge tee 270' is covered by substantially circular top 2214, but, as described in relation to FIG. 5 above, the top of the discharge tee 270' in FIG. 42 is located below a portion of pretreatment chamber access opening 145' nearest the pretreatment chamber back wall 131'. Discharge tee 270', which has slightly different design than discharge tee 270 in FIG. 5 is best seen and described below in relation to FIG. 43. As seen in FIG. 42, there are seven pretreatment chamber front wall ribs 102' spaced substantially equidistantly apart from each other by pretreatment chamber front wall grooves 103' and with a middle one of the front wall ribs 102' being centered in the front wall 101' along line A'-A'. The middle pretreatment chamber front wall rib 102' begins below and adjacent to inlet means 104' and extends vertically down pretreatment chamber front wall 101' onto and across bottom wall 151' connects to the opposite back wall rib 132'. The first two pretreatment chamber front wall ribs 102' immediately on either side of the middle pretreatment chamber front wall rib 102' are not as wide as the middle pretreatment chamber front wall rib 102' and begin on pretreatment chamber top wall 141' above inlet means 104' on arched portion 107' and near substantially cylindrical wall 144' and extend substantially vertically down pretreatment chamber front wall 101' and onto and across bottom wall 151' and each connect to their opposite back wall rib 132'. Two substantially vertical pretreatment chamber front wall grooves 103' are defined between the first two pretreatment chamber front wall ribs 102' and the middle pretreatment chamber front wall rib 102'. The next two pretreatment chamber front wall ribs 102' are each spaced apart from one of the first two pretreatment chamber front wall ribs 102' away from the middle pretreatment chamber front wall rib 102' and have the same width as the first two pretreatment chamber front wall ribs 102'. Like the first two pretreatment chamber front wall ribs 102', the next two pretreatment chamber front wall ribs 102' begin on pretreatment chamber top wall 141' above inlet means 104' on arched portion 107' and near substantially cylindrical wall 144' and extend substantially vertically down pretreatment chamber front wall 101' and onto and across bottom wall 151' and each connect to their opposite back wall rib 132'. Two additional substantially vertical pretreatment chamber front wall grooves 103' are defined between the next two pretreatment chamber front wall ribs 102' and the first two pretreatment chamber front wall ribs 102'. The outside two pretreatment chamber front wall ribs 102' are each spaced apart from one of the next two pretreatment chamber front wall ribs 102' away from the middle pretreatment chamber front wall rib 102' and approximately adjacent to an outside side edge of pretreatment chamber front wall 101'. The outside two pretreatment chamber front wall ribs 102' have an asymmetrical shape that is different from and with a greater width than the first two, next and middle pretreatment chamber front wall ribs 102'. In general, the outside two pretreatment chamber front wall ribs 102' are about twice as wide as the first two and next pretreatment chamber front wall ribs 102' and about 1½ times as wide as the middle pretreatment chamber front wall rib 102'. Two final substantially vertical pretreatment chamber front wall grooves 103' are defined between the outside two pretreatment chamber front wall ribs 102' and the next two pretreatment chamber front wall ribs 102'. Unlike the other front wall ribs 102', the outside two pretreatment chamber front wall ribs 102' extend down front wall 101' and onto bottom wall 151', but connect to bottom wall ribs 152', instead of continuing across bottom wall 151' (best seen in FIG. 41).

In FIG. 42, other differences from the embodiment of FIG. 1 are also seen, for example, in FIG. 42, in aeration chamber 200', the hoist points 250' have moved from the left middle top wall rib 141' to the right middle top wall rib 141', which is closer to the clarification chamber 300'. Another difference is that there are additional longitudinal rib sections on aeration chamber 200' that provide additional front to back support for the system 10'. Still another difference is that the clarification chamber hoist points 350' have moved further away from clarification chamber cylindrical wall 344' and down clarification chamber right and left ribs, 312', 322'.

In FIG. 42, clarification chamber 300' is only slightly different than the clarification chamber 300 in FIG. 5. In FIG. 42, the clarification chamber back wall ribs 332' and clarification chamber back wall grooves 333' separating the clarification chamber back wall ribs 332' have essentially the same design and configuration as described above in relation to FIG. 5 for the clarification chamber back wall ribs 332 and clarification chamber back wall grooves 333. However, one difference that is seen in FIG. 42 is that hoist points 350' have been moved outwardly toward the outer left and right side walls of the clarification chamber to be centered approximately over the outermost clarification chamber back wall ribs 332' and further down the clarification chamber right and left wall ribs 312' and 322', respectively.

Figure 43:
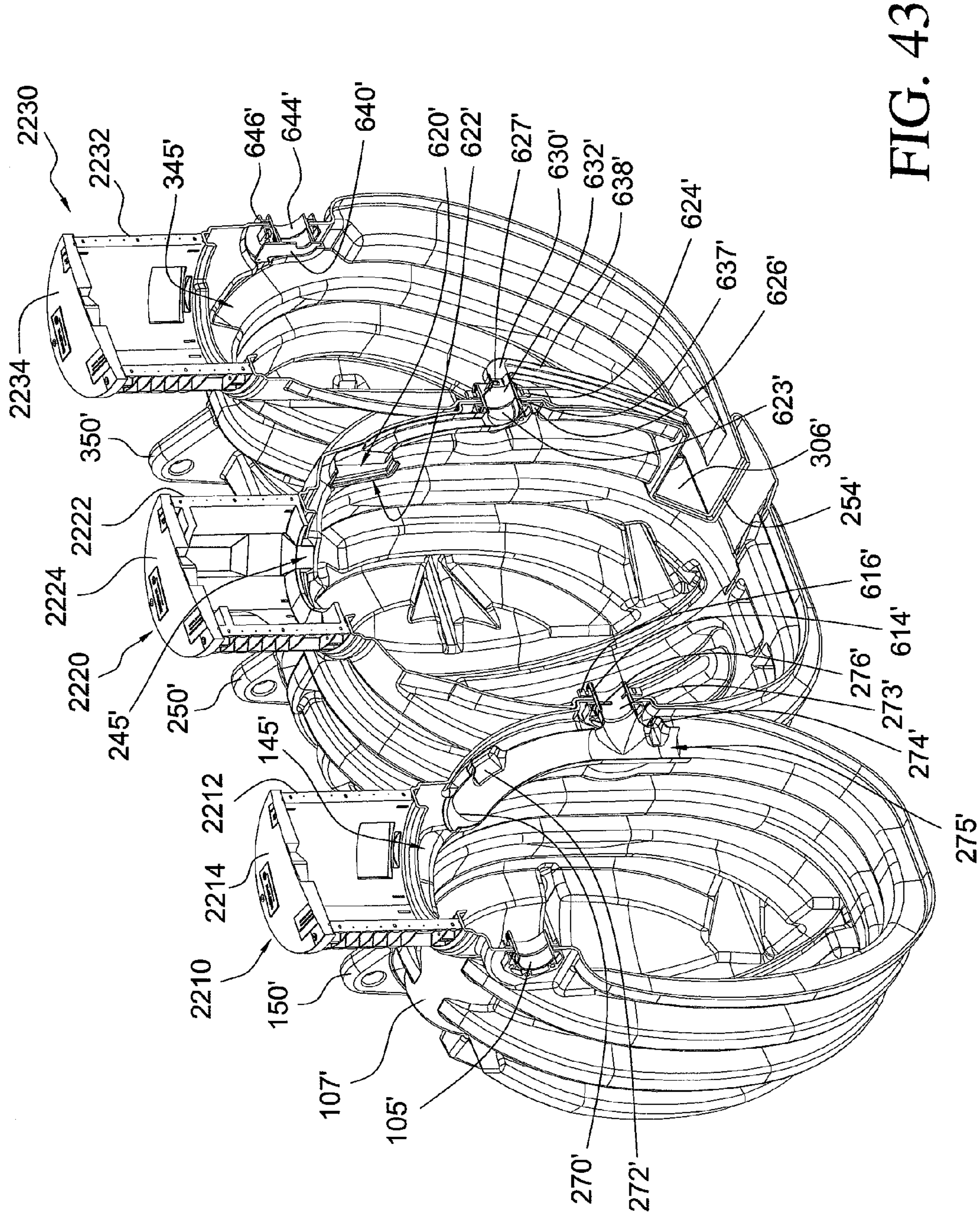
FIG. 43 is a cross-section view of the wastewater treatment system tank of FIG. 42 with a pretreatment chamber, an aeration chamber, and a clarification chamber along line A-A, in accordance with one or more other embodiments of the present invention.

FIG. 43 is a cross-section view of the wastewater treatment system tank of FIG. 42 showing pretreatment chamber 100', aeration chamber 200', and clarification chamber 300' along line A'-A', in accordance with one or more other embodiments of the present invention. Pretreatment tee 270' is shown installed in place with its top near pretreatment chamber access opening 145', a tee portion 273' inserted into and extending through a cylindrical outlet opening 136' in substantially the center of pretreatment chamber back wall 131'. Tee portion 273' is inserted into the inside of a male threaded fitting 614', which in turn is inserted through a rubber gasket on the inside of and then through a pretreatment chamber cylindrical outlet opening 136', then through an aeration chamber front wall inlet recess opening 204', another rubber gasket and finally through a female threaded fitting 616'. Tee portion 273' includes a discontinuous ridge 276' circumferentially around and adjacent a distal end of tee portion 273', which engages a continuous circumferential ridge (not shown) around the inside of male threaded fitting 614'. Male threaded fitting 614' and female threaded fitting 616' threadingly engage each other to hold pretreatment tee 270' in place between pretreatment chamber 100 and aeration chamber 200'. Pretreatment tee 270' also includes two stabilizing supports that fit within the inside of the pretreatment chamber back wall middle rib 132'. A top stabilizing support 272' is near the top of pretreatment tee 270' and fits within a top portion of pretreatment chamber back wall middle rib 132', and a smaller bottom stabilizing support 274' that is located below the tee portion but above a bottom inlet 275' of pretreatment tee 270' and fits within a portion of pretreatment chamber back wall middle rib 132' just below pretreatment chamber cylindrical outlet opening 136'. The lower portion of the top of the tee is shorter than the equivalent structure in FIG. 6 such that the bottom inlet 275' in FIG. 43 is located at a higher level than the bottom inlet 275 of FIG. 6.

In FIG. 43, a sludge return inlet 620' is seen extending from a top inlet opening 622' that is positioned near the top of aeration chamber 200' and curves downwardly in conformance with the inner shape of aeration chamber back wall rib 232' to a substantially perpendicular bottom portion 623' of sludge return inlet 620'. Sludge return inlet perpendicular bottom portion 623' has an increased diameter immediately adjacent to the bottom of sludge return inlet 620' and extending approximately half the length of the substantially perpendicular bottom portion 623' where it begins to taper down to about ½ the diameter at approximately ¾ of the length of the substantially perpendicular bottom portion 623'. The substantially perpendicular bottom portion 623' is inserted through a male threaded fitting 624', a rubber gasket on the inside of and then through an aeration chamber cylindrical recess outlet opening 236', and a clarification chamber front wall inlet connector recess opening 304'. The substantially perpendicular bottom portion 623' and male threaded fitting 624' are inserted through another rubber gasket and then the inside of a threaded end of a female threaded fitting 626' which is screwed on the male threaded fitting 624' until it is tight against the inside of the front wall 301' of the clarification chamber. Both aeration chamber cylindrical recess outlet opening 236' and clarification chamber front wall inlet connector recess opening 304' are located in substantially the middle of either a back wall or a front wall of their respective chambers. The remaining ¼ of the substantially perpendicular bottom portion 623' is inserted into an opening in a flanged end of a perpendicular connector portion 632' of a sludge return 630' in clarification chamber 300' until a substantially semicircular detent 627' engages a substantially circular opening 637' defined in sludge return extension perpendicular connector portion 632'. Male threaded fitting 624' and female threaded fitting 626' threadingly engage each other to hold sludge return inlet 620 and sludge return 630' in place between aeration chamber 200' and clarification chamber 300'. Sludge return 630' includes a downwardly curving depending extension 638' that extends toward and has an open end that permits sludge to flow into sludge return conduit 306' portion of clarification chamber 300'. Approximately ¾ of the way down the downwardly curving depending extension 638' an outwardly extending support extends toward and contacts an inner wall of a clarification chamber front wall rib 302'. Since FIG. 43 is a cross-section of the system 10', it should be understood that mirror image structures of the above described structures exist and are located on the unseen, opposite side of the system 10'. In addition, it should be understood that the design of sludge return 630' shown in FIG. 43 also may be used in place of the sludge return 630 in the embodiment shown in FIGS. 6 and 32 and vice versa.

In FIG. 43, sludge return conduit 306' matingly fits with an aeration chamber transfer port 254' formed in a bottom portion of aeration chamber back wall 231' to form a leak proof seal between sludge return conduit 306' and aeration chamber transfer port 254'. Sludge return 630' may include a Bio-Static® sludge return 630' manufactured by Norweco, Inc. of Norwalk Ohio that is securely installed in the aeration/clarification chamber to provide return of settled solids. Aeration chamber hydraulic currents enter the sludge return 630' and are directed through the device into the clarification chamber. The hydraulic currents containing re-suspended sludge are directed through the sludge return 630' and downwardly depending extension 638' and back to the aeration chamber through sludge return conduit 306' for additional treatment. The Bio-Static® sludge return 630' accomplishes re-suspension and return of settled solids without disturbing the contents of the clarification chamber. It has no moving parts and does not require service.

In FIG. 43, an outlet coupling 640' is inserted though an inside of a female threaded fitting 646, a first rubber gasket (not shown), an outlet discharge opening 336' defined in a top portion of the clarification chamber back wall, a second rubber gasket (not shown), and into the inside of a male threaded fitting 644'. Male threaded fitting 644' and female threaded fitting 646' threadingly engage each other to hold outlet coupling 640' in place against clarification chamber 300'.

Figure 44:
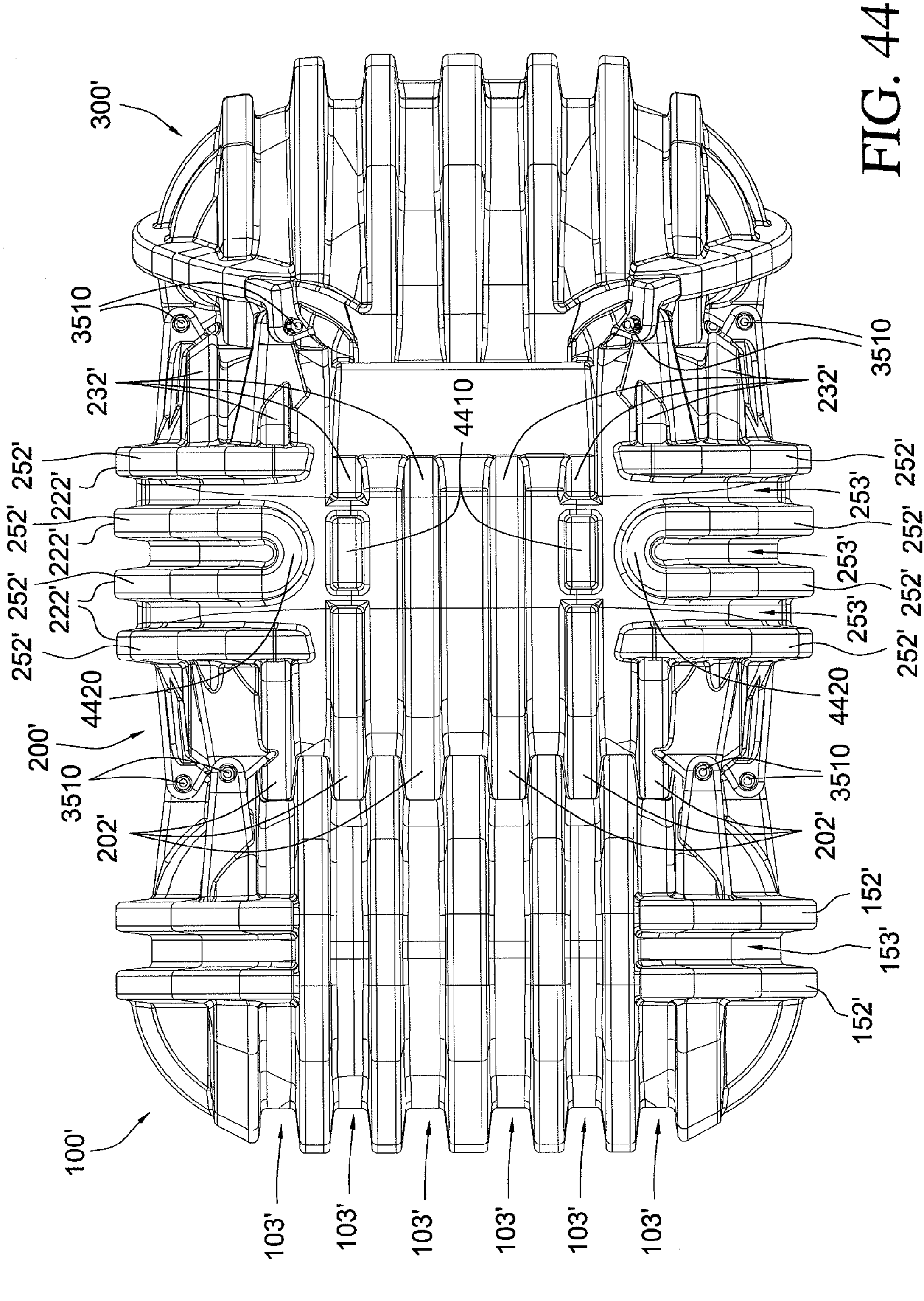
FIG. 44 is a bottom view of a wastewater treatment system tank with a pretreatment chamber, an aeration chamber, and a clarification chamber, in accordance with one or more other embodiments of the present invention.

FIG. 44 is a bottom view of a wastewater treatment system tank with pretreatment chamber 100', aeration chamber 200', and clarification chamber 300', in accordance with one or more other embodiments of the present invention. Unlike in FIG. 7, in FIG. 44, there are no small gussets formed across pretreatment chamber bottom wall groove 153' and between pretreatment chamber bottom wall ribs 152'. Instead, as described above, bottom wall ribs 152' do not extend across the length of bottom wall 151' and the front wall ribs 102' and the back wall ribs 132' extend across the width of the bottom wall 151' and connect to each other to form a continuous rib.

Similarly, in FIG. 44, the sixteen small gussets in FIG. 7 formed across aeration chamber bottom wall grooves 253' and between aeration chamber bottom wall ribs 252', are not present in FIG. 44. Also, unlike in FIG. 7, in FIG. 44, aeration chamber bottom wall ribs 252' do not extend across the length of bottom wall 251' and the front wall ribs 202' and the back wall ribs 232' extend across the width of the bottom wall 251'. The center two front wall ribs 202' and the center two back wall ribs 232' connect to each other to form continuous ribs across the width of the bottom wall 251'. The next two outer pairs of front wall ribs 202' and back wall ribs 232' only extend partially across the length of bottom wall 251' and do not connect with each other. Instead, a small rib portion 4410 is located between the ends of each of the next two outer pairs of front wall ribs 202' and back wall ribs 232'. The outer-most opposing pair of front wall ribs 202' and the next outer-most back wall ribs 232' extend to and connect with the outer-most bottom wall ribs 252'. The two inner bottom wall ribs 252' on each side are connected by a semi-circular rib portion 4420 to form a continuous inner rib. Finally, the outer-most pair of back wall ribs 232' do not have an opposite pair of front wall ribs, but the outer-most pair of back wall ribs 232' extend to and connect with the outer-most bottom wall ribs 252'.

Figure 45:
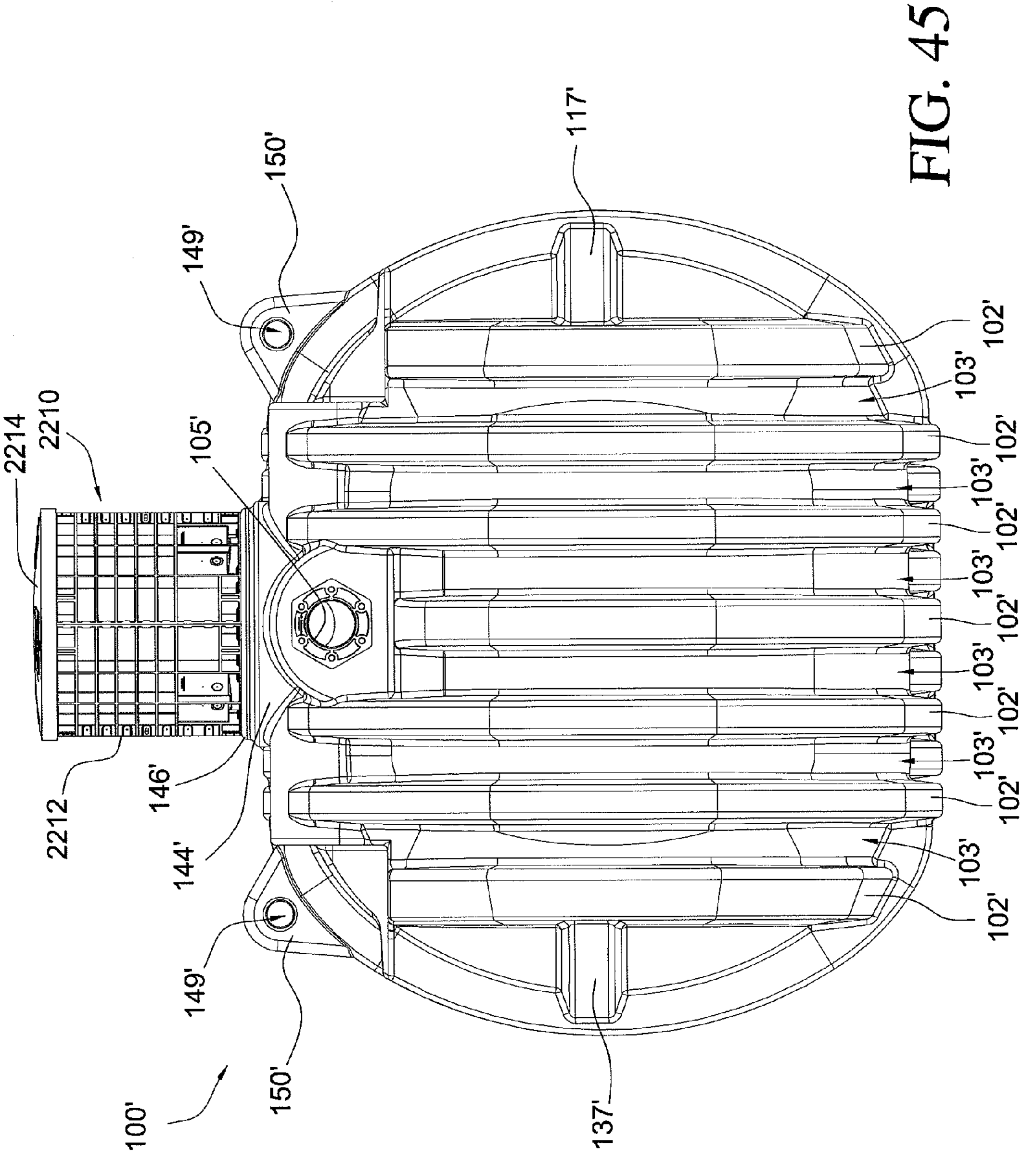
FIG. 45 is an end view of a pretreatment chamber end of a wastewater treatment system tank, in accordance with one or more other embodiments of the present invention.

FIG. 45 is an end view of a pretreatment chamber end of a wastewater treatment system tank, in accordance with one or more other embodiments of the present invention. In FIG. 45, an enlarged, close up view of the pretreatment chamber front wall 101' is provided to better illustrate the construction of this embodiment with the pretreatment chamber cylindrical riser 2210 connected to the pretreatment chamber 100'.

Figure 46:
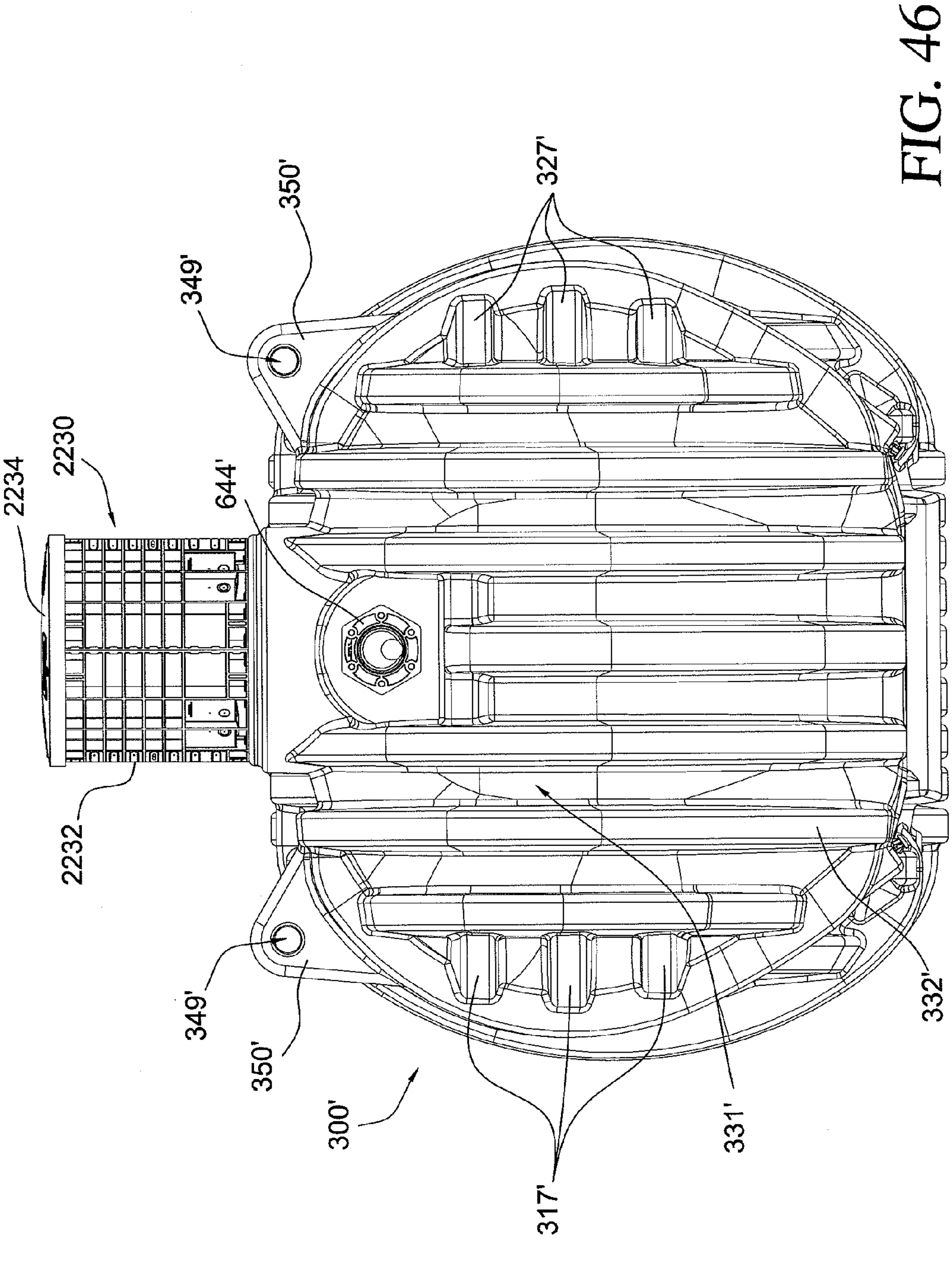
FIG. 46 is an end view of a clarification chamber end of a wastewater treatment system tank, in accordance with one or more other embodiments of the present invention.

FIG. 46 is an end view of a clarification chamber end of a wastewater treatment system tank, in accordance with one or more other embodiments of the present invention. In FIG. 46, an enlarged, close up view of the clarification chamber back wall 331' is provided to better illustrate the construction of this embodiment with the clarification chamber cylindrical riser 2230 connected the clarification chamber.

Figure 47:
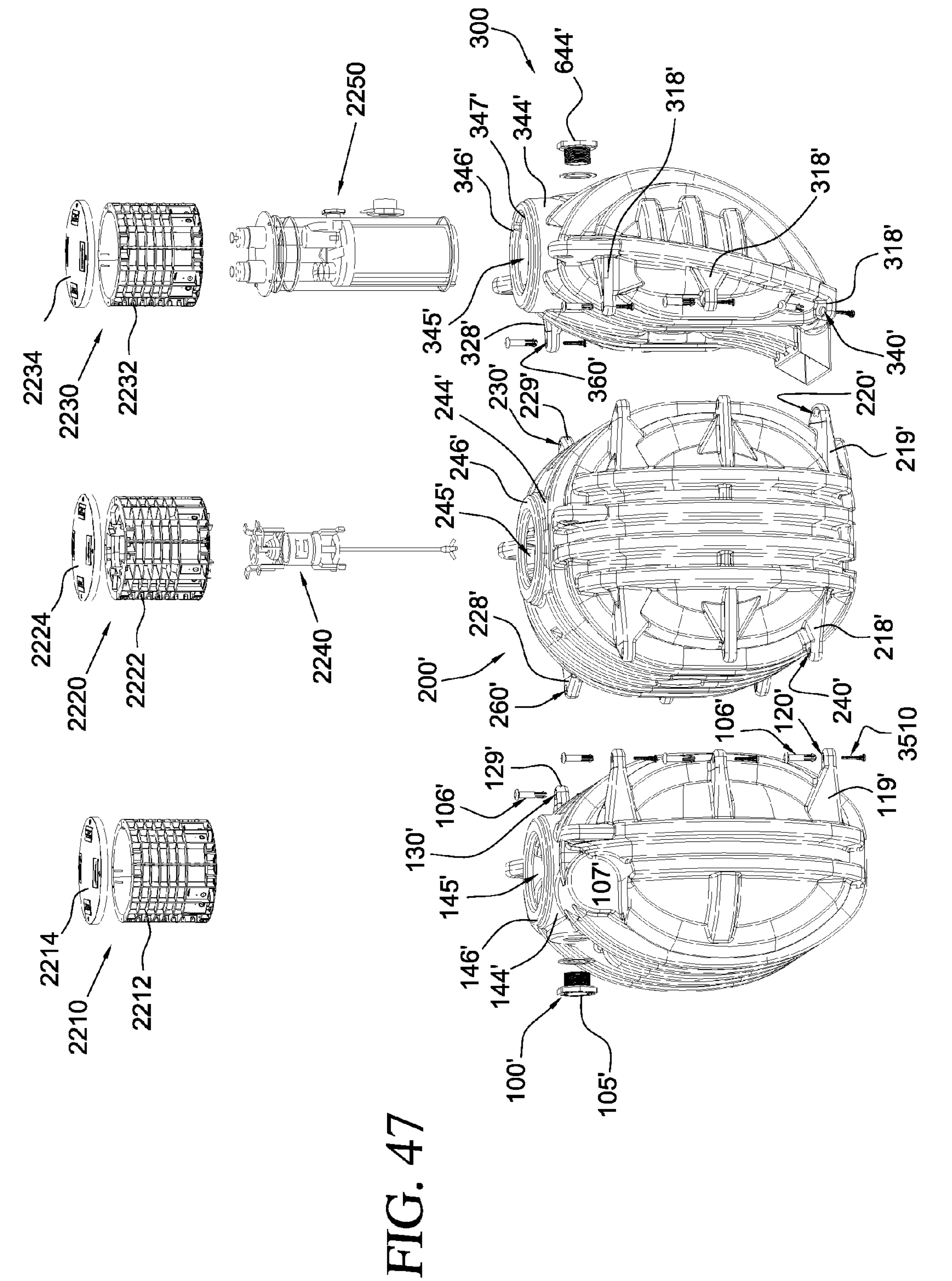
FIG. 47 is a right side, perspective, exploded view of a wastewater treatment system tank showing a pretreatment chamber on the left, an aeration chamber in the middle, and a clarification chamber on the right, in accordance with one or more other embodiments of the present invention.

FIG. 47 is a top-perspective, exploded view of the wastewater treatment system tank 10' showing pretreatment chamber 100' on the left, aeration chamber 200' in the middle, and clarification chamber 300' on the right, in accordance with one or more other embodiments of the present invention. In FIG. 47, each of the pretreatment chamber back wall right connector flanges 119' has formed in it a pretreatment chamber back wall right connector flange opening 120', and each of the pretreatment chamber back wall left connector flanges 129' has formed in it a pretreatment chamber back wall left connector flange opening 130'. Each of the aeration chamber front wall right connector flange 218' has formed in it an aeration chamber front wall right connector flange opening 240', and each of the aeration chamber front wall left connector flange 228' has formed in it an aeration chamber front wall left connector flange opening 260'. Each of the aeration chamber back wall right connector flange 219' has formed in it an aeration chamber back wall right connector flange opening 220', and each of the aeration chamber back wall left connector flange 229' has formed in it an aeration chamber back wall right connector flange opening 230' (also shown as 230 in FIG. 12). Each of the clarification chamber front wall right connector flange 318' has formed in it a clarification chamber front wall right connector flange opening 340', and each of the clarification chamber front wall left connector flange 328' has formed in it an aeration chamber front wall left connector flange opening 360'. As described elsewhere herein, when the pretreatment chamber 100' is connected to the aeration chamber 200', the aeration chamber 200' is connected to the clarification chamber 300', and the connector flanges align so that their respective flange openings are coaxially aligned, then rivets 106' may be inserted through the flange openings in both connector flanges to help secure the chambers together.

In FIG. 47, cylindrical risers 2210, 2220, 2230 are shown above their respective pretreatment chamber 100', aeration chamber 200', and clarification chamber 300'. Similarly, the aerator 2240 is shown between cylindrical riser 2220 and aeration chamber 200', and the Bio-Kinetic® filtration system 2250 is shown between cylindrical riser 2230 and clarification chamber 300'. A short recessed groove 347' is formed along an inner edge of the raised annular lip 346' on the back wall-side of clarification chamber 300'. Raised annular lip 346', short recessed groove 347' and the top of substantially cylindrical wall 344' may mate with and be removably sealed to riser column 2230 to permit access to the chamber for maintenance and repairs and to install the Bio-Kinetic® filtration system. Short recessed groove 347' provides additional clearance in access opening 345' that is needed for the installation of the Bio-Kinetic® filtration system 2250.

In one embodiment, a modular wastewater treatment plant includes a pretreatment chamber having a first generally oblate spheroid shape with a first plurality of vertical ribs on a front wall of the pretreatment chamber, a second plurality of vertical ribs on a back wall of the pretreatment chamber opposite the front wall of the pretreatment chamber, a pretreatment chamber inlet formed in the front wall of the pretreatment chamber, a pretreatment chamber access opening formed in a top wall of the pretreatment chamber, a pretreatment chamber outlet formed in the back wall of the pretreatment chamber, and a bottom wall of the pretreatment chamber. The modular wastewater treatment plant also including an aeration chamber having a second generally oblate spheroid shape and a third plurality of vertical ribs on a front wall of the aeration chamber and positioned to nest with the second plurality of vertical ribs on the back wall of the pretreatment chamber, and a fourth plurality of vertical ribs on a back wall of the aeration chamber opposite of the first side wall of the aeration chamber, an aeration chamber inlet formed in the front wall of the aeration chamber and connected to the pretreatment chamber outlet for fluid communication there through and the second plurality of vertical ribs nested with the third plurality of vertical ribs, an aeration chamber access opening formed in a top wall of the aeration chamber, an aeration chamber outlet formed in the back wall of the aeration chamber, a return receiving opening formed in the back wall below the aeration chamber outlet, and a bottom wall of the aeration chamber. The modular wastewater treatment plant further including a clarification chamber having a third generally oblate spheroid shape and a fifth plurality of vertical ribs on a front wall of the clarification chamber nested with the fourth plurality of vertical ribs on a back wall of the aeration chamber, a sixth plurality of vertical ribs on a back wall of the clarification chamber, a clarification chamber inlet formed in the front wall of the clarification chamber and connected to the aeration chamber outlet, a clarification chamber access opening formed in a top wall of the clarification chamber, a clarification chamber outlet formed in the back wall of the clarification chamber, a return connected to the return receiving opening to provide an open channel for fluid communication between the aeration chamber and the clarification chamber, and a bottom wall of the clarification chamber.

In another embodiment, a modular wastewater treatment plant includes a pretreatment chamber having a first generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a first plurality of vertical ribs on the front wall of the pretreatment chamber and a second plurality of vertical ribs on the back wall of the pretreatment chamber, the first plurality of vertical ribs extending down the front wall of the pretreatment chamber onto and across the bottom wall and the second plurality of vertical ribs extending down the back wall of the pretreatment chamber onto and across the bottom wall to connect to the first plurality of vertical ribs; a pretreatment chamber inlet formed in the front wall of the pretreatment chamber; a pretreatment chamber access opening formed in the top wall of the pretreatment chamber; a pretreatment chamber outlet formed in the back wall of the pretreatment chamber; a first and a second plurality of side wall vertical ribs extending from opposite sides of the top wall of and vertically down the left and right side walls of the pretreatment chamber, respectively, and around and onto the bottom wall of the pretreatment chamber to connect to a side of one of the first plurality of vertical ribs or one of the second plurality of vertical ribs. The modular wastewater treatment plant also including an aeration chamber having a second generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a third plurality of ribs on the front wall of the aeration chamber and nested with the second plurality of ribs on the back wall of the pretreatment chamber; a fourth plurality of ribs on the back wall of the aeration chamber; an aeration chamber inlet formed in the front wall of the aeration chamber and connected to the pretreatment chamber outlet; an aeration chamber access opening formed in a top wall of the aeration chamber; an aeration chamber outlet formed in the back wall of the aeration chamber; a return receiving opening formed in the back wall of the aeration chamber; and a third and a fourth plurality of side wall vertical ribs extending from opposite sides of the top wall of the aeration chamber vertically down the left and right side walls, respectively, around and onto the bottom wall of the aeration chamber with the outer pair of the third and fourth plurality of side wall vertical ribs connecting to a side of one of the third plurality of vertical ribs or one of the fourth plurality of vertical ribs, and adjacent ends of the inner pair of the third and fourth plurality of side wall vertical ribs being connected by a curved rib section. The modular wastewater treatment plant further including a clarification chamber having a third generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a fifth plurality of ribs on a front wall of the clarification chamber and nested with the fourth plurality of ribs on a back wall of the aeration chamber; a sixth plurality of ribs extending from the top wall and down the back wall of the clarification chamber and around, onto and across the bottom wall of the clarification chamber; a clarification chamber inlet formed in the front wall of the clarification chamber and connected to the aeration chamber outlet; a clarification chamber access opening formed in the top wall of the clarification chamber; a clarification chamber outlet formed in the back wall of the clarification chamber; a return opening formed in the front wall of the clarification chamber and positioned to connect to the return receiving opening upon the nesting of the fourth plurality of ribs with the fifth plurality of ribs to provide an open channel for fluid communication between the aeration chamber and the clarification chamber; and a first, single vertical rib extending from near a top end of and vertically down the left side wall and a second, single vertical rib extending from near a top end of and vertically down the right side wall, and a bottom wall of the clarification chamber.

In yet another embodiment, a modular wastewater treatment plant includes a pretreatment chamber means having a first generally oblate spheroid shape and a first plurality of ribs on a first side wall of the pretreatment chamber means and a second plurality of ribs on a second and opposite side wall of the pretreatment chamber means, a pretreatment chamber inlet means formed in the first side wall of the pretreatment chamber means, a pretreatment chamber access means formed in a top wall of the pretreatment chamber means, a pretreatment chamber outlet means formed in the second side wall of the pretreatment chamber means, a first plurality of horizontal flange pairs spaced vertically apart from each other and extending from the second side wall of the pretreatment chamber and each flange defining a first fastener opening, and a bottom wall of the pretreatment chamber means. The modular wastewater treatment plant also including an aeration chamber means having a second generally oblate spheroid shape and a third plurality of ribs on a first side wall of the aeration chamber means and positioned to nest with the second plurality of ribs on the second side wall of the pretreatment chamber means, and a fourth plurality of ribs on a second and opposite side wall of the aeration chamber means opposite of the first side wall of the aeration chamber means, an aeration chamber inlet means formed in the first side wall of the aeration chamber means and positioned to connect to the pretreatment chamber outlet means upon the nesting of the second plurality of ribs with the third plurality of ribs, an aeration chamber access means formed in a top wall of the aeration chamber means, an aeration chamber outlet means formed in the second side wall of the aeration chamber means, a return receiving means, a second plurality of horizontal flange pairs spaced vertically apart from each other and extending from the first side wall of the aeration chamber and each flange defining a second fastener opening and the second plurality of flange pairs arranged to cooperate with the first plurality of horizontal flange pairs so that a first plurality of fastening means can be secured through the first fastener openings and the second fastener openings to connect the first plurality of horizontal flange pairs to the second plurality of horizontal flange pairs, a third plurality of horizontal flange pairs spaced vertically apart from each other and extending from the second side wall of the aeration chamber and each flange defining a third fastener opening, and a bottom wall of the aeration chamber means. The modular wastewater treatment plant further including a clarification chamber means having a third generally oblate spheroid shape and a fifth plurality of ribs on a first side wall of the clarification chamber means and positioned to nest with the fourth plurality of ribs on the second side wall of the aeration chamber means, a clarification chamber inlet means formed in the first side wall of the clarification chamber means and positioned to connect to the aeration chamber outlet means upon the nesting of the fourth plurality of ribs with the fifth plurality of ribs, a clarification chamber access means formed in a top wall of the clarification chamber means, a clarification chamber outlet means formed in a back wall of the clarification chamber means, a return means positioned to connect to the return receiving means upon the nesting of the fourth plurality of ribs with the fifth plurality of ribs to provide an open channel for fluid communication between the aeration chamber means and the clarification chamber means, a fourth plurality of horizontal flange pairs spaced vertically apart from each other and extending from the first side wall of the clarification chamber and each flange defining a fourth fastener opening and the fourth plurality of flange pairs arranged to cooperate with the third plurality of horizontal flange pairs so that a second plurality of fastening means can be secured through the third fastener openings and the fourth fastener openings to connect the third plurality of horizontal flange pairs to the fourth plurality of horizontal flange pairs, and a bottom wall of the clarification chamber means.

In yet another embodiment, a modular wastewater treatment plant includes a pretreatment chamber having a first generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a first plurality of vertical ribs on the front wall of the pretreatment chamber and a second plurality of vertical ribs on the back wall of the pretreatment chamber; a pretreatment chamber inlet formed in the front wall of the pretreatment chamber; a pretreatment chamber access opening formed in the top wall of the pretreatment chamber; a pretreatment chamber outlet formed in the back wall of the pretreatment chamber; a first plurality of substantially circumferential ribs extending from opposite sides of the top wall vertically down the left and right side walls, respectively, and around, onto and across the bottom wall of the pretreatment chamber; and a plurality of pretreatment gussets connected between an adjacent pair of the first plurality of substantially circumferential ribs, where one of the plurality of pretreatment gussets is connected between the adjacent pair of the first plurality of substantially circumferential ribs on the right side wall, another of the plurality of pretreatment gussets is connected between the adjacent pair of the first plurality of substantially circumferential ribs on the left side wall, and the remainder of the plurality of pretreatment gussets is connected between the adjacent pair of the first plurality of substantially circumferential ribs on the bottom wall. The modular wastewater treatment plant also including an aeration chamber having a second generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a third plurality of ribs on the front wall of the aeration chamber and nested with the second plurality of ribs on the back wall of the pretreatment chamber; a fourth plurality of ribs on the back wall of the aeration chamber; an aeration chamber inlet formed in the front wall of the aeration chamber and connected to the pretreatment chamber outlet; an aeration chamber access opening formed in a top wall of the aeration chamber; an aeration chamber outlet formed in the back wall of the aeration chamber; a return receiving opening formed in the back wall of the aeration chamber; and a second plurality of substantially circumferential ribs extending from opposite sides of the aeration chamber access opening across the opposite sides of the top wall around, onto and vertically down the left and right side walls, respectively, and around, onto and across the bottom wall of the aeration chamber; and a plurality of aeration gussets connected between adjacent pairs of the second plurality of substantially circumferential ribs, where three of the plurality of aeration gussets are connected between adjacent pairs of the second plurality of substantially circumferential ribs on the top wall, where two of the plurality of aeration gussets are connected between adjacent pairs of the first plurality of substantially circumferential ribs on the right side wall, another two of the plurality of aeration gussets is connected between the adjacent pairs of the second plurality of substantially circumferential ribs on the left side wall, and the remainder of the plurality of aeration gussets is connected between the adjacent pairs of the second plurality of substantially circumferential ribs in a spaced apart relationship on the bottom wall. The modular wastewater treatment plant further including a clarification chamber having a third generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a fifth plurality of ribs on a front wall of the clarification chamber and nested with the fourth plurality of ribs on a back wall of the aeration chamber; a sixth plurality of ribs extending from the top wall and down the back wall of the clarification chamber and around, onto and across the bottom wall of the clarification chamber; a clarification chamber inlet formed in the front wall of the clarification chamber and connected to the aeration chamber outlet; a clarification chamber access opening formed in the top wall of the clarification chamber; a clarification chamber outlet formed in the back wall of the clarification chamber; a return opening formed in the front wall of the clarification chamber and positioned to connect to the return receiving opening upon the nesting of the fourth plurality of ribs with the fifth plurality of ribs to provide an open channel for fluid communication between the aeration chamber and the clarification chamber; and a first, single vertical rib extending from near a top end of and vertically down the left side wall and a second, single vertical rib extending from near a top end of and vertically down the right side wall, and a bottom wall of the clarification chamber.

In a further embodiment, a wastewater treatment system as herein illustrated and described.

In a still further embodiment, a wastewater treatment means as herein illustrated and described.

While the invention(s) has/have been described in conjunction with a number of embodiments, it is evident that many alternatives, modifications and variations would be or are apparent to those of ordinary skill in the applicable arts. For example, different component designs and/or elements only shown in association with a particular embodiment also may be used with the other embodiments. Accordingly, Applicants intend to embrace all such alternatives, modifications, equivalents, and variations that are within the spirit and scope of the invention(s) described herein.

What is claimed is:

1. A modular wastewater treatment plant comprising:

a pretreatment chamber having a first generally oblate spheroid shape with a first plurality of vertical ribs on a front wall of the pretreatment chamber, a second plurality of vertical ribs on a back wall of the pretreatment chamber opposite the front wall of the pretreatment chamber, a pretreatment chamber inlet formed in the front wall of the pretreatment chamber, a pretreatment chamber access opening formed in a top wall of the pretreatment chamber, a pretreatment chamber outlet formed in the back wall of the pretreatment chamber, and a bottom wall of the pretreatment chamber;

an aeration chamber having a second generally oblate spheroid shape and a third plurality of vertical ribs on a front wall of the aeration chamber and positioned to nest with the second plurality of vertical ribs on the back wall of the pretreatment chamber, and a fourth plurality of vertical ribs on a back wall of the aeration chamber opposite of the first side wall of the aeration chamber, an aeration chamber inlet formed in the front wall of the aeration chamber and connected to the pretreatment chamber outlet for fluid communication there through and the second plurality of vertical ribs nested with the third plurality of vertical ribs, an aeration chamber access opening formed in a top wall of the aeration chamber, an aeration chamber outlet formed in the back wall of the aeration chamber, a return receiving opening formed in the back wall below the aeration chamber outlet, and a bottom wall of the aeration chamber; and a clarification chamber having a third generally oblate spheroid shape and a fifth plurality of vertical ribs on a front wall of the clarification chamber nested with the fourth plurality of vertical ribs on a back wall of the aeration chamber, a sixth plurality of vertical ribs on a back wall of the clarification chamber, a clarification chamber inlet formed in the front wall of the clarification chamber and connected to the aeration chamber outlet, a clarification chamber access opening formed in a top wall of the clarification chamber, a clarification chamber outlet formed in the back wall of the clarification chamber, a return connected to the return receiving opening to provide an open channel for fluid communication between the aeration chamber and the clarification chamber, and a bottom wall of the clarification chamber.

2. The modular wastewater treatment plant of claim 1 further comprising:

a first plurality of substantially continuous, circumferential ribs extending from a front side of the top wall vertically down a front wall and around onto and across the bottom wall and around onto and up a back wall to a back side of the top wall of the pretreatment chamber.

3. The modular wastewater treatment plant of claim 2 further comprising:

a first plurality of right side wall ribs extending from the top wall vertically down the right side wall of the pretreatment chamber and connecting to an outside one of the first plurality of substantially continuous, circumferential ribs; and a first plurality of left side wall ribs extending from the top wall vertically down the left side wall of the pretreatment chamber and connecting to an opposite outside one of the first plurality of substantially continuous, circumferential ribs.

4. The modular wastewater treatment plant of claim 3 further comprising:

a plurality of pretreatment gussets, a first of the plurality of pretreatment gussets connected perpendicularly between a right-side one of the first plurality of substantially continuous, circumferential ribs on the front wall and a front-side one of the first plurality of right side wall ribs of the first plurality of substantially circumferential ribs of the pretreatment chamber, and a second of the plurality of pretreatment gussets connected perpendicularly between a left-side one of the first plurality of substantially continuous, circumferential ribs on the front wall and a front-side one of the first plurality of left side wall ribs of the first plurality of substantially circumferential ribs of the pretreatment chamber.

5. The modular wastewater treatment plant of claim 4 further comprising:

a second plurality of substantially continuous, circumferential ribs extending from a front side of the top wall vertically down a front wall and around onto and across the bottom wall and around onto and up a back wall to a back side of the top wall of the aeration chamber.

6. The modular wastewater treatment plant of claim 5 further comprising:

a second plurality of right side wall ribs extending from the top wall vertically down the right side wall of the aeration chamber with an outside pair of the second plurality of right side wall ribs connecting to an outside one of the second plurality of substantially continuous, circumferential ribs; and a second plurality of left side wall ribs extending from the top wall vertically down the left side wall of the aeration chamber with an outside pair of the second plurality of left side wall ribs connecting to an outside one of the second plurality of substantially continuous, circumferential ribs.

7. The modular wastewater treatment plant of claim 6 further comprising:

a first pair of aeration gussets, each gusset connected to the pair of side-by-side ribs of the second plurality of substantially circumferential ribs in substantially a middle of the right side wall of the aeration chamber; and a second pair of aeration gussets, each gusset connected to the pair of side-by-side ribs of the second plurality of substantially circumferential ribs in substantially a middle of the left side wall of the aeration chamber.

8. The modular wastewater treatment plant of claim 7 further comprising:

an inside pair of the second plurality of right side wall ribs connecting to each other on the bottom wall of the aeration chamber; and an inside pair of the second plurality of left side wall ribs connecting to each other on the bottom wall of the aeration chamber.

9. The modular wastewater treatment plant of claim 8 further comprising:

a male threaded fitting having a collar at a proximal end and a threaded section at a distal end, with the distal end of the male threaded fitting being inserted through a first rubber gasket and from the outside of and through the pretreatment chamber inlet, the male threaded fitting then being inserted through a second rubber gasket, and a female threaded fitting being screwed onto the male threaded fitting to sealingly connect the male threaded fitting and the female threaded fitting to the pretreatment chamber inlet.

10. The modular wastewater treatment plant of claim 9 further comprising:

a pretreatment tee having a top end located inside the pretreatment chamber and just below the pretreatment chamber access opening in the top wall and a body of the pretreatment tee curving downwardly along an interior of the back wall to a bottom end located below the pretreatment chamber outlet in the back wall, the body of the pretreatment tee including a tee section having a top portion forming a part of the body of the pretreatment tee and a leg portion extending substantially perpendicularly away from the tee section and coaxially aligned with the pretreatment chamber outlet.

11. The modular wastewater treatment plant of claim 10 further comprising:

an end of the pretreatment tee leg portion inserted into a collar at a proximal end of and connected to a second male threaded fitting, the second male threaded fitting having a threaded section at a distal end, with the distal end of the second male threaded fitting being inserted through a third rubber gasket and from the inside of and out through the pretreatment chamber outlet and in through the aeration chamber inlet, the second male threaded fitting then being inserted through a fourth rubber gasket, and a second female threaded fitting is screwed onto the second male threaded fitting to sealingly connect the second male threaded fitting and the second female threaded fitting to the pretreatment chamber inlet and the aeration chamber outlet;

three pairs of pretreatment chamber back wall flanges, one flange of each of the three pairs being on a right side of the back wall and the other flange of each of the three pairs being on a left side of the back wall, each flange having a flange opening formed therein and extending substantially perpendicularly away from the pretreatment chamber back wall toward the aeration chamber front wall;

three pairs of aeration chamber front wall flanges, one flange of each of the three pairs of aeration chamber front wall flanges being on a right side of the front wall and the other flange of each of the three pairs being on a left side of the front wall, each flange having a flange opening formed therein and extending substantially perpendicularly away from the aeration chamber front wall toward and the pretreatment chamber back wall and cooperatively aligning with the three pairs of pretreatment chamber back wall flanges so the respective, cooperating flange openings are coaxially aligned; and a first plurality of rivets, where one each of the first plurality of rivets is removably inserted through one of the coaxially aligned cooperating pretreatment and aeration flange openings to rigidly fasten each of the cooperating pretreatment and aeration flanges together.

12. The modular wastewater treatment plant of claim 11 further comprising:

a sludge return inlet having an inlet at a top end located inside the aeration chamber and just below the aeration chamber access opening in the top wall and a body of the sludge return inlet extending downwardly to a curved bottom end with an end portion having an annular ridge around an exterior proximal end and the end portion extending substantially perpendicularly away from the sludge return inlet and terminating in an open circular distal end, the end portion is coaxially aligned with the aeration chamber outlet, the sludge return end portion having a pair of opposite detents.

13. The modular wastewater treatment plant of claim 12 further comprising:

a top portion of a sludge return extension is inserted through a third male threaded fitting, a fifth rubber gasket and the aeration chamber outlet, the clarification chamber inlet, a sixth rubber gasket, a third female threaded fitting and around the end portion of the sludge return inlet until contacting the annular ridge around the exterior proximal end of the end portion of the sludge return inlet, the top portion of a sludge return extension having a plurality of raised members forming a broken annular ridge near a proximal end of the top portion of a sludge return extension, the sludge return inlet end portion sliding inside of and fastening to the top portion of the sludge return extension, the top portion of the sludge return extension having a pair of opposite openings that receive the sludge return end portion opposite detents, and the third female threaded fitting being screwed onto the third male threaded fitting to sealingly connect the third male threaded fitting and the third female threaded fitting to the aeration chamber outlet and the clarification chamber inlet;

three pairs of aeration chamber back wall flanges, one flange of each of the three pairs being on a right side of the back wall and the other flange of each of the three pairs being on a left side of the back wall, each flange having a flange opening formed therein and extending substantially perpendicularly away from the aeration chamber back wall toward the clarification chamber front wall;

three pairs of clarification chamber front wall flanges, one flange of each of the three pairs of clarification chamber front wall flanges being on a right side of the front wall and the other flange of each of the three pairs being on a left side of the front wall, each flange having a flange opening formed therein and extending substantially perpendicularly away from the clarification chamber front wall toward and the aeration chamber back wall and cooperatively aligning with the three pairs of aeration chamber back wall flanges so the respective, cooperating flange openings are coaxially aligned; and a second plurality of rivets, where one each of the second plurality of rivets is removably inserted through one of the coaxially aligned cooperating aeration and clarification flange openings to rigidly fasten each of the cooperating aeration and clarification flanges together.

14. The modular wastewater treatment plant of claim 13 further comprising:

an outlet coupling having a spillover inlet portion connected to a back side of a substantially circular body portion in which is defined an inlet opening that is in fluid communication with the spillover inlet portion and a substantially cylindrical wall portion extending substantially perpendicularly away from a right side of the substantially circular body portion, the substantially cylindrical wall portion inserted through a fourth female threaded fitting, seventh rubber gasket, the clarification chamber outlet, an eighth rubber gasket and inside of and solvent welded to a threaded end of a fourth male threaded fitting, the fourth female threaded fitting being screwed onto the fourth male threaded fitting to sealingly connect the outlet coupling, the fourth male threaded fitting and the fourth female threaded fitting to the clarification chamber outlet.

15. The modular wastewater treatment plant of claim 14 further comprising:

a substantially cylindrical pretreatment riser having a base portion connected to and forming a water tight seal around the pretreatment chamber access opening, and a substantially circular pretreatment riser lid connected to and forming a water tight seal around a top end of the substantially cylindrical pretreatment riser;

a substantially cylindrical aeration riser having a base portion connected to and forming a water tight seal around the aeration chamber access opening, and a substantially circular aeration riser lid connected to and forming a water tight seal around a top end of the substantially cylindrical aeration riser; and a substantially cylindrical clarification riser having a base portion connected to and forming a water tight seal around the clarification chamber access opening, and a substantially circular clarification riser lid connected to and forming a water tight seal around a top end of the substantially cylindrical clarification riser.

16. The modular wastewater treatment plant of claim 15 wherein said substantially circular aeration riser lid includes a plurality of air vents.

17. The modular wastewater treatment plant of claim 16 further comprising an aeration system installed in the substantially cylindrical aeration riser and the aeration chamber.

18. The modular wastewater treatment plant of claim 17 further comprising a Bio-Kinetic® system installed in the clarification chamber.

19. The modular wastewater treatment plant of claim 18 further comprising a chlorination system and a dechlorination system, both installed on the top of and in fluid communication with the Bio-Kinetic® system.

20. The modular wastewater treatment plant of claim 19 further comprising a downwardly extending portion of the sludge return extension including a terminal end having a terminal end opening located at a top of the clarification chamber return and in fluid communication with the clarification chamber return and the aeration chamber return receiving opening.

21. A modular wastewater treatment plant comprising:

a pretreatment chamber having a first generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a first plurality of vertical ribs on the front wall of the pretreatment chamber and a second plurality of vertical ribs on the back wall of the pretreatment chamber, the first plurality of vertical ribs extending down the front wall of the pretreatment chamber onto and across the bottom wall and the second plurality of vertical ribs extending down the back wall of the pretreatment chamber onto and across the bottom wall to connect to the first plurality of vertical ribs; a pretreatment chamber inlet formed in the front wall of the pretreatment chamber; a pretreatment chamber access opening formed in the top wall of the pretreatment chamber; a pretreatment chamber outlet formed in the back wall of the pretreatment chamber; a first and a second plurality of side wall vertical ribs extending from opposite sides of the top wall of and vertically down the left and right side walls of the pretreatment chamber, respectively, and around and onto the bottom wall of the pretreatment chamber to connect to a side of one of the first plurality of vertical ribs or one of the second plurality of vertical ribs;

an aeration chamber having a second generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a third plurality of ribs on the front wall of the aeration chamber and nested with the second plurality of ribs on the back wall of the pretreatment chamber; a fourth plurality of ribs on the back wall of the aeration chamber; an aeration chamber inlet formed in the front wall of the aeration chamber and connected to the pretreatment chamber outlet; an aeration chamber access opening formed in a top wall of the aeration chamber; an aeration chamber outlet formed in the back wall of the aeration chamber; a return receiving opening formed in the back wall of the aeration chamber; and a third and a fourth plurality of side wall vertical ribs extending from opposite sides of the top wall of the aeration chamber vertically down the left and right side walls, respectively, around and onto the bottom wall of the aeration chamber with the outer pair of the third and fourth plurality of side wall vertical ribs connecting to a side of one of the third plurality of vertical ribs or one of the fourth plurality of vertical ribs, and adjacent ends of the inner pair of the third and fourth plurality of side wall vertical ribs being connected by a curved rib section; and a clarification chamber having a third generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a fifth plurality of ribs on a front wall of the clarification chamber and nested with the fourth plurality of ribs on a back wall of the aeration chamber; a sixth plurality of ribs extending from the top wall and down the back wall of the clarification chamber and around, onto and across the bottom wall of the clarification chamber; a clarification chamber inlet formed in the front wall of the clarification chamber and connected to the aeration chamber outlet; a clarification chamber access opening formed in the top wall of the clarification chamber; a clarification chamber outlet formed in the back wall of the clarification chamber; a return opening formed in the front wall of the clarification chamber and positioned to connect to the return receiving opening upon the nesting of the fourth plurality of ribs with the fifth plurality of ribs to provide an open channel for fluid communication between the aeration chamber and the clarification chamber; and a first, single vertical rib extending from near a top end of and vertically down the left side wall and a second, single vertical rib extending from near a top end of and vertically down the right side wall, and a bottom wall of the clarification chamber.

22. The modular wastewater treatment plant of claim 21 further comprising:

a male threaded fitting having a collar at a proximal end and a threaded section at a distal end, with the distal end of the male threaded fitting being inserted through a first rubber gasket and from the outside of and through the pretreatment chamber inlet, the male threaded fitting then being inserted through a second rubber gasket, and a female threaded fitting being screwed onto the male threaded fitting to sealingly connect the male threaded fitting and the female threaded fitting to the pretreatment chamber inlet.

23. The modular wastewater treatment plant of claim 22 further comprising:

a pretreatment tee having a top end located inside the pretreatment chamber and just below the pretreatment chamber access opening in the top wall and a body of the pretreatment tee curving downwardly along an interior of the back wall to a bottom end located below the pretreatment chamber outlet in the back wall, the body of the pretreatment tee including a tee section having a top portion forming a part of the body of the pretreatment tee and a leg portion extending substantially perpendicularly away from the tee section and coaxially aligned with the pretreatment chamber outlet.

24. The modular wastewater treatment plant of claim 23 further comprising:

an end of the pretreatment tee leg portion inserted into a collar at a proximal end of and connected to a second male threaded fitting, the second male threaded fitting having a threaded section at a distal end, with the distal end of the second male threaded fitting being inserted through a third rubber gasket and from the inside of and out through the pretreatment chamber outlet and in through the aeration chamber inlet, the second male threaded fitting then being inserted through a fourth rubber gasket, and a second female threaded fitting is screwed onto the second male threaded fitting to sealingly connect the second male threaded fitting and the second female threaded fitting to the pretreatment chamber inlet and the aeration chamber outlet.

25. The modular wastewater treatment plant of claim 24 further comprising:

a sludge return inlet having an inlet at a top end located inside the aeration chamber and just below the aeration chamber access opening in the top wall and a body of the sludge return inlet extending downwardly to a curved bottom end with an end portion having an annular ridge around an exterior proximal end and the end portion extending substantially perpendicularly away from the sludge return inlet and terminating in an open circular distal end, the end portion is coaxially aligned with the aeration chamber outlet, the sludge return end portion having a pair of opposite detents.

26. The modular wastewater treatment plant of claim 25 further comprising:

a top portion of a sludge return extension is inserted through a third male threaded fitting, a fifth rubber gasket and the aeration chamber outlet, the clarification chamber inlet, a sixth rubber gasket, a third female threaded fitting and around the end portion of the sludge return inlet until contacting the annular ridge around the exterior proximal end of the end portion of the sludge return inlet, the top portion of a sludge return extension having a plurality of raised members forming a broken annular ridge near a proximal end of the top portion of a sludge return extension, the sludge return inlet end portion sliding inside of and fastening to the top portion of the sludge return extension, the top portion of the sludge return extension having a pair of opposite openings that receive the sludge return end portion opposite detents, and the third female threaded fitting being screwed onto the third male threaded fitting to sealingly connect the third male threaded fitting and the third female threaded fitting to the aeration chamber outlet and the clarification chamber inlet.

27. The modular wastewater treatment plant of claim 26 further comprising:

an outlet coupling having a spillover inlet portion connected to a back side of a substantially circular body portion in which is defined an inlet opening that is in fluid communication with the spillover inlet portion and a substantially cylindrical wall portion extending substantially perpendicularly away from a right side of the substantially circular body portion, the substantially cylindrical wall portion inserted through a fourth female threaded fitting, seventh rubber gasket, the clarification chamber outlet, an eighth rubber gasket and inside of and solvent welded to a threaded end of a fourth male threaded fitting, the fourth female threaded fitting being screwed onto the fourth male threaded fitting to sealingly connect the outlet coupling, the fourth male threaded fitting and the fourth female threaded fitting to the clarification chamber outlet.

28. The modular wastewater treatment plant of claim 27 further comprising:

a substantially cylindrical pretreatment riser having a base portion connected to and forming a water tight seal around the pretreatment chamber access opening, and a substantially circular pretreatment riser lid connected to and forming a water tight seal around a top end of the substantially cylindrical pretreatment riser;

a substantially cylindrical aeration riser having a base portion connected to and forming a water tight seal around the aeration chamber access opening, and a substantially circular aeration riser lid connected to and forming a water tight seal around a top end of the substantially cylindrical aeration riser; and a substantially cylindrical clarification riser having a base portion connected to and forming a water tight seal around the clarification chamber access opening, and a substantially circular clarification riser lid connected to and forming a water tight seal around a top end of the substantially cylindrical clarification riser.

29. The modular wastewater treatment plant of claim 28 wherein said substantially circular aeration riser lid includes a plurality of air vents.

30. The modular wastewater treatment plant of claim 29 further comprising an aeration system installed in the substantially cylindrical aeration riser and the aeration chamber.

31. The modular wastewater treatment plant of claim 30 further comprising a Bio-Kinetic® system installed in the clarification chamber.

32. The modular wastewater treatment plant of claim 31 further comprising a chlorination system and a dechlorination system, both installed on the top of and in fluid communication with the Bio-Kinetic® system.

33. The modular wastewater treatment plant of claim 32 further comprising a downwardly extending portion of the sludge return extension including a terminal end having a terminal end opening located at a top of the clarification chamber return and in fluid communication with the clarification chamber return and the aeration chamber return receiving opening.

34. A modular wastewater treatment plant comprising:

a pretreatment chamber means having a first generally oblate spheroid shape and a first plurality of ribs on a first side wall of the pretreatment chamber means and a second plurality of ribs on a second and opposite side wall of the pretreatment chamber means, a pretreatment chamber inlet means formed in the first side wall of the pretreatment chamber means, a pretreatment chamber access means formed in a top wall of the pretreatment chamber means, a pretreatment chamber outlet means formed in the second side wall of the pretreatment chamber means, a first plurality of horizontal flange pairs spaced vertically apart from each other and extending from the second side wall of the pretreatment chamber and each flange defining a first fastener opening, and a bottom wall of the pretreatment chamber means;

an aeration chamber means having a second generally oblate spheroid shape and a third plurality of ribs on a first side wall of the aeration chamber means and positioned to nest with the second plurality of ribs on the second side wall of the pretreatment chamber means, and a fourth plurality of ribs on a second and opposite side wall of the aeration chamber means opposite of the first side wall of the aeration chamber means, an aeration chamber inlet means formed in the first side wall of the aeration chamber means and positioned to connect to the pretreatment chamber outlet means upon the nesting of the second plurality of ribs with the third plurality of ribs, an aeration chamber access means formed in a top wall of the aeration chamber means, an aeration chamber outlet means formed in the second side wall of the aeration chamber means, a return receiving means, a second plurality of horizontal flange pairs spaced vertically apart from each other and extending from the first side wall of the aeration chamber and each flange defining a second fastener opening and the second plurality of flange pairs arranged to cooperate with the first plurality of horizontal flange pairs so that a first plurality of fastening means can be secured through the first fastener openings and the second fastener openings to connect the first plurality of horizontal flange pairs to the second plurality of horizontal flange pairs, a third plurality of horizontal flange pairs spaced vertically apart from each other and extending from the second side wall of the aeration chamber and each flange defining a third fastener opening, and a bottom wall of the aeration chamber means; and a clarification chamber means having a third generally oblate spheroid shape and a fifth plurality of ribs on a first side wall of the clarification chamber means and positioned to nest with the fourth plurality of ribs on the second side wall of the aeration chamber means, a clarification chamber inlet means formed in the first side wall of the clarification chamber means and positioned to connect to the aeration chamber outlet means upon the nesting of the fourth plurality of ribs with the fifth plurality of ribs, a clarification chamber access means formed in a top wall of the clarification chamber means, a clarification chamber outlet means formed in a back wall of the clarification chamber means, a return means positioned to connect to the return receiving means upon the nesting of the fourth plurality of ribs with the fifth plurality of ribs to provide an open channel for fluid communication between the aeration chamber means and the clarification chamber means, a fourth plurality of horizontal flange pairs spaced vertically apart from each other and extending from the first side wall of the clarification chamber and each flange defining a fourth fastener opening and the fourth plurality of flange pairs arranged to cooperate with the third plurality of horizontal flange pairs so that a second plurality of fastening means can be secured through the third fastener openings and the fourth fastener openings to connect the third plurality of horizontal flange pairs to the fourth plurality of horizontal flange pairs, and a bottom wall of the clarification chamber means.

35. A modular wastewater treatment plant comprising:

a pretreatment chamber having a first generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a first plurality of vertical ribs on the front wall of the pretreatment chamber and a second plurality of vertical ribs on the back wall of the pretreatment chamber; a pretreatment chamber inlet formed in the front wall of the pretreatment chamber; a pretreatment chamber access opening formed in the top wall of the pretreatment chamber; a pretreatment chamber outlet formed in the back wall of the pretreatment chamber; a first plurality of substantially circumferential ribs extending from opposite sides of the top wall vertically down the left and right side walls, respectively, and around, onto and across the bottom wall of the pretreatment chamber; and a plurality of pretreatment gussets connected between an adjacent pair of the first plurality of substantially circumferential ribs, where one of the plurality of pretreatment gussets is connected between the adjacent pair of the first plurality of substantially circumferential ribs on the right side wall, another of the plurality of pretreatment gussets is connected between the adjacent pair of the first plurality of substantially circumferential ribs on the left side wall, and the remainder of the plurality of pretreatment gussets is connected between the adjacent pair of the first plurality of substantially circumferential ribs on the bottom wall;

an aeration chamber having a second generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a third plurality of ribs on the front wall of the aeration chamber and nested with the second plurality of ribs on the back wall of the pretreatment chamber; a fourth plurality of ribs on the back wall of the aeration chamber; an aeration chamber inlet formed in the front wall of the aeration chamber and connected to the pretreatment chamber outlet; an aeration chamber access opening formed in a top wall of the aeration chamber; an aeration chamber outlet formed in the back wall of the aeration chamber; a return receiving opening formed in the back wall of the aeration chamber; and a second plurality of substantially circumferential ribs extending from opposite sides of the aeration chamber access opening across the opposite sides of the top wall around, onto and vertically down the left and right side walls, respectively, and around, onto and across the bottom wall of the aeration chamber; and a plurality of aeration gussets connected between adjacent pairs of the second plurality of substantially circumferential ribs, where three of the plurality of aeration gussets are connected between adjacent pairs of the second plurality of substantially circumferential ribs on the top wall, where two of the plurality of aeration gussets are connected between adjacent pairs of the first plurality of substantially circumferential ribs on the right side wall, another two of the plurality of aeration gussets is connected between the adjacent pairs of the second plurality of substantially circumferential ribs on the left side wall, and the remainder of the plurality of aeration gussets is connected between the adjacent pairs of the second plurality of substantially circumferential ribs in a spaced apart relationship on the bottom wall; and a clarification chamber having a third generally oblate spheroid shape and including a front wall, a back wall opposite and substantially parallel to the front wall, a left side wall connected between opposite sides of the front wall and the back wall, a right side wall connected between other opposite sides of the front wall and the back wall, a top wall connected between a top side of each of the front wall, the back wall, the left side wall and the right side wall, and a bottom wall connected between a bottom side of each the front wall, the back wall, the left side wall and the right side wall; a fifth plurality of ribs on a front wall of the clarification chamber and nested with the fourth plurality of ribs on a back wall of the aeration chamber; a sixth plurality of ribs extending from the top wall and down the back wall of the clarification chamber and around, onto and across the bottom wall of the clarification chamber; a clarification chamber inlet formed in the front wall of the clarification chamber and connected to the aeration chamber outlet; a clarification chamber access opening formed in the top wall of the clarification chamber; a clarification chamber outlet formed in the back wall of the clarification chamber; a return opening formed in the front wall of the clarification chamber and positioned to connect to the return receiving opening upon the nesting of the fourth plurality of ribs with the fifth plurality of ribs to provide an open channel for fluid communication between the aeration chamber and the clarification chamber; and a first, single vertical rib extending from near a top end of and vertically down the left side wall and a second, single vertical rib extending from near a top end of and vertically down the right side wall, and a bottom wall of the clarification chamber.

* * * * *